US009131104B2

(12) United States Patent
Nakafuji et al.

(10) Patent No.: US 9,131,104 B2
(45) Date of Patent: Sep. 8, 2015

(54) MANAGEMENT DEVICE, COMMUNICATION SYSTEM, AND STORAGE MEDIUM

(71) Applicants: Atsushi Nakafuji, Tokyo (JP); Yoshinaga Kato, Kanagawa (JP)

(72) Inventors: Atsushi Nakafuji, Tokyo (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 13 days.

(21) Appl. No.: 14/200,294

(22) Filed: Mar. 7, 2014

(65) Prior Publication Data

US 2014/0267565 A1 Sep. 18, 2014

(30) Foreign Application Priority Data

Mar. 12, 2013 (JP) ................................. 2013-049226
Jan. 24, 2014 (JP) ................................. 2014-011501

(51) Int. Cl.
*H04N 7/15* (2006.01)
*H04N 7/14* (2006.01)
*H04L 29/06* (2006.01)

(52) U.S. Cl.
CPC ................ *H04N 7/141* (2013.01); *H04L 65/00* (2013.01); *H04L 65/403* (2013.01); *H04L 2203/00* (2013.01)

(58) Field of Classification Search
CPC ... H04L 65/403; H04L 2203/00; H04N 7/141
USPC ...................................................... 348/14.08
See application file for complete search history.

(56) References Cited

U.S. PATENT DOCUMENTS

| 2011/0134806 A1* | 6/2011 | Kagawa et al. ................ 370/259 |
| 2011/0185039 A1* | 7/2011 | Ueno et al. .................... 709/217 |
| 2012/0002003 A1 | 1/2012 | Okita et al. |
| 2012/0314019 A1 | 12/2012 | Asai |
| 2014/0049597 A1 | 2/2014 | Inoue |

FOREIGN PATENT DOCUMENTS

| JP | 2008-199397 | 8/2008 |
| JP | 2011-199845 | 10/2011 |
| JP | 2012-75073 | 4/2012 |
| JP | 2014-38522 | 2/2014 |

* cited by examiner

*Primary Examiner* — Creighton Smith
(74) *Attorney, Agent, or Firm* — Oblon, McClelland, Maier & Neustadt, L.L.P.

(57) ABSTRACT

A management device includes a status management part managing connection statuses of terminals; a group management part managing a group associated with the terminals, and which manages a group status of the group depending on the connection statuses of the terminals associated with the group, the group management part setting the group status so that the group status represents that the group is ready to connect; a transmission part transmitting to a first terminal which is not in the group the group status representing that the group is ready to connect; and responding to a request to connect to the group from the first terminal, an establishment part, establishing a session to connect the first terminal to a second terminal which is in the group, wherein the connection status of the second terminal represents that the second terminal is ready to connect to other terminals.

9 Claims, 51 Drawing Sheets

| IP ADDRESS OF RELAY DEVICE | IMAGE QUALITY OF RELAYED IMAGE DATA (IMAGE QUALITY) |
|---|---|
| 1.3.2.4 | HIGH RESOLUTION |
| 1.3.1.3 | LOW RESOLUTION |
| 1.3.2.3 | MEDIUM RESOLUTION |
| ... | ... |

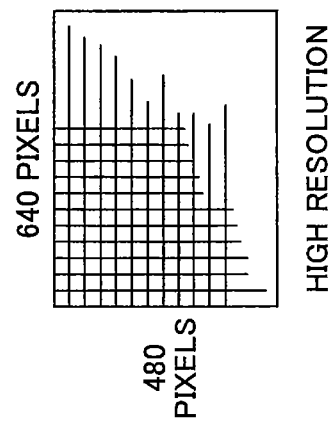
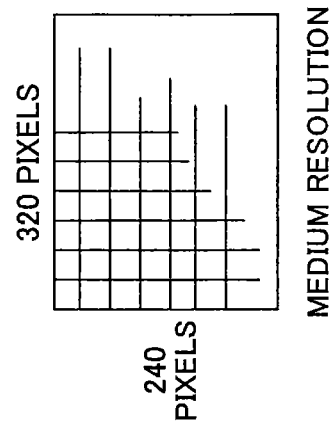
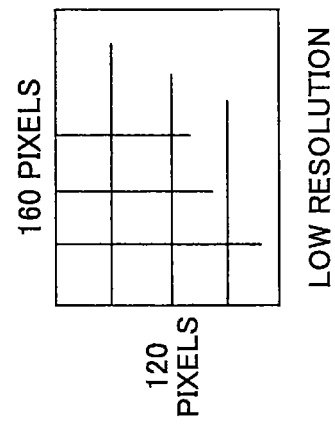

FIG.9

| RELAY DEVICE ID | OPERATING CONDITION | RECEIPT DATE/TIME | IP ADDRESS OF RELAY DEVICE | MAXIMUM DATA TRANSMISSION SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.2.2.2 | 10 |
| 111e | ONLINE | | 1.1.1.3 | |

FIG.10

| TERMINAL ID | PASSWORD |
|---|---|
| 01aa | aaaa |
| 01ab | abab |
| 01ba | baba |
| ... | ... |

FIG.11

| TERMINAL ID | TERMINAL NAME | OPERATING CONDITION | COMMUNICATION STATUS | RECEIPT DATE/TIME | TERMINAL IP ADDRESS |
|---|---|---|---|---|---|
| 01aa | JAPAN TOKYO OFFICE AA TERMINAL | ONLINE (AVAILABLE) | None | 2009.11.10.13:40 | 1.2.1.3 |
| 01ab | JAPAN TOKYO OFFICE AB TERMINAL | OFFLINE | | 2009.11.09.12:00 | 1.2.1.4 |
| ... | ... | ... | | ... | ... |
| 01ba | JAPAN OSAKA OFFICE BA TERMINAL | ONLINE (BUSY) | Private Calling | 2009.11.10.13:45 | 1.2.2.3 |
| 01bb | JAPAN OSAKA OFFICE BB TERMINAL | ONLINE (BUSY) | Private Busy | 2009.11.10.13:50 | 1.2.2.4 |
| ... | ... | ... | | ... | ... |
| 01ca | U.S. NEW YORK OFFICE CA TERMINAL | OFFLINE | | 2009.11.10.12:45 | 1.3.1.3 |
| 01cb | U.S. NEW YORK OFFICE CB TERMINAL | OFFLINE | | 2009.11.10.13:55 | 1.3.1.4 |
| 01da | U.S. WASHINGTON OFFICE DA TERMINAL | ONLINE (BUSY) | Private Busy | 2009.11.08.12:45 | 1.3.2.3 |
| 01db | U.S. WASHINGTON OFFICE DB TERMINAL | ONLINE (AVAILABLE) | None | 2009.11.10.12:45 | 1.3.2.4 |
| ... | ... | ... | | ... | ... |

FIG.12

| SOURCE TERMINAL ID | DESTINATION TERMINAL ID |
|---|---|
| 01aa | 01ab,01ba,01db,01dc |
| 01ab | 01aa,01ca,01cb |
| 01ba | 01aa,01ab,01ca,01cb,01da,01db |
| 01cb | 01aa,01bb,01db |
| 01db | 01aa,01cb,01da |
| ... | ... |

FIG.13

| SESSION ID | RELAY DEVICE ID | SOURCE TERMINAL ID | DESTINATION TERMINAL ID | DELAY TIME (ms) | DELAY TIME RECEIPT DATE/TIME |
|---|---|---|---|---|---|
| se1 | 111e | 01aa | 01db | 200 | 2009.11.10.14:00 |
| se2 | 111b | 01ba | 01be | 50 | 2009.11.10.14:10 |
| se3 | 111c | 01cd | 01cf | 400 | 2009.11.10.14:20 |
| ... | ... | ... | ... | ... | ... |

FIG.14

| DELAY TIME (ms) | IMAGE QUALITY OF RELAYED IMAGE DATA (IMAGE QUALITY) |
|---|---|
| 0~100 | HIGH RESOLUTION |
| 100~300 | MEDIUM RESOLUTION |
| 300~500 | LOW RESOLUTION |
| 500~ | (SUSPENDED) |

FIG.15

| TERMINAL ID | RELAY DEVICE ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.16

| CHANGE REQUEST | PRE-CHANGE STATUS | POST-CHANGE STATUS |
|---|---|---|
| Call | None | Accepted |
| Join | Accepted | Busy |
| | Private Accepted | Private Busy |
| Leave | Busy | None |
| | Private Busy | None |

FIG.17

| CHANGE REQUEST | TERMINAL | PRE-CHANGE STATUS | POST-CHANGE STATUS |
|---|---|---|---|
| Invite | SOURCE TERMINAL | None | Calling |
| | DESTINATION TERMINAL | None | Ringing |
| Private Invite | SOURCE TERMINAL | None | Private Calling |
| | DESTINATION TERMINAL | None | Private Ringing |
| Accept | SOURCE TERMINAL | Calling | Accepted |
| | | Private Calling | Private Accepted |
| | | Accepted | Accepted |
| | | Private Accepted | Private Accepted |
| | DESTINATION TERMINAL | Ringing | Accepted |
| | | Private Ringing | Private Accepted |

FIG.34

| STATUS | TERMINAL ID | TERMINAL NAME |
|---|---|---|
| 👤📞 | 01aa | JAPAN TOKYO OFFICE AA TERMINAL |
| 📞 | 01bb | JAPAN OSAKA OFFICE BB TERMINAL |
| 👤📞 | 10db | U.S. WASHINGTON OFFICE DB TERMINAL |

FIG.41

| TERMINAL ID | TERMINAL NAME | OPERATING CONDITION | COMMUNICATION STATUS | RECEIPT DATE/TIME | TERMINAL IP ADDRESS |
|---|---|---|---|---|---|
| 01aa | JAPAN TOKYO OFFICE AA TERMINAL | ONLINE (AVAILABLE) | None | 2009.11.10.13:40 | 1.2.1.3 |
| 01ab | JAPAN TOKYO OFFICE AB TERMINAL | OFFLINE | | 2009.11.09.12:00 | 1.2.1.4 |
| ... | ... | ... | ... | ... | ... |
| 01ba | CALL CENTER BA TERMINAL | ONLINE (BUSY) | Private Calling | 2009.11.10.13:45 | 1.2.2.3 |
| 01bb | JAPAN OSAKA OFFICE BB TERMINAL | ONLINE (BUSY) | Private Busy | 2009.11.10.13:50 | 1.2.2.4 |
| ... | ... | ... | ... | ... | ... |
| 01ca | U.S. NEW YORK OFFICE CA TERMINAL | OFFLINE | | 2009.11.10.12:45 | 1.3.1.3 |
| 01cb | U.S. NEW YORK OFFICE CB TERMINAL | OFFLINE | | 2009.11.10.13:55 | 1.3.1.4 |
| ... | ... | ... | ... | ... | ... |
| 01db | CALL CENTER DB TERMINAL | ONLINE (BUSY) | Private Busy | 2009.11.08.12:45 | 1.3.2.3 |
| 01dc | CALL CENTER DC TERMINAL | ONLINE (AVAILABLE) | None | 2009.11.10.12:45 | 1.3.2.4 |
| ... | ... | ... | ... | ... | ... |

FIG.42

| SOURCE TERMINAL ID | DESTINATION TERMINAL ID |
|---|---|
| 01aa | 01ab,01xx |
| 01ab | 01aa,01ca,01cb |
| 01ba | 01aa,01ab,01ca,01cb,01da,01db |
| 01cb | 01aa,01bb,01db |
| 01db | 01aa,01cb,01da |
| ... | ... |

FIG.43

| TERMINAL ID | GROUPED TERMINAL IDs | GROUP ID FLAG | GROUP NAME |
|---|---|---|---|
| 01aa | | FALSE | |
| 01ab | | FALSE | |
| 01ca | | FALSE | |
| 01cb | | FALSE | |
| 01da | | FALSE | |
| ... | | ... | |
| 01xx | 01ba,01db,01dc | TRUE | CALL CENTER |

FIG.44

| GROUP ID | OPERATING CONDITION |
|---|---|
| 01xx | ONLINE (AVAILABLE) |

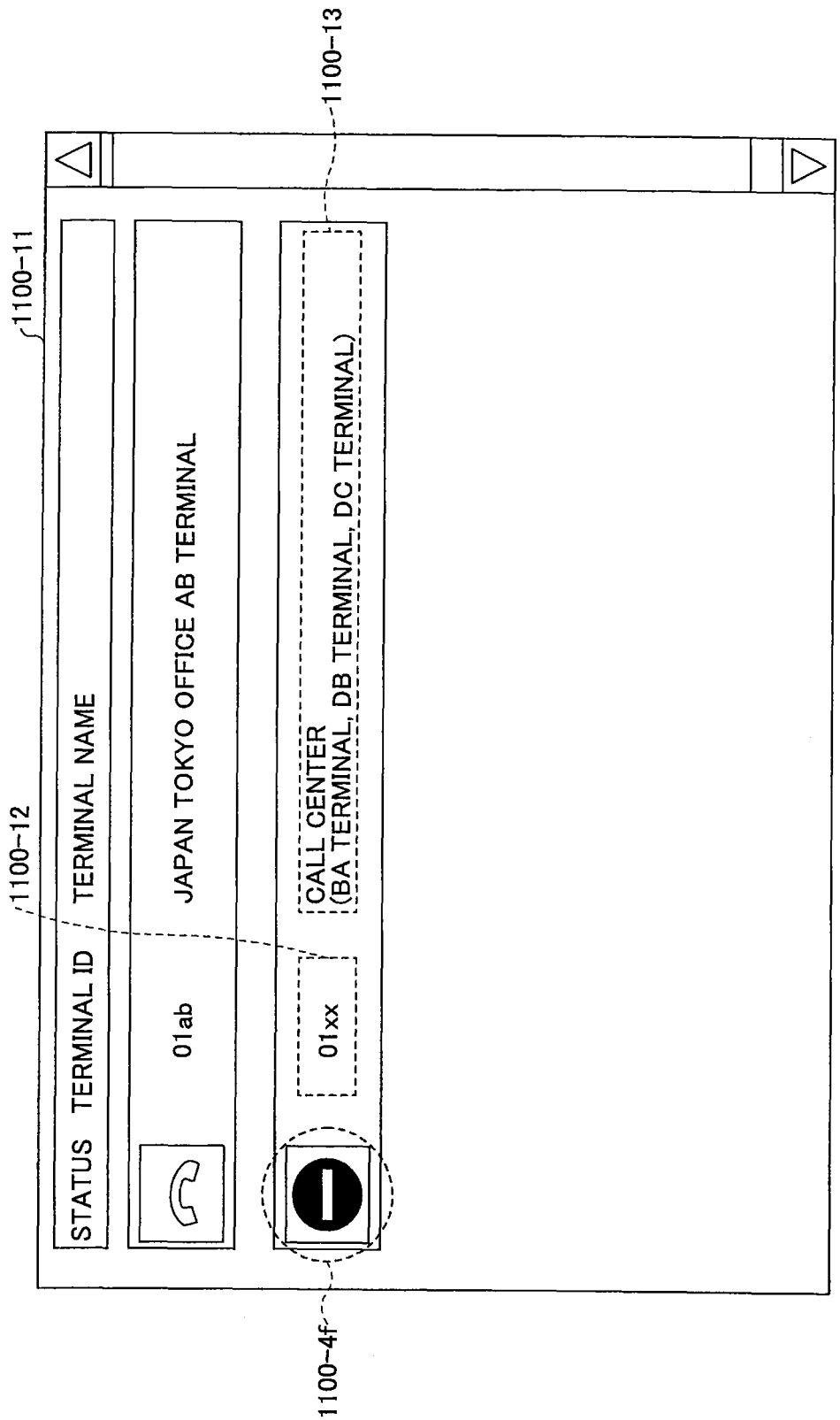

MANAGEMENT DEVICE, COMMUNICATION SYSTEM, AND STORAGE MEDIUM

BACKGROUND OF THE INVENTION

1. Field of the Invention

An aspect of this disclosure is related to a management device, a communication system, and a storage medium.

2. Description of the Related Art

In general, a service provider who provides any products or services for its customers establishes a call center focusing on receiving inquiries from the customers by phone collectively. The call center explains the products for the customers or solves their problems with voice communication.

Recently, there is a need for video communication for such an operation handing the inquiries in addition to the voice communication. Thus, some service providers support their customers with a video conference terminal supporting voice and video communication in a store via a next generation network (NGN).

Patent Document 1 discloses a remote maintenance system configured to manage calls received from customers depending on the severity of the problems having occurred in the terminals of the customers. On the other hand, Patent Document 2 discloses a transmission management system configured to choose one of relay devices which may relay high quality content data at the fastest rate under an actual communication network.

However, a problem with the conventional video conference system is that costs tend to be high for installing the infrastructure such as the NGN and communication networks and for the communication charges. In addition, the conventional video conference system may just provide a function for a terminal to call another terminal and connect them. Since the conventional video conference system is unable to automatically distribute the call to a plurality of terminals, it is not suitable for use in the call center.

SUMMARY OF THE INVENTION

In one aspect, the present disclosure provides a management device, a communication system, and a storage medium which substantially eliminate one or more problems caused by the limitations and disadvantages of the related art.

In an aspect of this disclosure, there is provided a management device including a status management part configured to manage connection statuses of terminals representing whether the terminals are ready to connect to other terminals; a group management part configured to manage a group associated with one or more of the terminals, and manages a group status of the group depending on the connection statuses of the terminals associated with the group, wherein when the connection status of at least one of the terminals associated with the group represents that the terminal is ready to connect to other terminals, the group management part sets the group status so that the group status represents that the group is ready to connect; a transmission part configured to transmit to a first terminal which is not associated with the group the group status representing that the group is ready to connect; and an establishment part configured to, responding to a request to connect to the group from the first terminal, establish a session to connect the first terminal to a second terminal which is one of the terminals associated with the group, wherein the connection status of the second terminal represents that the second terminal is ready to connect to other terminals.

According to another embodiment of this invention, there is provided a plurality of terminals; and a management device, wherein the management device includes a status management part configured to manage connection statuses of terminals representing whether the terminals are ready to connect to other terminals; a group management part configured to manage a group associated with one or more of the terminals, and manages a group status of the group depending on the connection statuses of the terminals associated with the group, wherein when the connection status of at least one of the terminals associated with the group represents that the terminal is ready to connect to other terminals, the group management part updates the group status so that the group status represents that the group is ready to connect; a transmission part configured to transmit to a first terminal which is not associated with the group the group status representing that the group is ready to connect; an establishment part configured to, responding to a request to connect to the group from the first terminal, establish a session to connect the first terminal to a second terminal which is one of the terminals associated with the group, wherein the connection status of the second terminal represents that the second terminal is ready to connect to other terminals, and one of the terminals includes a receipt part configured to receive the group status from the management device; an acceptance part configured to accept user input to specify the group for transmitting the request to connect to the group; and a transmitting part configured to transmit the request to connect to the group to the management device.

According to another embodiment of this invention, there is provided a computer-readable storage medium for storing a program therein, the program causing a computer to perform a method including managing connection statuses of terminals representing whether the terminals are ready to connect to other terminals; managing a group associated with one or more of the terminals; acquiring the connection statuses of the terminals associated with the group; managing a group status of the group depending on the connection statuses of the terminals associated with the group, wherein when the connection status of at least one of the terminals associated with the group represents that the terminal is ready to connect to other terminals, the group management part updates the group status so that the group status represents that the group is ready to connect; transmitting to a first terminal which is not associated with the group the group status representing that the group is ready to connect; and responding to a request to connect to the group from the first terminal, establishing a session to connect the first terminal to a second terminal which is one of the terminals associated with the group, wherein the connection status of the second terminal represents that the second terminal is ready to connect to other terminals.

BRIEF DESCRIPTION OF THE DRAWINGS

Other objects and further features of embodiments may become apparent from the following detailed description when read in conjunction with the accompanying drawings, in which:

FIG. 8A is a diagram showing image quality of image data;
FIG. 8B is a diagram showing image quality of image data;
FIG. 8C is a diagram showing image quality of image data;

FIG. 9 is a diagram showing a relay-device management table;

FIG. 10 is a diagram showing a terminal authentication management table;

FIG. 11 is a diagram showing a terminal management table;

FIG. 12 is a diagram showing a destination list management table;

FIG. 13 is a diagram showing a session management table;
FIG. 14 is a diagram showing a quality management table;
FIG. 15 is a diagram showing a relay-device management table;

FIG. 16 is a diagram showing a status change management table;

FIG. 17 is a diagram showing a status change management table;

FIG. 34 is a diagram showing an example screen of a destination list;

FIG. 41 is a diagram showing a terminal management table;

FIG. 42 is a diagram showing a destination list management table;

FIG. 43 is a diagram showing a group ID management table;

FIG. 44 is a diagram showing a group status change management table;

FIG. 50 is a diagram showing an example screen of a destination list;

DESCRIPTION OF THE PREFERRED EMBODIMENTS

Figure 1:
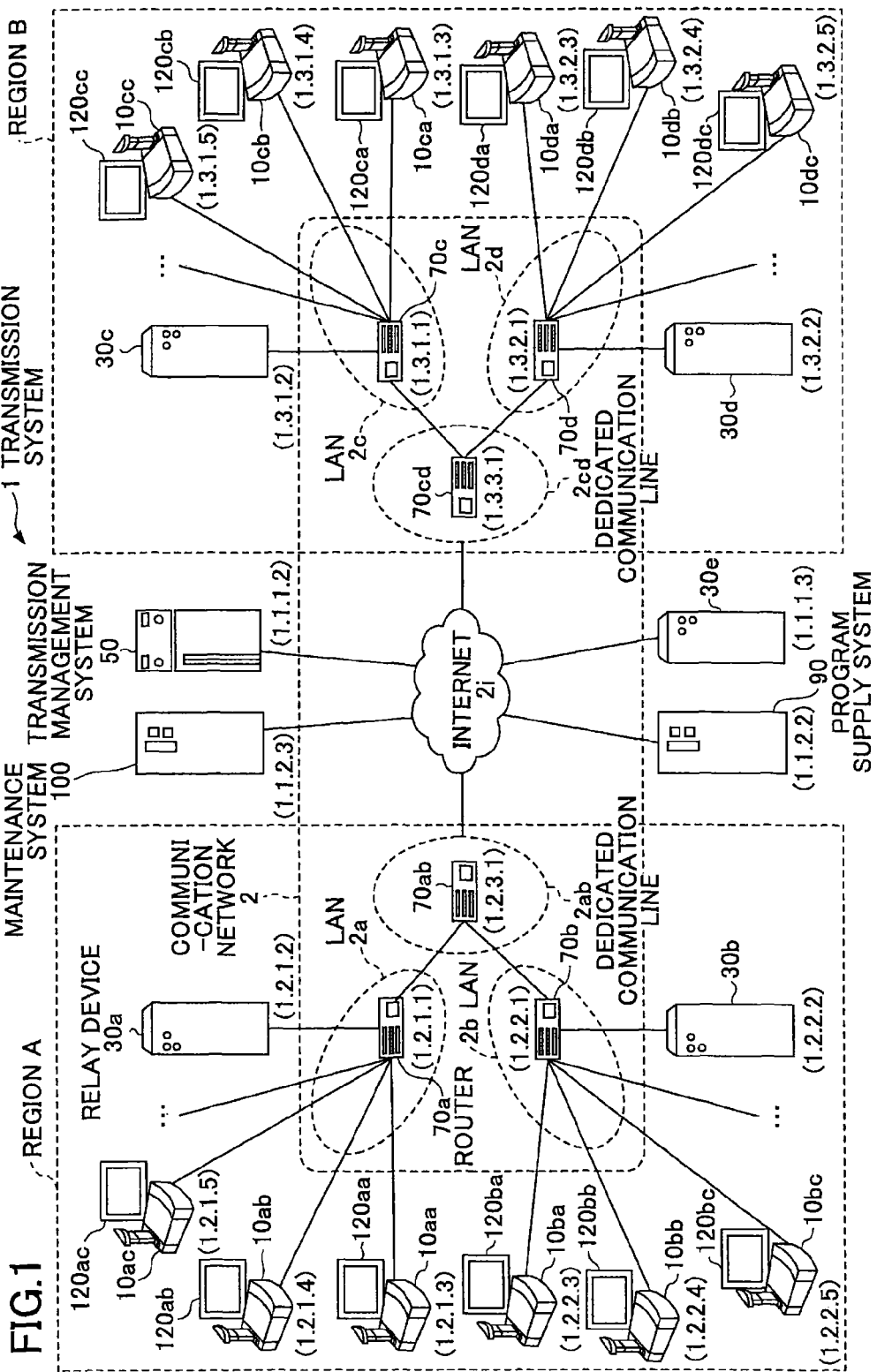
FIG. 1 is a diagram showing a transmission system according to an embodiment of the invention.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

In the following discussion, a fundamental configuration of a transmission system 1 used in an embodiment of this invention is discussed first. After the discussion, a transmission system 1A according to the embodiment of this invention is discussed. The transmission system 1A may distribute a call for a destination to a plurality of terminals and thereby achieves an efficient video conference.

Overall Configuration of Transmission System

With reference to FIGS. 1-39, embodiments of a communication system and a program are discussed in detail. FIG. 1 shows an example of a transmission system 1 as the communication system 1 according to an embodiment. First, general functions of the transmission system 1 are discussed.

There are various types of the transmission systems. One example may be a data providing system. In the data providing system, content data are transmitted from one terminal to another terminal via a transmission management system in a one-way direction. Another example may be an intercommunication system. The intercommunication system is utilized for mutually exchanging information or emotional expressions among the two or more intercommunication terminals (i.e., the transmission terminals) via an intercommunication management system (i.e., the transmission management system). Examples of the intercommunication system include a videoconference system, a videophone system, an audio conference system, a voice-call system, or a personal computer screen sharing system.

The following embodiments describe the transmission system 1, a transmission management system 50, and a transmission terminal 10 by conceptualizing the videoconference system as an example of the intercommunication system, the videoconference management system as an example of the intercommunication management system, and a videoconference terminal as an example of the intercommunication terminal.

As shown in FIG. 1, the transmission system 1 includes two or more transmission terminals (10aa, 10ab, etc.), displays (120aa, 120ab, etc.) for the transmission terminals, two or more relay devices (30a, 30b, 30c, 30d, 30e), a transmission management system 50, a program supply system 90, and a maintenance system 100. Note that in the following, the transmission terminal and the transmission management system may also be simply referred to as the "terminal" and the "management system", respectively.

Note that in this embodiment, any one of the transmission terminals (10aa, 10ab, etc.) may be referred to as "terminal 10", any one of the displays (120aa, 120ab, etc.) may be referred to as "display 120", and any one of the relay devices (30a, 30b, 30c, 30d, 30e) may be referred to as "relay device 30".

The terminal 10 is configured to transmit and receive various kinds of data to/from other terminals. For example, the terminal 10 is configured to establish a session with the other terminal 10, and connect to the other terminal 10 to transfer image data and sound data. As a result, the terminals 10 may perform a video conference in the transmission system 1.

In the following, the image data and sound data may also be simply referred to as "content data". Here, the data transferred between the terminals 10 is not limited to the data described in the embodiment. For example, the data may be text data or all or any combination of image data, sound data, and text data. Also, the image data may be movie data or still image data. The image data may include both the movie data and the still image data.

In the transmission system 1 according to this embodiment, when a user starts a video conference, the user operates the terminal 10 so that the terminal 10 transmits a start request to the management system 50.

Here, the start request is transmitted to request for starting the session of the video conference. The start request includes information representing another party's terminal. In the following, the terminal 10 transmitting the start request may be referred to as "source terminal". In addition, the other terminal 10 specified as the other party may be referred to as "destination terminal".

In addition, the source terminal 10 may transmit the start request to two or more destination terminals 10 (other parties in a session). Thus, a video conference may be performed with the session connected not only between two terminals 10 but among three or more terminals 10.

In the transmission system 1 according to this embodiment, other users may join the video conference after the session has been established and the video conference has been started. The user who desires to join the video conference may operate the terminal 10 so that the terminal 10 transmits to the management system 50 a join request specifying a session which has been established (herein after called the "established session"). Here, the other terminal 10 transmitting the join request may be referred to as "join request terminal".

The management system 50 is configured to manage the transmission terminal 10 and the relay device 30 in an integrated manner. The management system 50 may perform the video conference for the terminals 10 by establishing the session between or among the terminals 10.

When the management system 50 receives a start request for a session from the terminal 10, the management system 50 establishes the session between the terminal 10 which has transmitted the start request (i.e. source terminal) and the destination terminal, and starts a video conference. When the management system 50 receives from the terminal 10 a join request to join an established session, the management system 50 determines whether the terminal 10 is allowed to join the established session.

Routers (70a, 70b, 70c, 70d, 70ab, 70cd) shown in FIG. 1 are configured to select optimal paths for the content data. Note that in this embodiment, any one of the routers (70a, 70b, 70c, 70d, 70ab, 70cd) may be referred to as "router 70". The relay device 30 is configured to relay the content data among the terminals 10.

The program supply system 90 includes a not-illustrated hard disk (HD) configured to store programs for the terminal 10, with which the terminal 10 may implement various functions or various units, and transmit the programs to the terminal 10. The HD of the program supply system 90 is configured to further store programs for the relay device, with which the relay device 30 implements various functions or various units, and transmits the programs for the relay device to the relay device 30. In addition, the HD of the program supply system 90 is configured to store transmission management programs, with which the management system 50 implements various functions or various units, and transmit the transmission management programs to the management system 50.

The maintenance system 100 is a computer configured to keep, manage, or maintain conditions for at least one of the terminals 10, the relay devices 30, the management system 50, and the program supply system 90. For example, when the maintenance system 10 is deployed in a country and at least one of the terminals 10, the relay devices 30, the management system 50, and the program supply system is deployed in another country, the maintenance system 100 is configured to keep, manage, or maintain conditions for at least one of the terminals 10, the relay devices 30, the management system 50, and the program supply system 90 via a communication network remotely. In addition, the maintenance system 100 is configured to manage a model number, a serial number, a sales destination, a maintenance record, or a failure history of at least one of the terminals 10, the relay devices 30, the management system 50, and the program supply system 90.

As shown in FIG. 1, the terminals (10aa, 10ab, 10ac, 10a . . . ), the relay device 30a, and the router 70a are connected via a LAN 2a so that they may communicate with each other. The terminals (10ba, 10bb, 10bc, 10b . . . ), the relay device 30b, and the router 70b are connected via a LAN 2b so that they may communicate with each other. The LAN 2a and the LAN 2b are connected by a dedicated line tab including a router 70c so that they communicate with each other, and the LAN 2a and the LAN 2b are set up in a predetermined area A. For example, the area A may be Japan, the LAN 2a may be set up in an office in Tokyo, and the LAN 2b may be set up in an office in Osaka.

Meanwhile, the terminals (10ca, 10cb, 10cc, 10c . . . ), the relay device 30c, and the router 70d are connected via a LAN 2c so that they may communicate with each other. The terminals (10da, 10db, 10dc, 10d . . . ), the relay device 30d, and the router 70d are connected via a LAN 2d so that they may communicate with each other. The LAN 2c and the LAN 2d are connected by a dedicated line 2cd including a router 70cd so that they communicate with each other, and the LAN 2c and the LAN 2d are set up in predetermined area B. For example, the area B may be USA, the LAN 2c may be is set up in an office in New York, and the LAN 2d may be set up in an office in Washington, D.C. The area A and the area B are connected from the routers (70ab, 70cd) via the Internet 2i so that the area A and the area B are mutually in communication via the Internet 2i.

The management system 50 and the program supply system 90 are connected to the terminals 10 and the relay devices 30 via the Internet 2i so that they may communicate with each other. Alternatively, the management system 50 and the program supply system 90 may be located in the area A or the area B, or may be located in an area other than the areas A and B.

The relay device 30e is connected to the terminals 10 via the Internet 2i so that they may communicate with each other. The relay device 30e is always-on in an area other than the area A and the area B to avoid an effect from traffic in such areas. The relay device 30e is used to relay content data when the terminal connects to another terminal in another local area. Also, the relay device 30e is used instead of a relay device deployed in an area when the relay device in the area is not working and the terminal connects to another terminal in the area.

Note that in this embodiment, the communication network 2 is made up of the LAN 2a, the LAN 2b, the dedicated line 2ab, the Internet 2i, the dedicated line 2cd, the LAN 2c, and the LAN 2d. The communication network 2 may include a wireless network as well as a wired network.

In the communication network 2 of FIG. 1, the set of four numbers attached under each of the terminals 10, the relay devices 30, the transmission management system 50, the routers 70, and the program supply system 90 simply indicates an IP address under the typical IPv4 (Internet Protocol version 4). For example, the IP address of the terminal 10aa is "1.2.1.3" as shown in FIG. 1. Alternatively, the IP addresses under the IPv6 may be used instead of the IP addresses under the IPv4. However, in this embodiment, the IPv4 is used for simplifying the illustration.

Hardware Configuration of Transmission System

Figure 4:
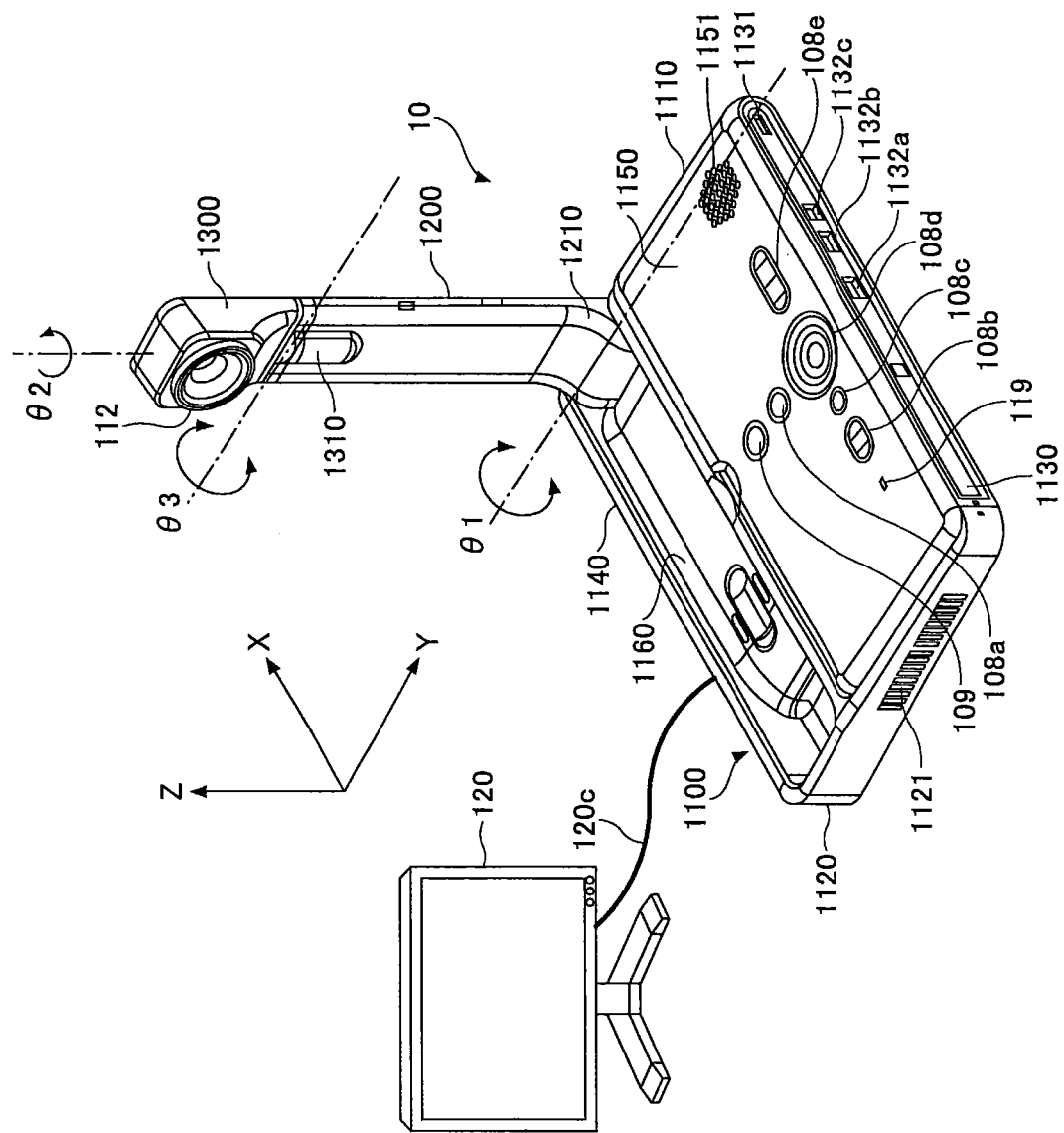
FIG. 4 is a perspective view of a transmission terminal according to the embodiment.

Next, a hardware configuration of the transmission system 1 according to the embodiment will be described. FIG. 4 is a perspective view of the terminal 10 according to the embodiment. Hereinafter, an X-axis direction represents a longitudinal direction of the terminal 10, a Y-axis direction represents a direction perpendicular to the X-axis direction in a horizontal direction, and a Z-axis direction represents a direction perpendicular to the X-axis direction and the Y-axis direction (i.e., vertical direction).

As shown in FIG. 4, the terminal 10 includes a housing 1100, an arm 1200, and a camera housing 1300. A front wall face 1110 of the housing 1100 includes a not-illustrated air intake surface which is formed of air intake holes, and a rear wall face 1120 of the housing 110 includes an exhaust surface 1121 which is formed of exhaust holes. Accordingly, the terminal 10 may take in external air behind the terminal 10 via the not-illustrated air intake surface and exhaust the air inside the terminal 10 via the exhaust surface 1121 by driving a cooling fan arranged inside the housing 1100. A right wall face 1130 of the housing 1100 includes a sound-collecting hole 1131, via which a built-in microphone 114 (see FIG. 3) is able to collect audio sound, such as voice, sound, or noise.

The right wall face 1130 of the housing 1100 includes an operation panel 1150. The operation panel 1150 includes operation buttons (108a-108e), a later-described power switch 109, a later-described alarm lamp 119, and a sound output face 1151 formed of sound output holes for outputting sound from a later-described built-in speaker 115. Further, a left wall face 1140 of the housing 1100 includes a recessed seat unit 1160 for accommodating an arm 1200 and a camera housing 1300. The right wall face 1130 of the housing 1100 further includes connection ports (1132a-1132c) for electrically connecting cables to the later-described external device connection IF (interface) 118. On the other hand, the left wall face 1140 of the housing 1100 further includes a not illustrated connection port for electrically connecting a display connecting cable 120c for the display 120 to the later-described external device connection IF (interface) 118.

Note that in the following, any one of the operation buttons (108a-108e) may be called an "operation button 108" and any one of the connection ports (1132a-1132c) may be called a "connection port 1132".

Figure 2:
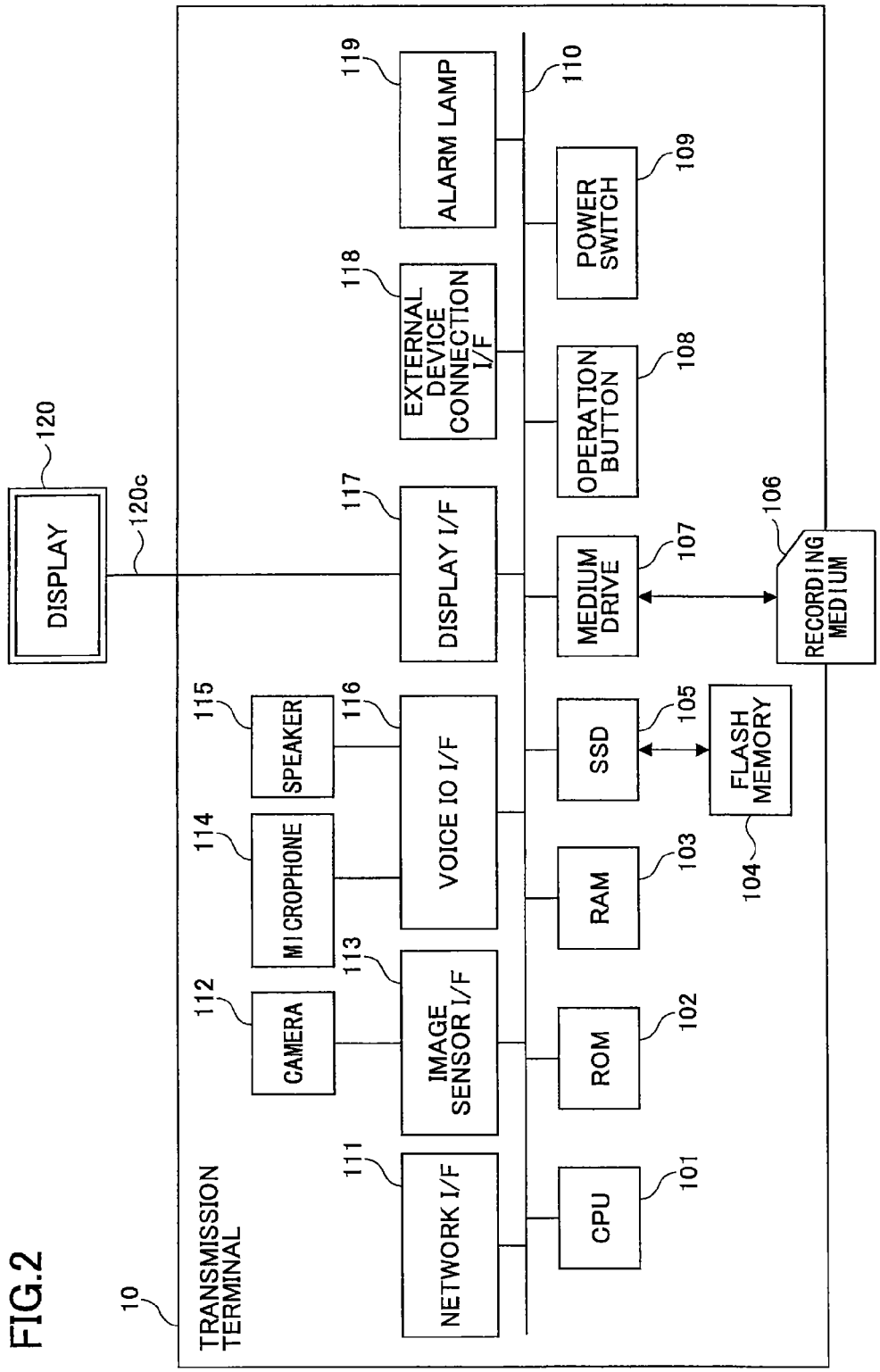
FIG. 2 is a diagram showing a hardware configuration of the transmission terminal according to the embodiment.

Next, the arm 1200 is attached to the housing 1100 via a torque hinge 1210 such that the arm 120 is movable in upward and downward directions within a tilt-angle θ1 range of 135 degrees with respect to the housing 1100. The arm 1200 shown in FIG. 2 is arranged at a tilt angle θ1 of 90 degrees.

A built-in camera 112 is arranged in the camera housing 1300 and the camera 112 is configured to take images of a user, documents, a room, etc. The camera housing 1300 further includes a torque hinge 1310. The camera housing 1300 is attached to the arm 1200 via the torque hinge 1310. The camera housing 1300 is rotatably attached to the arm 1200 in the up/down and right/left directions via the torque hinge 1310 such that the camera housing 1300 is movable in a pan-angle θ2 range of ±180 degrees and a tilt-angle θ3 range of ±45 degrees based on the assumption that the pan and tilt angles shown in FIG. 2 are both 0.

Alternatively, the terminal 10 may be a general-purpose computer. When the computer used as the terminal 10 does not have a microphone and a camera, an external microphone and camera are connected to the computer. In this way, the computer may work as the terminal 10 according to this embodiment. In addition, when the computer is used as the terminal 10, an application is installed to execute processes for the terminal 10 described later.

Furthermore, the terminal 10 may be any one of a smart phone, a tablet, a mobile phone, etc.

Note that external appearances of the relay device 30, the management system 50, and the program supply system 90 are all similar to the appearance of a typical server computer, and their descriptions are therefore omitted.

FIG. 2 is a block diagram showing the hardware configuration of the terminal 10 according to the embodiment. As shown in FIG. 2, the terminal 10 includes a central processing unit (CPU) 101 configured to control overall operations of the terminal 10, a read-only memory (ROM) 102 storing programs for the terminal, a random access memory (RAM) 103 used as a work area of the CPU 101, a flash memory 104 configured to store various data, such as image data and voice data, a solid state drive (SSD) 105 configured to control retrieval and writing (storing) of the various data in the flash memory 104 and the like based on the control of the CPU 101, a medium drive 107 configured to control retrieval and writing (storing) of data into a storage medium 106 such as a flash memory, the operation button 108 operated by a user for selecting an address of the terminal 10, the power switch 109 for switching ON/OFF of the power of the terminal 10, and a network interface (IF) 111 for transmitting data utilizing the communication network 2.

The terminal 10 further includes a built-in camera 112 configured to image a subject based on the control of the CPU 101, an image sensor interface (IF) 113 configured to control driving of the camera 112, the built-in microphone 114 configured to pick up audio sound, the built-in speaker 115, a voice input/output interface (I/O IF) 116, a display interface (IF) 117 configured to transmit image data to the external display 120 based on the control of the CPU 101, the external device connection interface (IF) 118 configured to connect various external devices, the alarm lamp 119 configured to inform the user of various functional problems of the terminal 10, and a bus line 110 such as an address bus or a data bus for electrically connecting the elements and devices with one another.

The display 120 is a display unit formed of liquid crystal or an organic EL material configured to display images of the subject or icons for operating the terminal 10. Further, the display 120 is connected to the display IF 117 via the cable 120c. The cable 120c may be an analog RGB (VGA) cable, a component video cable, a high-definition multimedia interface (HDMI) (R) cable or a digital video interface (DVI) cable.

The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD).

The external device connection IF 118 may be connected via a universal serial bus (USB) cable with external devices, such as the external camera, the external microphone, and the external speaker. The USB cable is inserted in the connection port 1132 of the housing 1100 shown in FIG. 4. When the external camera is connected to the external device connection IF 118 via the USB cable, the external camera is driven in priority to the built-in camera 112 according to control of the CPU 101. Similarly, when the external microphone or the external speaker is connected, the external microphone or the external speaker is driven in priority to the built-in microphone 114 or the built-in speaker 115 according to control of the CPU 101.

Note that the storage medium 106 is removable from the terminal 10. In addition, if the storage medium 106 is a non-volatile memory configured to retrieve or write data based on the control of the CPU 101, the storage medium 106 is not limited to the flash memory 104, and may be an electrically erasable and programmable ROM (EEPROM).

The above-described programs for the terminal may be recorded in an installable format or in an executable format on a computer-readable recording medium such as the storage medium 106 to distribute the medium. The above-described programs for the terminal may be recorded in the ROM 102 rather than the flash memory 104.

Figure 3:
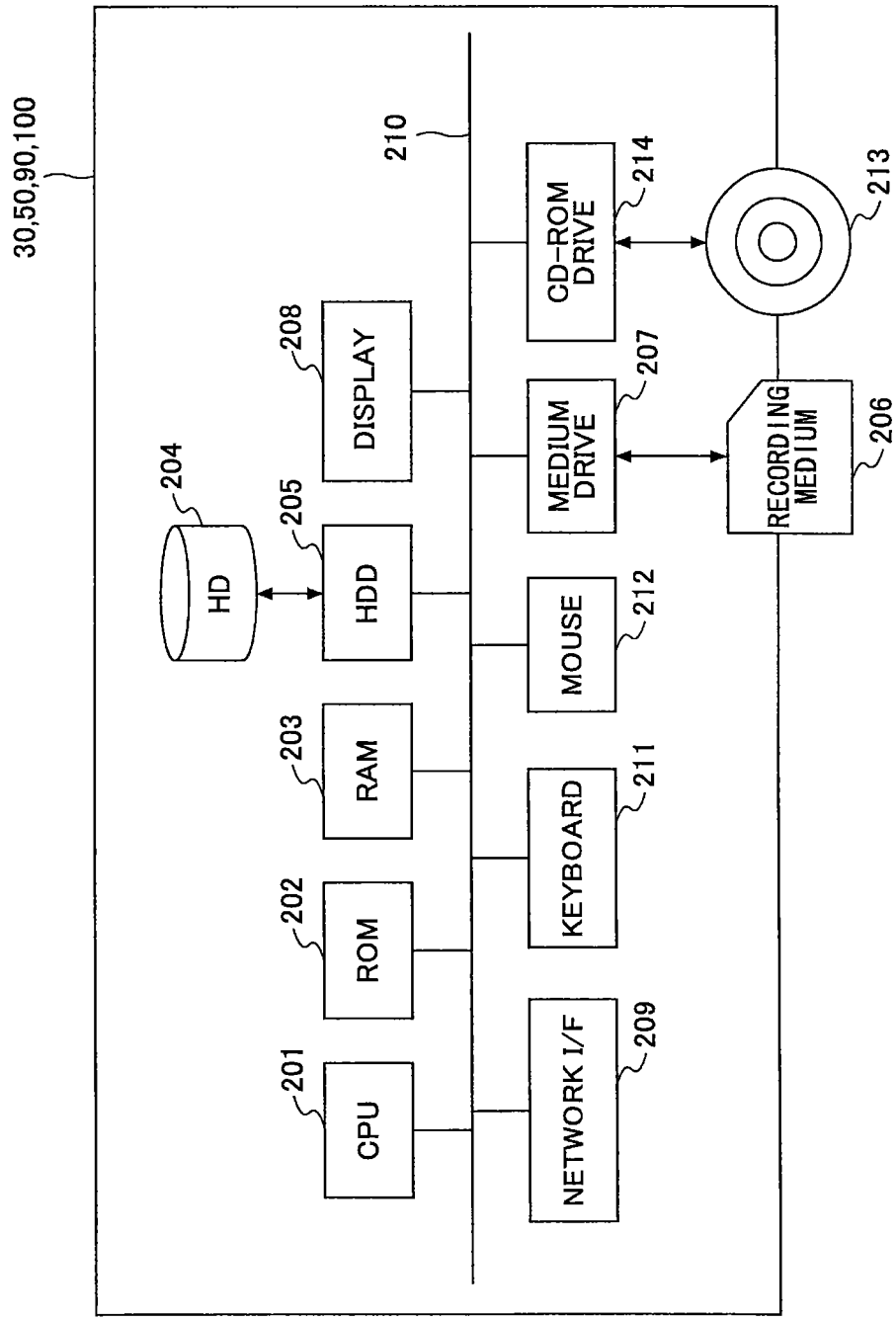
FIG. 3 is a diagram showing a hardware configuration of a transmission management system, a relay device, a program supply system or a maintenance system according to the embodiment.

FIG. 3 is a diagram showing the hardware configuration of the management system 50 according to the embodiment. The management system 50 includes a central processing unit (CPU) 201 configured to control overall operations of the management system 50, a read-only memory (ROM) 202 storing programs for the transmission management, a random access memory (RAM) 203 utilized as a work area of the CPU 201, a hard disk (HD) 204 configured to store various data, a hard disk drive (HDD) 205 configured to control retrieval and writing (storing) of the various data in the HD 204 based on the control of the CPU 201, a medium drive 207 configured to control retrieval and writing (storing) of data into a storage medium 206 such as a flash memory, a display 208 configured to display various information such as a cursor, menus, windows, characters and images, a network interface (IF) 209 for transmitting data utilizing the later-described communication network 2, a keyboard 211 including plural keys for inputting the characters, numerals, and various instructions, a mouse 212 for selecting or executing various instructions, selecting items to be processed, and moving the cursor, a CD-ROM drive 214 configured to control retrieval or writing of data in a compact disk read-only memory (CD-ROM) 213 as an example of a removable recording medium, and a bus line 210 such as an address bus or a data bus for electrically connecting the elements and devices with one another shown in FIG. 3.

Note that the above-described programs for the management system may be in an installable format or in an executable format on a computer-readable recording medium such as the storage medium 206 or the CD-ROM 213 to distribute the medium.

Further, the relay device 30 has a hardware configuration similar to that of the management system 50, and a description of the hardware configuration of the relay device 30 will be omitted. Note that the ROM 202 may store programs for controlling the relay device 30. In this case, the programs for the relay device may also be recorded in an installable format or in an executable format on a computer-readable recording medium such as the storage medium 206 or the CD-ROM 213 to distribute the medium.

Furthermore, the program provision system 90 has a hardware configuration similar to that of the management system 50, and a description of the hardware configuration of the program provision system 90 will be omitted. Note that the ROM 202 may store programs for controlling the program provision system 90. Also In this case, the programs for the program provision system 90 may also be recorded in an installable format or in an executable format on a computer-readable recording medium such as the storage medium 206 or the CD-ROM 213 to distribute the medium.

Furthermore, the maintenance system 100 has a hardware configuration similar to that of the management system 50, and a description of the hardware configuration of the maintenance system 100 will be omitted. Note that the ROM 202 may store programs for controlling the maintenance system 100. Also In this case, the programs for the maintenance system 100 may also be recorded in an installable format or in an executable format on a computer-readable recording medium such as the storage medium 206 or the CD-ROM 213 to distribute the medium.

Note that other examples of the removable recording medium include a compact disc recordable (CD-R), a digital versatile disk (DVD), and a Blu-ray Disc (BD).

Functional Configuration of Transmission System

Figure 5:
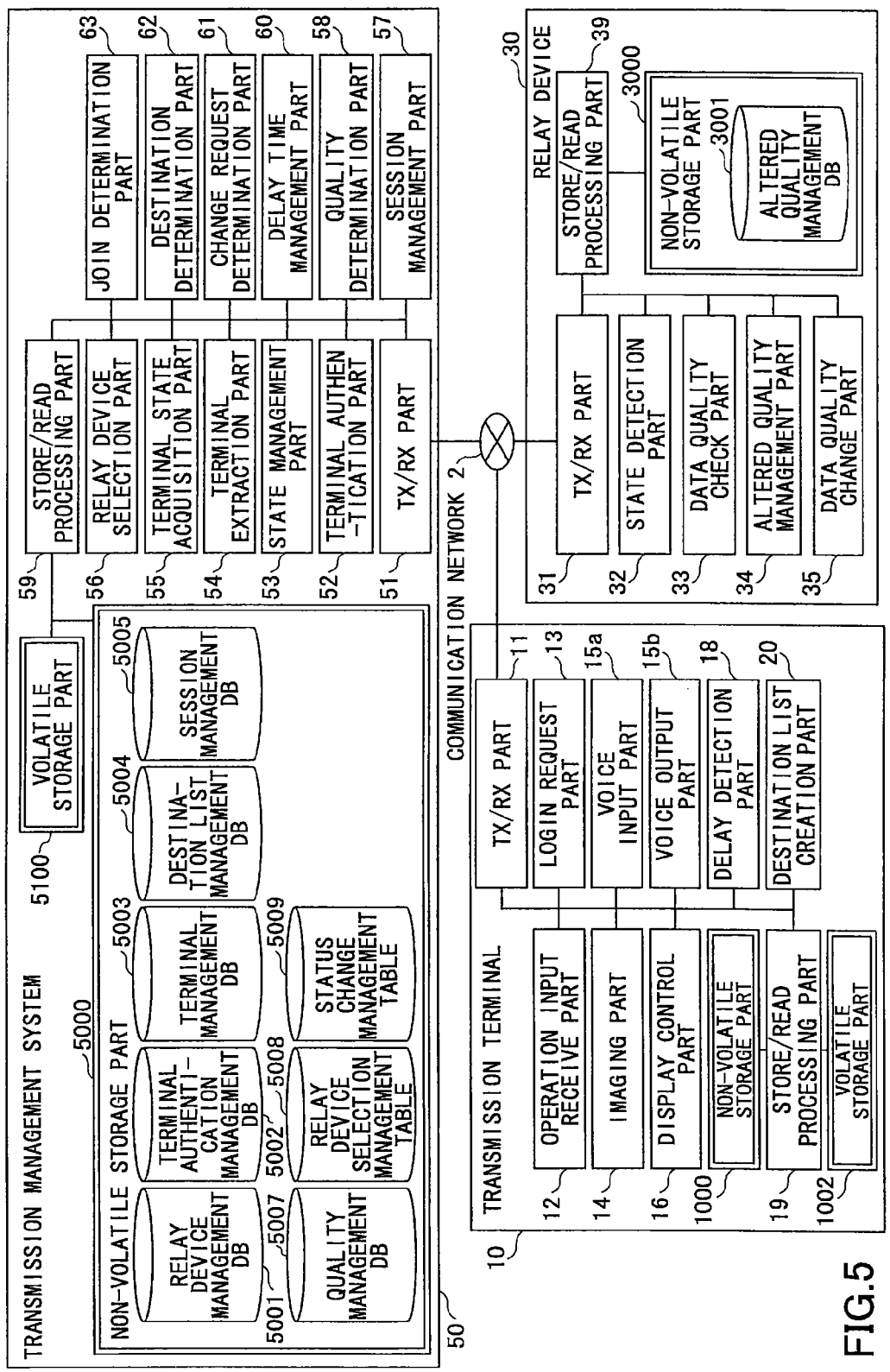
FIG. 5 is a block diagram showing a functional configuration of the transmission terminal, the relay device, and the management system which constitute the transmission system according to the embodiment.

Next, a functional configuration of the transmission system 1 according to the embodiment will be described. FIG. 5 is a block diagram showing a functional configuration of the terminal 10, the relay device 30 and the management system 50 which constitute the transmission system 1 according to the embodiment. As shown in FIG. 5, the terminal 10, the relay device 30, and the management system 50 are connected via the communication network 2 so that they carry out data communications with one another via the communication network 2. Note that the program supply system 90 and the maintenance system 100 shown in FIG. 1 are not directly associated with videoconferencing communications and a description thereof is therefore omitted from FIG. 5.

Functional Configuration of Terminal

The terminal 10 includes a transmitter/receiver (TX/RX) part 11, an operation input receiving part 12, a login request part 13, an imaging part 14, a voice input part 15*a*, a voice output part 15*b*, a display control part 16, a delay detection part 18, a store/read processing part 19, and a destination list creation part 20. These parts represent functions or units implemented by any of the elements and devices shown in FIG. 2, which are activated by the instructions from the CPU 201 based on the programs stored in the ROM 202. Further, the terminal 10 includes a volatile storage part 1002 formed of the RAM 103 shown in FIG. 2 and a non-volatile storage part 1000 formed of the flash memory 104 shown in FIG. 2.

Functional Parts of Terminal

Next, the functional parts of the terminal 10 will be described in more detail. The transmitter/receiver part 11 of the terminal 10 is configured to transmit various data (information) to and receive such data from other terminals, devices and systems via the communication network 2. The function of the transmitter/receiver part 11 is implemented by the network IF 111 shown in FIG. 2.

The transmitter/receiver part 11 is configured to start receiving from the management system 50 status information representing a state of each terminal 10 as a potential destination terminal before the terminal 10 establishes a session with another terminal 10 and starts a video conference.

The potential destination terminal is a terminal 10 with which the terminal 10 may start a video conference (session). Thus, the terminal 10 may not establish a session and start a video conference with other terminal which is not pre-configured as the potential destination terminal. The potential destination terminal is a potential terminal of another party with which the terminal 10 performs a video conference.

The status information represents an operating condition of each terminal 10 (i.e. online or offline) and a detailed status such as "busy" or "stand-by" in the online condition (hereinafter called "communication status"). In addition, the status information may represent not only the operating condition of each terminal 10 but other various conditions such as a cable connection condition (e.g. a cable is disconnected from the terminal 10), an image availability condition (e.g. sound available but image unavailable), and a mute condition. In the following, the status information represents the operating condition and the communication status.

The transmitter/receiver part 11 is configured to transmit a start request to the management system when the terminal 10 operates as a source terminal. The start request is a request for starting a session used for a video conference. In particular, the start request includes information representing a request for starting a session; a terminal ID of the terminal transmitting the start request (source terminal); a terminal ID identifying a destination terminal (another party of the session); and restriction information representing whether other terminals other than the destination terminal are allowed to join the session. The terminal ID identifies the terminal 10.

In particular, the start request includes information representing either "Invite" or "Private Invite". "Invite" is restriction information representing a request for starting a session and that no restriction exists to join the session. On the other hand, "Private Invite" is restriction information representing a request for starting a session and that restriction exists to join the session.

Here, the restriction information is discussed in detail. In the transmission system 1 according to this embodiment, a terminal 10 may join an established session among other terminals. However, there is a need for a restricted session that an unrelated terminal is not allowed to join (e.g. for a highly-confidential conference). Thus, the transmission system 1 restricts the joining of the terminal 10 to the established session depending on the presence or absence of restriction represented in the restriction information.

In this embodiment, a session is established while the joining is restricted with the restriction information. Thus, the start request includes the restriction information representing "Private Invite" in this embodiment.

The transmitter/receiver part 11 is configured to transmit a join request to the management system when the terminal operates as a join request terminal. Here, the join request is a request for joining an established session used for a video conference which has been started. In particular, the join request includes information "Call" representing that this is the join request; a terminal ID of the terminal transmitting the join request (join request terminal); and a terminal ID of a join terminal which has joined the established session. Here, the join terminal is a source terminal or a destination terminal indicated in a start request which has been transmitted for the established session. The transmitter/receiver part 11 may also operate as a start request acquisition part configured to acquire the start request and a join request acquisition part configured to acquire the join request.

The function of the operation input receiving part 12 is implemented by the operation button 108 and the power switch 109 shown in FIG. 2, and the operation input receiving unit 12 configured to receive various inputs from a user. For example, when the user switches ON the power switch 109 shown in FIG. 2, the operation input receiving unit 12 shown in FIG. 5 receives a power-ON signal to switch ON the power of the terminal 10.

The login request part 13 is configured to automatically transmit a login request indicating that the user desires to login and a current IP address of the terminal 10 to the management system 50 via the communication network 2 when the power-ON signal is received by the operation input receiving unit 12 as a trigger. The function of the login request part 13 is implemented by instructions from the CPU 101 shown in FIG. 2. When the user switches OFF the power switch 109, the transmitting/receiving part 11 transmits power-OFF state information to the management system 50, and subsequently the operation input receiving part 12 turns OFF the power supply completely. Accordingly, the management system 50 may detect that the power of the terminal 10 is changed from the power-ON state to the power-OFF state.

The imaging part 14 is configured to take an image of a subject and output image data of the subject, and the function of the imaging part 14 is implemented by instructions received from the CPU 101 shown in FIG. 2 and also by the camera 112 and the image sensor IF 113 shown in FIG. 2. The voice input part 15*a* is configured to input audio data of the audio signal obtained by the microphone 114 that converts voice of the user into the audio signal and output the audio data according to the audio signal. The function of the voice input part 15a is implemented by the voice input/output IF 116 shown in FIG. 2. The voice output part 15b is configured to convert the sound signal according to the voice data into voice and output the voice, and the function of the voice output part 15b is implemented by instructions from the CPU 101 and the voice input/output IF 116 shown in FIG. 2.

The display control part 16 is configured to control transmission of image data to the external display 120, and the function of the display control part 16 is implemented by the display IF 117 shown in FIG. 2. The display control part 16 displays a destination list including potential destination terminals on the display 120. Each state of the terminals is updated depending on the status information received by the transmitter/receiver part 11 before starting a video conference with another terminal 10.

The delay detection part 18 is configured to detect a delay time (ms) of the image data or the voice data transmitted from another terminal 10 via the relay device 30, and the function of the delay detection part 18 is implemented by instructions from the CPU 101 shown in FIG. 2.

The store/read processing part 19 is configured to store various data in the non-volatile storage part 1000 or retrieve various data stored in the non-volatile storage part 1000, and the function of the store/read processing part 19 is implemented by instructions from the CPU 101 shown in FIG. 2 and also by the SSD 105 shown in FIG. 2. The non-volatile storage part 1000 stores the terminal ID (identification) to identify the terminal 10, a password, etc. The store/read processing part 19 is also configured to store various data in the volatile storage part 1002 or retrieve various data stored in the volatile storage part 1002. The volatile storage part 1002 stores and overwrites the content data every time when the terminal 10 receives it from the destination terminal during the video conference. The image data before the overwriting is displayed on the display 120 and the sound data before the overwriting is output from the speaker 115.

The destination list creating part 20 is configured to create and update the destination list shown in FIG. 23 in which statuses of potential destination terminals are expressed by icons based on destination list information received from the management system 50 (described later) and status information about the terminal 10 as a potential destination terminal (also described later).

Functional Configuration of Relay Device

Next, the functional parts of the relay device 30 will be described. As shown in FIG. 5, the relay device 30 includes a transmitter/receiver (TX/RX) part 31, a state detection part 32, a data quality check part 33, an altered quality management part 34, a data quality change part 35, and a store/read processing part 39. These parts represent functions and units implemented by any of the elements and devices shown in FIG. 3, which are activated by instructions from the CPU 201 based on the programs stored in the ROM 202. Further, the relay device 30 further includes a non-volatile storage part 3000 formed of the HD 204 shown in FIG. 3, which may keep various data or information even when the terminal is turned off.

Altered Quality Management Table

Figures 6, 7:
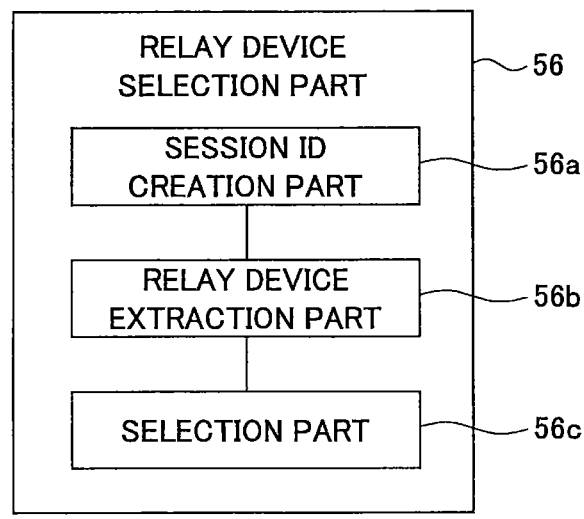
FIG. 6 is a block diagram showing a detailed functional configuration of a relay device selection part according to the embodiment.
FIG. 7 is a diagram showing an altered quality management table.

The storage unit 3000 includes an altered quality management DB (database) 3001 formed of an altered quality management table shown in FIG. 7. FIG. 7 is a diagram showing the altered quality management table. The altered quality management table includes IP addresses of the relay devices 30 used as relay destination terminals in association with image quality of the image data relayed by the respective devices 30.

Herein, the resolution of the image data treated in this embodiment will be described with reference to FIGS. 8A-8C. FIG. 8A represents a base image used as a low-resolution image formed of 160×120 pixels. FIG. 8B represents a medium-resolution image formed of 320×240 pixels. FIG. 8C represents a high-resolution image formed of 640× 480 pixels. When the image data are relayed via a narrow-bandwidth path, the low-resolution image data used as the base image are relayed. When the image data are relayed via a relatively wide bandwidth path, the low-resolution image data used as the base image and the medium-resolution image data exhibiting medium image quality are relayed. When the image data are relayed via an extremely wide bandwidth path, the low-resolution image data used as the base image, the medium-resolution image data exhibiting the medium image quality, and the high-resolution image data exhibiting high image quality are relayed. As in the altered quality management table shown in FIG. 7, if, for example, the relay device 30 relays the image data to the destination terminal having an IP address "1.3.2.4", the quality of the image data relayed is "high image quality".

Functional Parts of Terminal

Next, functional parts of the relay device 30 will be described. Note that in the following, the functions of the relay device 30 are described in association with the main element and devices for implementing the parts of the relay device 30 shown in FIG. 3.

The transmitter/receiver part 31 of the relay device 30 is configured to transmit various data (information) to and receive such data from other terminals, devices and systems via the communication network 2. The function of the transmitter/receiver part 31 is implemented by the network IF 209 shown in FIG. 5. The state detection part 32 is configured to detect an operating condition of the relay device 30 having this state detection part 32. The function of the state detection part 32 is implemented by instructions from the CPU 201 shown in FIG. 3. The operating condition includes "Online", "Offline", and "Out of order".

The data quality check part 33 is configured to search the altered quality management table (FIG. 7) by the IP address of the destination terminal as a search key to extract the corresponding quality of the relayed image data, and confirms the quality of the relayed image data. The function of the data quality check part 33 is implemented by instructions from the CPU 201 shown in FIG. 3. The altered quality management part 34 is configured to modify the content of the altered quality management table in the altered quality management DB 3001 based on the quality information transmitted from the management system 50 (described later). The function of the altered quality management part 34 is implemented by instructions from the CPU 201 shown in FIG. 3. For example, during a video conference between a source terminal using terminal ID "0xaa" (terminal 10aa) and a destination terminal using terminal ID "01db" (terminal 10db), when the delay occurs to transfer the image data due to start of another video conference between a source terminal 10bb and a destination terminal 10ca via the communication network 2, the relay device 30 needs to degrade the quality of the image data which have been relayed from high resolution to medium resolution. In such a situation, the altered quality management part 34 modifies the content of the altered quality management table in the altered quality management DB 3001 so that the quality for the image data that the relay device is relaying decreases from high resolution to medium resolution based on quality information representing medium resolution.

The data quality change part 35 is configured to change the quality of the image data transferred from a source terminal 10 based on the content of the altered quality management table of the altered quality management DB 3001. The function of the data quality change part 35 is implemented by instructions from the CPU 201 shown in FIG. 3. The store/read processing part 39 is configured to store various data in the non-volatile storage part 3000 or retrieve various data stored in the non-volatile storage part 3000, and the function of the store/read processing part 39 is implemented by the HDD 205 shown in FIG. 3.

Functional Configuration of Management System

Next, functions and parts of the management system 50 will be described. The management system 50 includes a transmitter/receiver (TX/RX) part 51, a terminal authentication part 52, a state management part 53, a terminal extraction part 54, a terminal state acquisition part 55, a relay device selection part 56, a session management part 57, a quality determination unit 58, a store/read processing part 59, a delay time management part 60, a change request determination part 61, a destination determination part 62, and a join determination part 63. These units represent functions and units implemented by any of the elements and devices shown in FIG. 3, which are activated by instructions from the CPU 201 based on the programs stored in the ROM 202. Further, the management system 50 further includes a non-volatile storage part 5000 formed of the HD 204 shown in FIG. 3, which may keep various data or information even when the management system 50 is turned off. The non-volatile storage part 5000 stores many kinds of information. Also, the management system 50 further includes a volatile storage part 5100 formed of the RAM 203 shown in FIG. 3, Relay Device Management Table The non-volatile storage part 5000 includes a relay device management DB 5001 formed of a relay device management table shown in FIG. 9. FIG. 9 is a diagram showing the relay-device management table. In the relay device management table, the relay-device IDs of the relay devices 30 are associated with the operating condition of the relay devices 30, the receipt date/time at which the state information indicating the operating condition of the relay devices 30 are received by the management system 50, the IP addresses of the relay devices 30, and the maximum data transmission speeds (Mbps) of the relay devices 30. For example, in the relay-device management table shown in FIG. 9, the relay-device ID "111a" of the relay device 30*a* is associated with the operating state "Online" of the relay device 30*a*, the receipt date/time "13:00 Nov. 10, 2009" at which the state information of the relay device 30*a* is received by the management system 50, the IP address "1.2.1.2" of the relay device 30*a*, and the maximum data transmission speed 100 Mbps of the relay device 30*a*.

Terminal Authentication Management Table

The non-volatile storage part 5000 includes a terminal authentication management DB 5002 formed of a terminal authentication management table shown in FIG. 10. FIG. 10 is a diagram showing the terminal authentication management table. In the terminal authentication management table, passwords are individually associated with the terminal IDs of all the transmission terminals 10 managed by the management system 50. The terminal ID is used to identify the terminal, and the password is used to authenticate the terminal. For example, in the terminal authentication management table shown in FIG. 10, the terminal ID "01aa" of the terminal 10*aa* is associated with the password "aaaa".

The terminal ID or the relay device ID are identifications including any characters, symbols, or signs used to identify the terminal ID or the relay device ID, respectively. The identification may be any combination of the characters, symbols, and signs.

Terminal Management Table

The non-volatile storage part 5000 includes a terminal management DB 5003 formed of a terminal management table shown in FIG. 11. FIG. 11 is a diagram showing the terminal management table. In the terminal management table, terminal IDs of the terminals 10 are associated with names of the terminals 10, operating conditions of the terminals 10, receipt date/time at which the later-described login request information is received by the management system 50, and IP addresses of the terminals 10.

The operating condition includes a condition "Online" in which the terminal is turned on and ready to communicate or communicating and a condition "Offline" in which the terminal is turned off and is not able to communicate.

Meanwhile, the communication status includes "Calling", "Ringing", "Accepted", "Busy", and "None." The "Calling" is a state in which a terminal 10 is calling another terminal 10 (i.e. a terminal 10 has transmitted a start request of a session for a video conference to another terminal 10, and is waiting for a response). The "Ringing" indicates a state in which a terminal is been called by another terminal 10 (i.e. a terminal has receives the start request from another terminal 10, but has not finished responding to the start request yet). The "Accepted" indicates a state in which the response accepting the start request has been transmitted but the session has not been established yet or the response accepting the start request has been received but the session has not been established yet. The "Busy" indicates a state in which the session has been established and the content data in the video conference is being transferred. The "None" indicates a state in which the terminal 10 is not communicating with any other terminal and is ready to respond.

The above-mentioned communication status is used for a session with no restriction to join, which is established by a start request including restriction information indicating that no restriction exists. In the management system 50 according to this embodiment, the communication status for a session with restriction, which is established by a start request including restriction information indicating restriction exists, is managed differently from the communication status for the session with no restriction. Thus, the communication status for a session with restriction includes "Private Calling", "Private Ringing", "Private Accepted", and "Private Busy", which correspond to "Calling", "Ringing", "Accepted", and "Busy", respectively. In this way, in the management system 50 according to this embodiment, since the communication status is managed separately depending on the presence or absence of the restriction to join, the presence or absence of the restriction may be identified by the communication status.

In this embodiment, it is assumed that the restricted session is established. Thus, only "Private Calling", "Private Ringing", "Private Accepted", and "Private Busy" in addition to "None" are used in this embodiment.

For example, in the terminal management table shown in FIG. 11, the terminal 10*aa* using the terminal ID "01aa" has the terminal name "Japan Tokyo Office AA Terminal". Also, the table indicates that the operating condition is "Online", the communication status is "None" indicating no communication with other terminals, the receipt date/time when a login request information is received by the management system 50 is "2009.11.10 13:40" (1:40 p.m., Nov. 10, 2009), and the IP address of the terminal 10*aa* is "1.2.1.3".

The column of the communication status in the terminal management table shown in FIG. 11 indicates that the terminal using the terminal ID "01ba" has a status "Private Calling", the terminal using the terminal ID "01bb" has a status "Private Busy", and the terminal using the terminal ID "01da" has a status "Private Busy".

Destination List Management Table

The non-volatile storage part 5000 includes a destination list management DB 5004 formed of a destination list management table shown in FIG. 12. FIG. 12 is a diagram showing the destination list management table. In the destination list management table, terminal IDs of request source terminals 10 that request initiation of a video conference communication are individually associated with terminal IDs of destination terminals 10 registered as potential destination terminals 10. For example, in the destination list management table shown in FIG. 12, the terminal ID "01aa" of the request source terminal 10aa is associated with a list of terminal IDs of potential destination terminals 10 which the request source terminal 10aa requests to initiate the video conference communication, the potential destination terminals 10 including the terminal 10ab having a terminal ID "01ab", the 10ba having a terminal ID "01ba", the terminal 10db having a terminal ID "01 db", and the terminal 10dc having a terminal ID "01dc". The potential destination terminals 10 may be added or deleted based on instructions from the request source terminal 10 to the management system 50.

Session Management Table

The non-volatile storage part 5000 includes a session management DB 5005 formed of a session management table shown in FIG. 13. FIG. 13 is a diagram showing the session management table. In the session management table, session IDs that identify sessions in which the communication data are transmitted and received between the terminals are associated with the relay device IDs of the relay devices 30 utilized for relaying the image data and the audio data, the terminal ID of the request source terminal 10, the terminal IDs of the destination terminals 10, delay time (ms) in receiving the image data by the destination terminals 10, and receipt date/time at which the delay information indicating the delay time transmitted from each of the destination terminals 10 is received by the management system 50. For example, in the session management table illustrated in FIG. 13, the relay device 30e (having the relay device ID "111e") selected for executing the session having the session ID "se1" is associated with the request source terminal 10aa having the terminal ID "01aa" that has a video conference with the destination terminal 10db having the terminal ID "01db". The session management table indicates that the delay time is 200 ms in receiving the image data by the destination terminal 10db at the receipt date/time "2009.11.10 14:00" (2:00 p.m., Nov. 10, 2009). Note that if the video conference is conducted between the two terminals 10, the receipt date/time of the delay information may be managed not based on the destination terminals but based on the delay information transmitted from the request source terminal. However, if the videoconference is conducted between three or more terminals 10, the receipt date/time of the delay information may be managed based on the delay information transmitted from the terminals 10 on the reception side of the image data and the audio data.

Quality Management Table

The non-volatile storage part 5000 further includes a quality management DB 5007 formed of a quality management table shown in FIG. 14. FIG. 14 is a diagram showing the quality management table. In the quality management table, the delay time (ms) of the image data in the request source terminal or the destination terminal is associated with the image quality (quality of image) of the image data relayed by the relay device 30.

Relay Device Management Table

The non-volatile storage part 5000 includes a relay device management DB 5001 formed of a relay device management table shown in FIG. 15. FIG. 15 is a diagram showing the relay device management table. In the relay device management table, the terminal ID of the terminal 10 is associated with the relay device ID of the relay device 30 used for relaying the content data.

Status Change Management Table

The non-volatile storage part 5000 further includes a status change management DB 5009 formed of a status change management table shown in FIGS. 16 and 17. FIGS. 16 and 17 are diagrams showing the status change management tables. In the status change management table shown in FIG. 16, a change request representing a request to change communication status between the terminals is associated with a pre-change status representing a communication status before a state management part 53 (discussed later) changes it and a post-change status representing a communication status after the state management part 53 has changed it. In the status change management table shown in FIG. 17, the change request is associated with the terminal IDs identifying the source terminal and the destination terminal, the pre-change status, and the post-change status.

In the status change management table shown in FIG. 17, when the management system 50 receives the change request "Private Invite", the state management part 53 changes the pre-change status "None" of the source terminal to "Private Calling" and the pre-change status "None" of the destination terminal to "Private Ringing". The change request includes "Invite", "Private Invite", and "Accept" shown in FIG. 17, and "Join", "Call", and "Leave" shown in FIG. 16.

In this embodiment, it is assumed that the restricted session is established. Thus, only "Private Accepted", "Private Busy", "Private Calling", "Private Ringing", "Private Accepted", and "Private Busy" are used as the pre-change status and the post-change status in FIGS. 16 and 17. From the same reason, the change request "Invite" shown in FIG. 17 is not used in this embodiment.

The change request "Invite" is included in the start request. The change request "Accept" is a request for a receipt of a response for the start request, and represents an acceptance to establish a session (start communications). The change request "Join" is a request for the completion for establishing the session, and represents a request to start relaying content data. The change request "Call" is included in a join request, and represents a request to join the established session. The change request "Leave" is a request to leave the session.

Functional Parts of Management System

Next, functional parts of the management system 50 will be described. Note that in the following, the functions of the management system 50 are described in association with the main element and devices for implementing the parts of the management system 50 shown in FIG. 3.

The transmitter/receiver part 51 of the management system 50 is configured to transmit various data (information) to and receive the data from other terminals, relay devices and systems via the communication network 2. The function of the transmitter/receiver unit 51 is implemented by the network IF 209 shown in FIG. 3. The terminal authentication part 52 is configured to search the terminal authentication management table (FIG. 10) of the non-volatile storage unit 5000 by the terminal ID and the password received via the transmitter/receiver unit 51 as search keys, and authenticate the corresponding terminal based on whether the terminal ID and the password contained in the login request information are identical to those managed in the terminal authentication management table.

Furthermore, when a join determination part 63 (discussed later) determines that an established session is restricted and a terminal transmitting a join request is not allowed to join the session, the transmitter/receiver part 51 works as a notification part to notify the terminal of failing to join the session.

The state managing unit 53 is configured to manage the operating condition and the communication status in the terminal management table shown in FIG. 11. In order to manage the operating condition of the login request terminal 10, the state managing unit 53 is configured to store the terminal ID of the login request terminal, the operating condition of the login request terminal, the receipt date/time at which the login request information is received by the management system 50, and the IP address of the login request terminal in the terminal management table (FIG. 11) while associating them. When a user of the terminal 10 switches on the power switch 109, the state management part 53 changes the operating condition indicating "Offline" in the terminal management table (FIG. 11) to "Online" based on information representing that the terminal 10 is turned on, which is received from the terminal 10. On the other hand, when a user of the terminal 10 switches off the power switch 109, the state management part 53 changes the operating condition indicating "Online" in the terminal management table (FIG. 11) to "Offline" based on information representing that the terminal 10 is turned off, which is received from the terminal 10.

When transmitter/receiver part 51 receives a change request from a source terminal transmitting the start request of the video conference or a destination terminal, based on the change request, the state management part 53 changes at least one of the communication status and the operating condition of at least one of the source terminal and the destination terminal in the terminal management table (FIG. 11).

Figure 18:
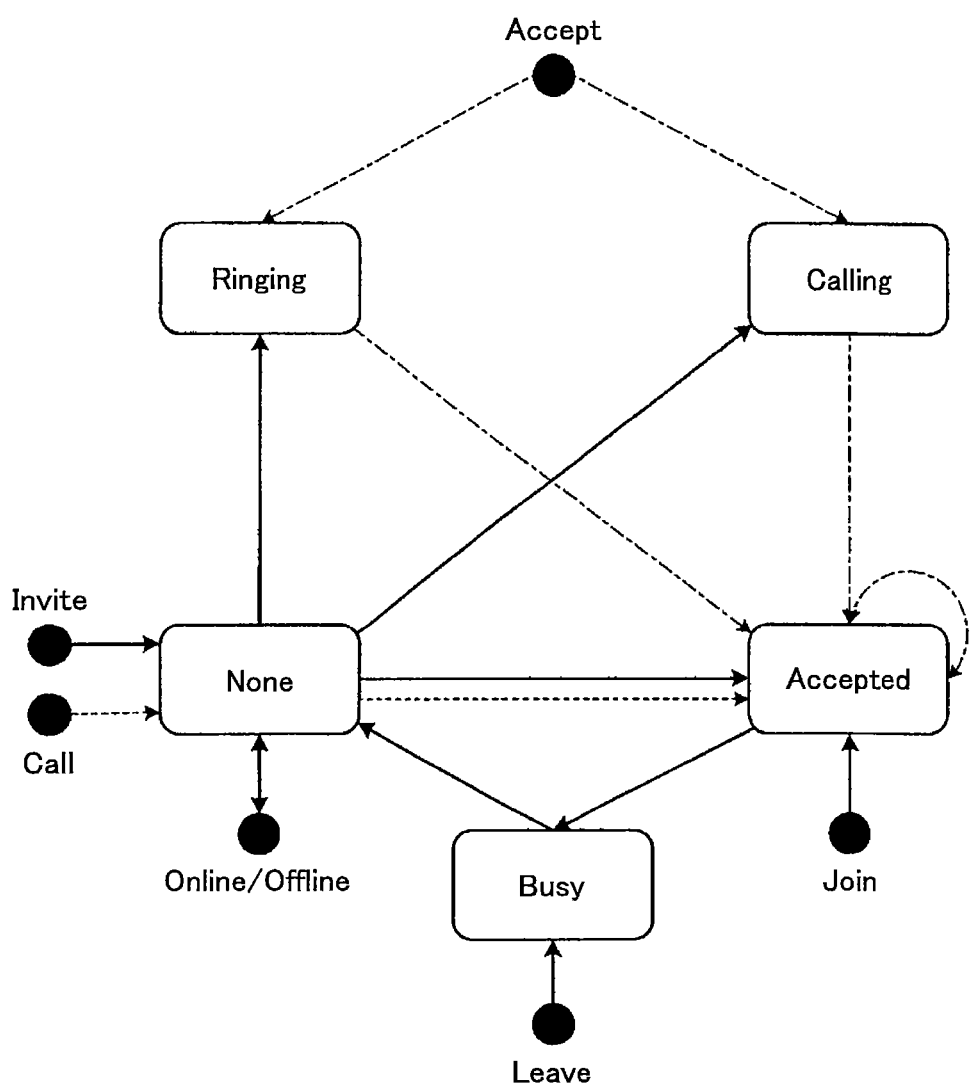
FIG. 18 is a state transition diagram showing communication statuses.
Figure 19:
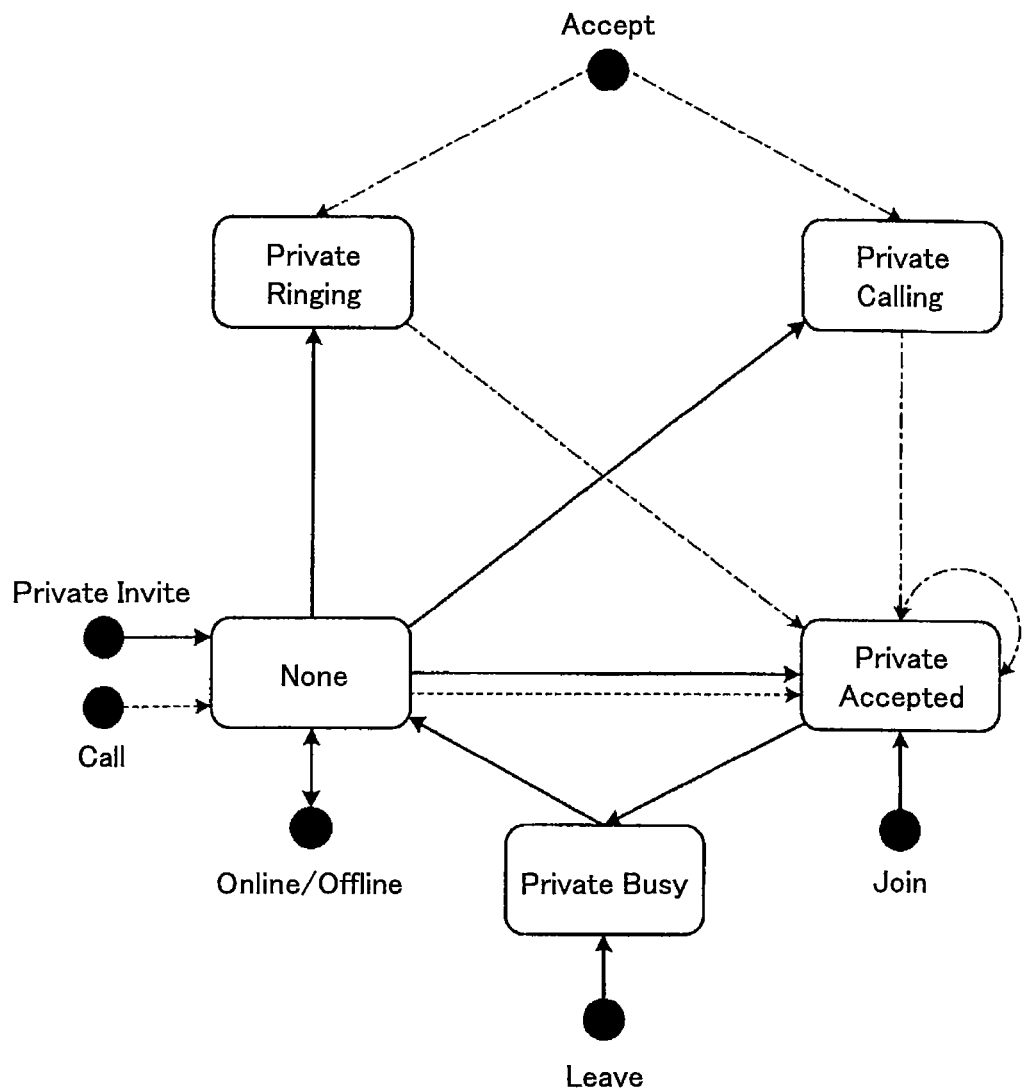
FIG. 19 is a state transition diagram showing communication statuses.

FIGS. 18 and 19 are state transition diagrams showing the communication status managed by the state management part 53. The state management part 53 changes the communication status of the terminal 10 according to rules for state transitions (FIGS. 18 and 19) while referring to the status change management table shown in FIGS. 16 and 17. In this embodiment, the diagram shown in FIG. 19 is used because it is assumed that the restricted session is established.

For example, when the change request "Accept" is received and the communication status of the terminal 10 is "Private Ringing" or "Private Calling", the state management part 53 changes the status to "Private Accepted". In addition, when the communication status of the terminal 10 is "Private Accepted", the state management part 53 keeps the status as "Private Accepted".

In the transmission system 1, in order to achieve the change of the status performed by the state management part 53, the exemplary status change management tables shown in FIGS. 16 and 17 are used, but this invention is not limited to the example. In other examples, the state management part 53 may be configured with a management system program to change the communication status according to the rules for the communication status indicated in the state transition diagrams shown in FIGS. 18 and 19.

The terminal extraction part 54 is configured to search the destination list management table (FIG. 12) by the terminal ID of a target terminal such as a request source terminal 10 which has sent the login request as a search key, and retrieve the terminal IDs of the potential destination terminals 10 capable of communicating with the request source terminal 10. In particular, the terminal extraction part 54 reads the terminal IDs of the potential destination terminals 10 which are associated with the terminal ID of the target terminal (corresponding to the terminal ID of the source terminal) in the destination list management table (FIG. 12).

Further, the terminal extraction part 54 is configured to search the destination list management table by the terminal ID of the target terminal as a search key, and extract terminal IDs of other terminals 10 which have registered the above terminal ID of the target terminal as a potential destination terminal. In particular, the terminal extraction part 54 reads the terminal IDs of the source terminals 10 which are associated with the terminal ID of the potential destination terminal (corresponding to the terminal ID of the target terminal) in the destination list management table (FIG. 12).

The terminal state acquisition part 55 is configured to search the terminal management table (FIG. 11) by each terminal ID as a search key, and retrieve the operating condition and the communication status for each terminal ID. Thus, the terminal state acquisition part 55 receives the operating condition of the potential destination terminal 10 capable of communicating with the request source terminal 10 which has sent the login request. Further, the terminal state acquisition part 55 is configured to search the terminal management table, and acquire the operating condition of the request source terminal 10 which has sent the login request.

The relay device selection part 56 is configured to select one of the relay devices 30. The function of the relay device selection part 56 including a session ID creation part 56a, a relay device extraction part 56b, and a selection part 56c shown in FIG. 6 is implemented by instructions from the CPU 201 shown in FIG. 3 FIG. 6 is a block diagram showing a detailed functional configuration of the relay device selection part 56.

The session ID creation part 56a is configured to create a session ID to identify a session for transferring content data between the terminals. The relay device extraction part 56b is configured to extract a relay device ID by referring to the relay device management table (FIG. 15) based on the terminal ID of a source terminal included in a start request transmitted by the source terminal and the terminal ID of a destination terminal. The selection part 56c is configured to select one or more of the relay devices 30 managed in the relay device management table (FIG. 9) by selecting the relay device IDs of the relay devices 30 in which the operating condition is "Online".

The session management part 57 is configured to store and manage the session management table (FIG. 13) of the storage unit 5000 by associating the session IDs generated by the session ID generation part 56a with the terminal ID of the request source terminal and the terminal ID of the destination terminal. Further, the session management part 57 is configured to store and manage the relay device ID of the relay device 30 finally selected for every session ID in the session management table.

Furthermore, the session management part 57 is configured to search the session management table (FIG. 13) by the terminal ID of the join terminal which has joined the session specified by a join request, and extracts the session ID of the session. In particular, the session management part 57 uses the terminal ID of the source terminal or the destination terminal corresponding to the terminal ID of the join terminal as a search key in the session management table (FIG. 13). Next, the session management part 57 extracts the session ID associated with the terminal ID.

The quality determination part 58 is configured to search the quality management table (FIG. 14) by the delay time as a search key, extract the image quality of the corresponding image data, and determine the image quality of the image data relayed by the relay device 30. The store/read processing part 59 is configured to store various data in the non-volatile storage part 5000 and retrieve various data from the non-volatile storage part 5000. The function of the store/read processing part 59 is implemented by the HDD 205 shown in FIG. 3. Also, the store/read processing part 59 is configured to store various data in the volatile storage part 5100 and retrieve various data from the non-volatile storage part 5100.

The delay time managing part 60 is configured to search the terminal management table (FIG. 11) by the IP address of the destination terminal 10 as a search key, and extract the corresponding terminal ID. Further, the delay time managing part 60 is configured to store the delay time indicated by the delay information in a delay time field of the record corresponding to the extracted terminal ID in the session management table (FIG. 13).

The change request determination part 61 is configured to read a change request, and determines whether the change request is a predetermined change request. Here, the predetermined change request includes "Invite", "Private Invite", and "Accept". Thus, the predetermined change request is indicated in the status change management table shown in FIG. 17.

The destination determination part 62 is configured to refer to the destination list management table (FIG. 12), and determines whether the destination terminal IDs which have joined the content data session "sed" extracted by the terminal extraction part 54 include the destination terminal ID specified by the join request terminal 10.

The join determination part 63 is configured to refer to the restriction information corresponding to an established session when the transmitter/receiver part 51 receives a join request to the established session from a terminal, and determines whether to allow the join request terminal transmitting the join request to join the established session.

In particular, the join determination part 63, responding to the receipt of the join request, disallows the join request terminal to join the established session when the restriction information indicates that the session is restricted.

Process/Operation of Embodiment

Figure 20:
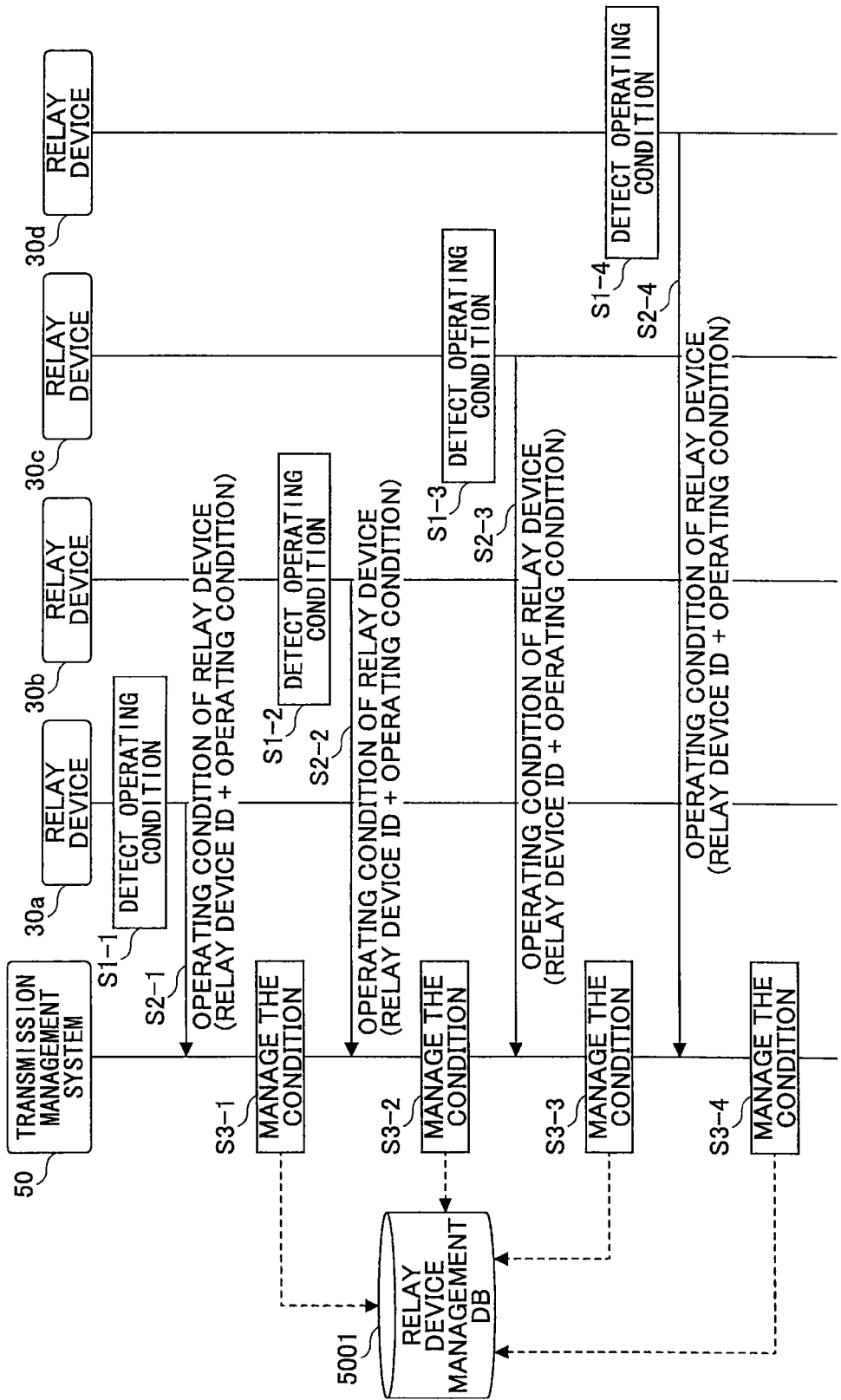
FIG. 20 is a sequence diagram for explaining a process to manage condition information representing operating condition of each relay device.
Figure 21:
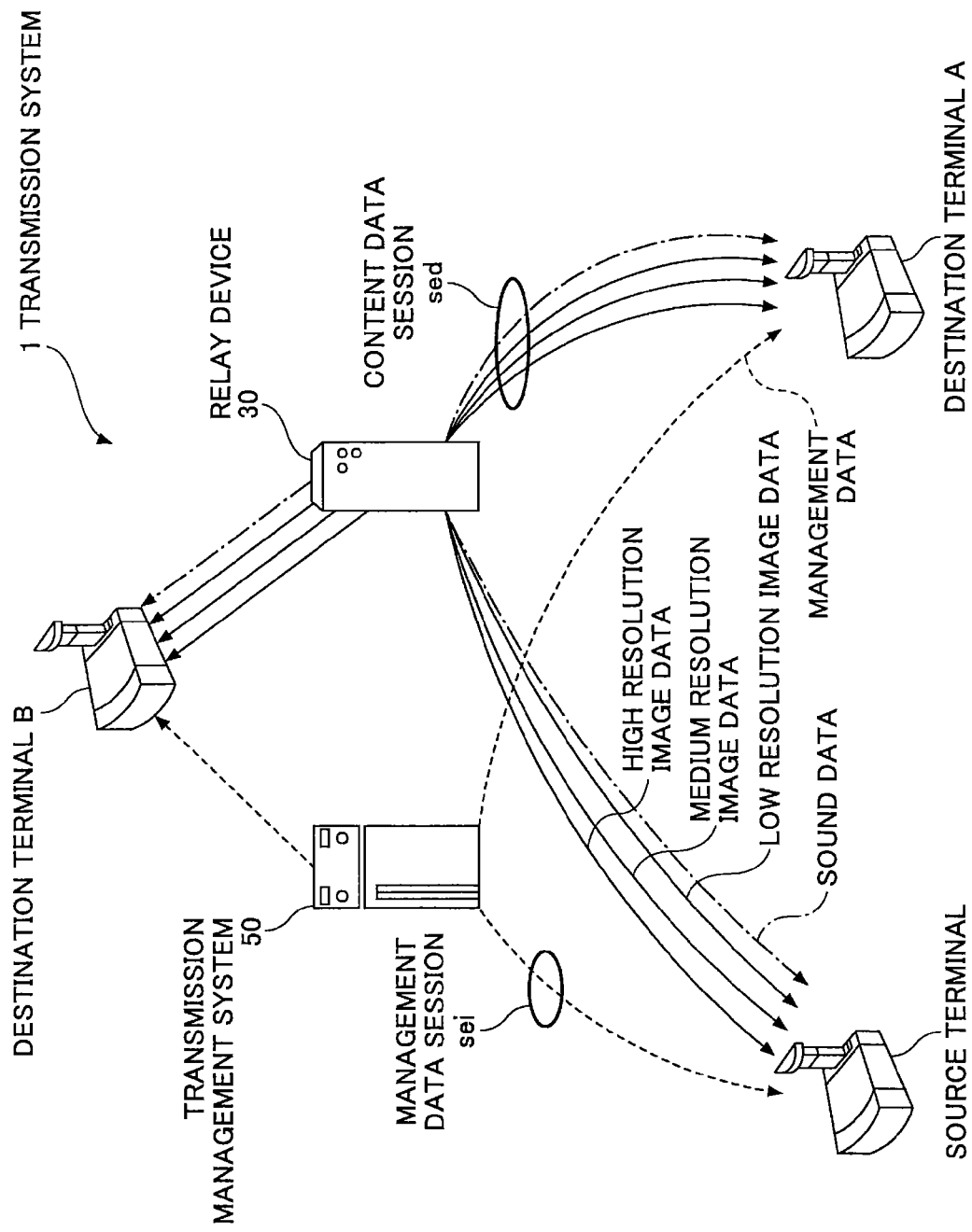
FIG. 21 is a diagram showing communications of content data and management information in the transmission system.
Figure 22:
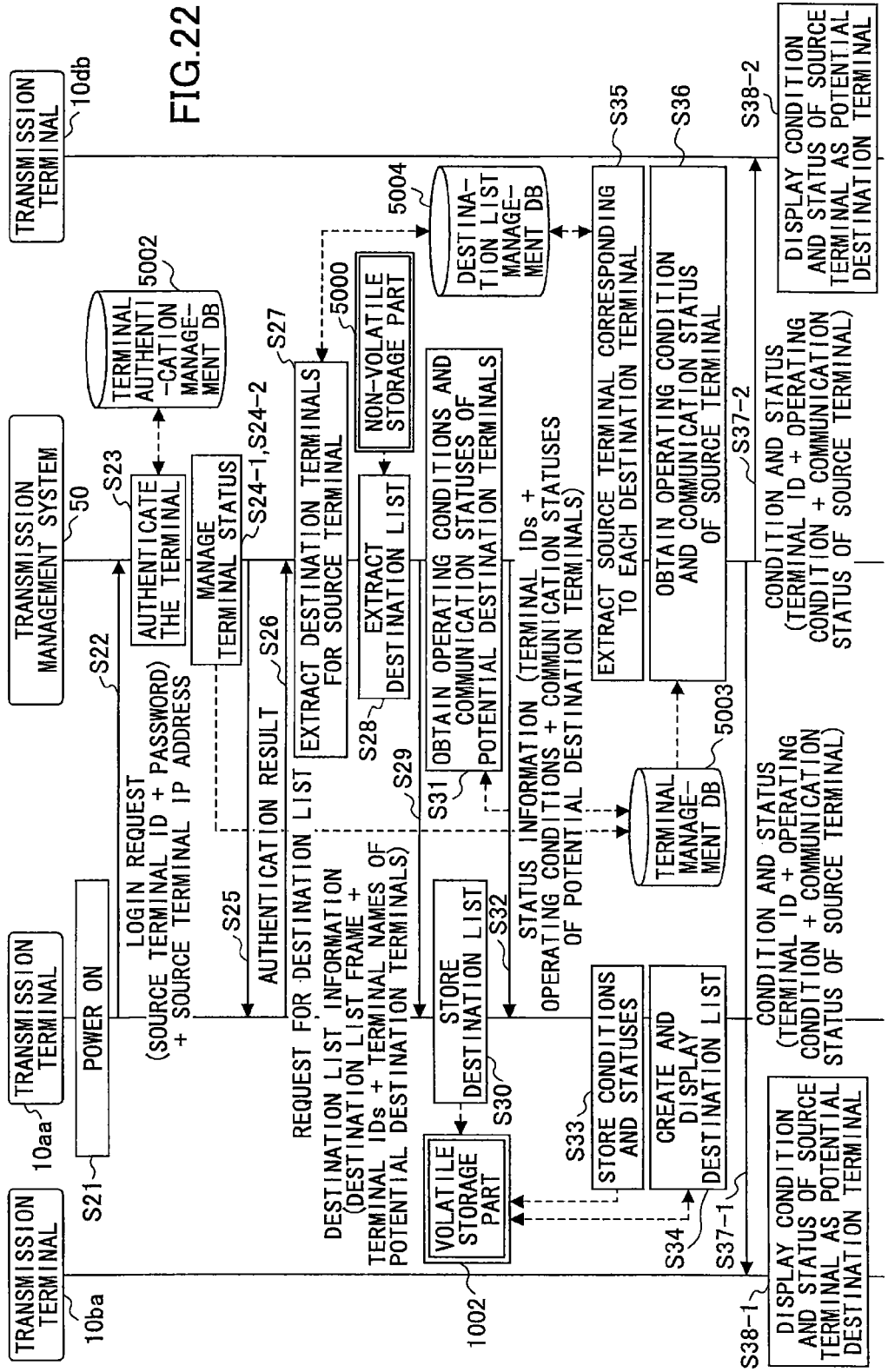
FIG. 22 is a sequence diagram for explaining a preparatory process to start communication between transmission terminals.
Figure 24:
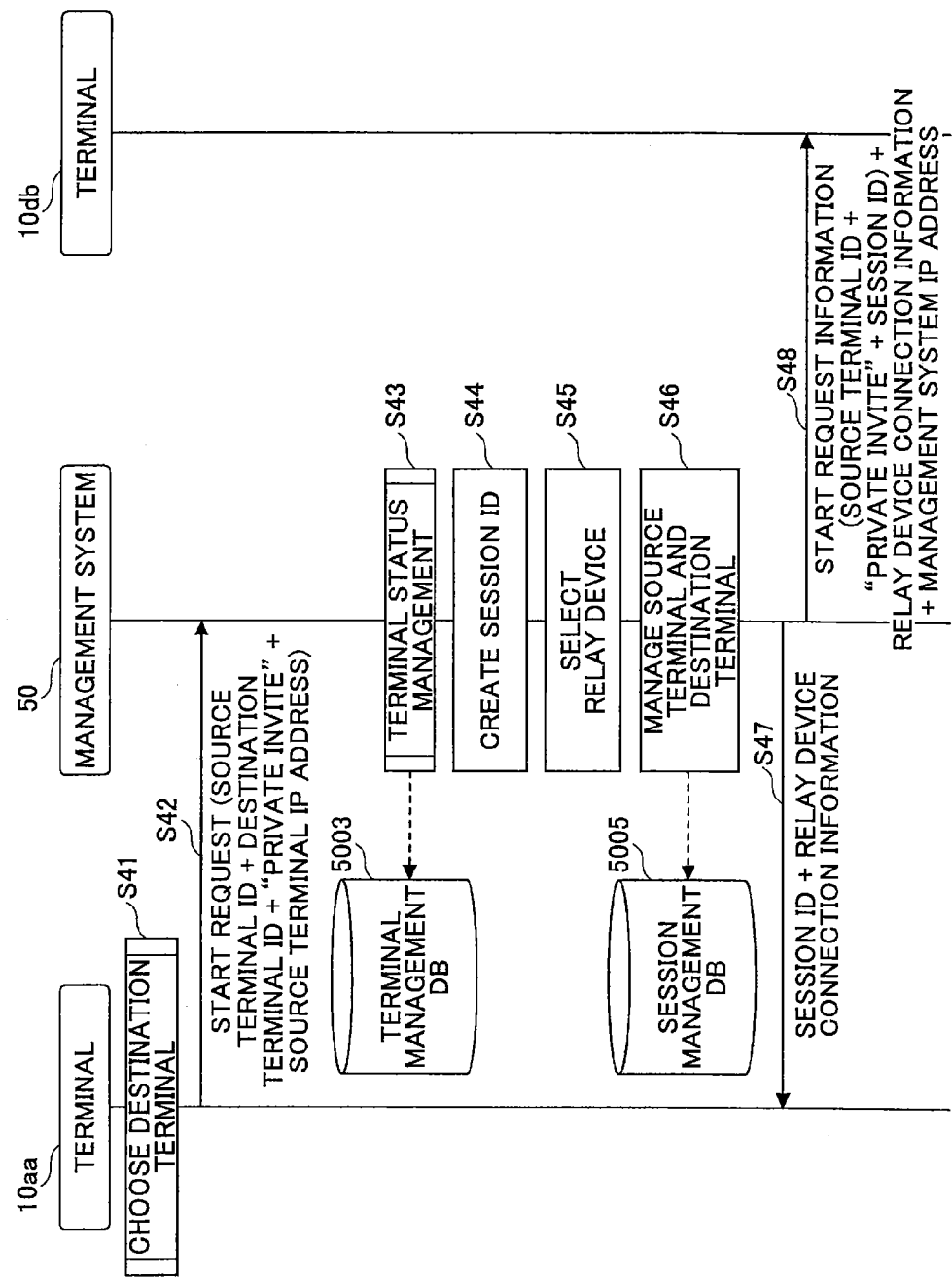
FIG. 24 is a sequence diagram for explaining a process to request for starting a communication.
Figure 25:
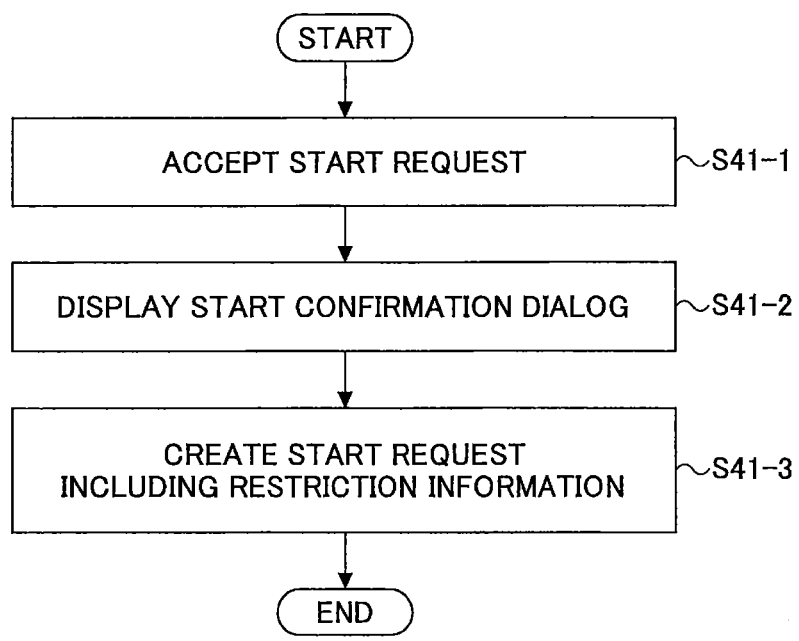
FIG. 25 is a detailed flowchart for explaining a process to choose a destination performed by the requesting terminal (source terminal)
Figure 26:
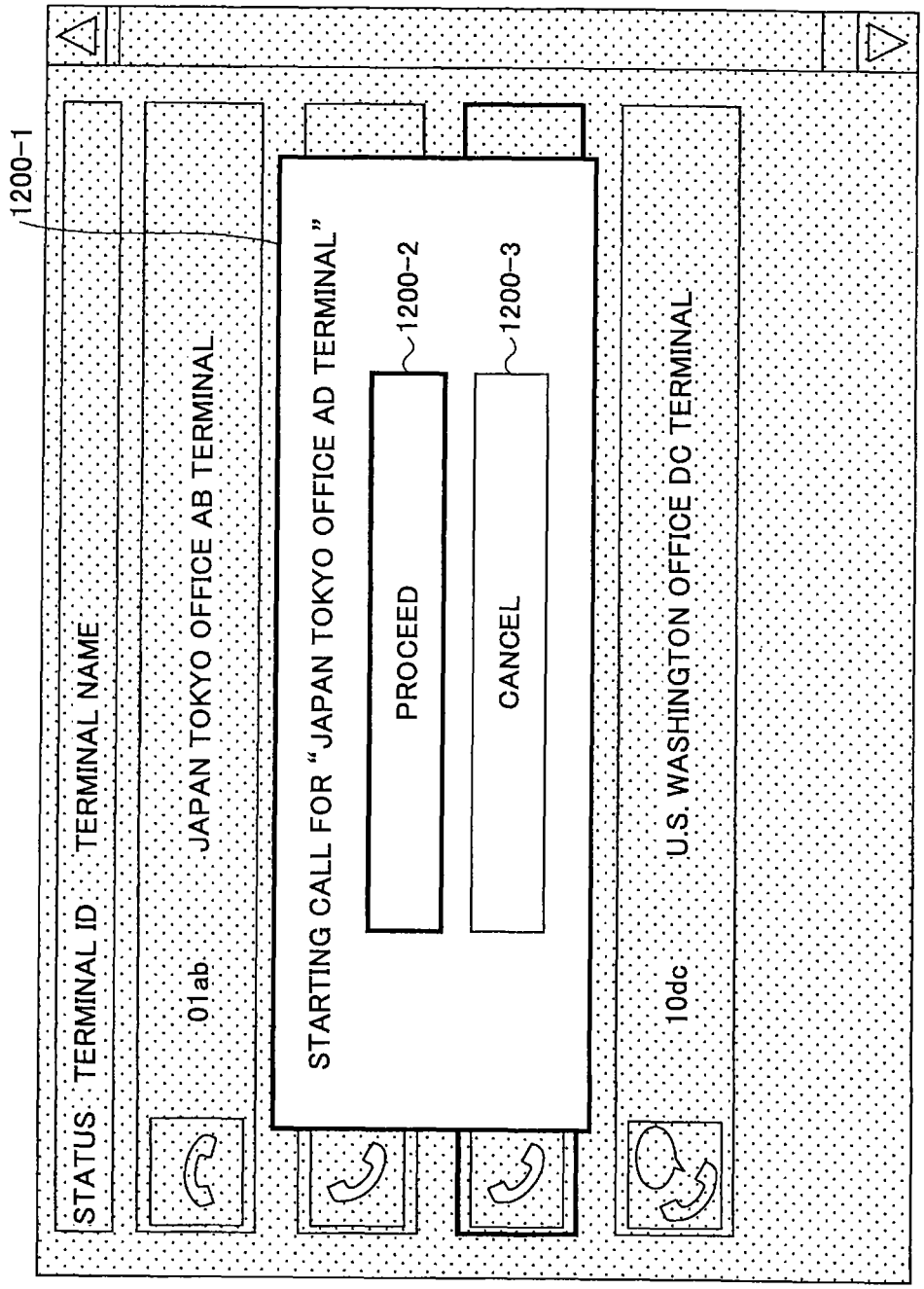
FIG. 26 is a diagram showing an example screen of a start confirmation dialog.
Figure 27:
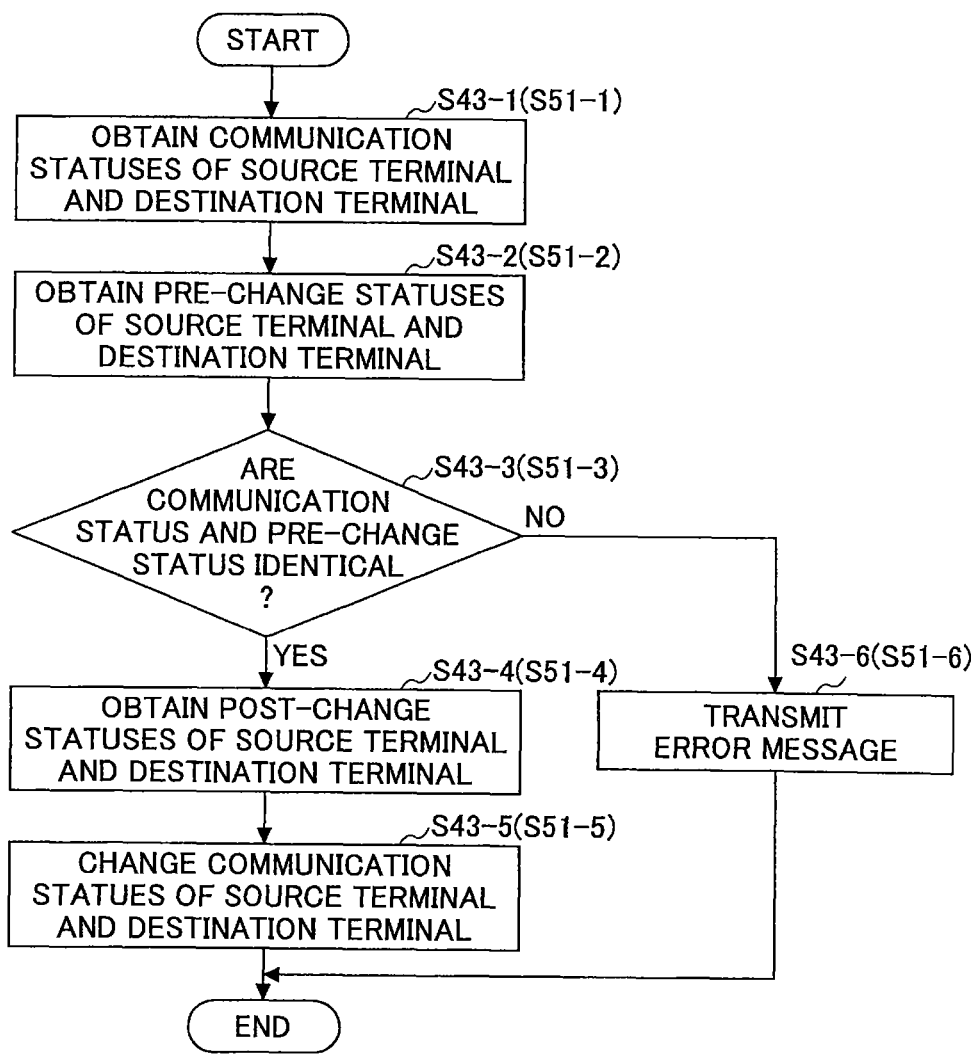
FIG. 27 is a flowchart for explaining a process to change the communication status.
Figure 28:
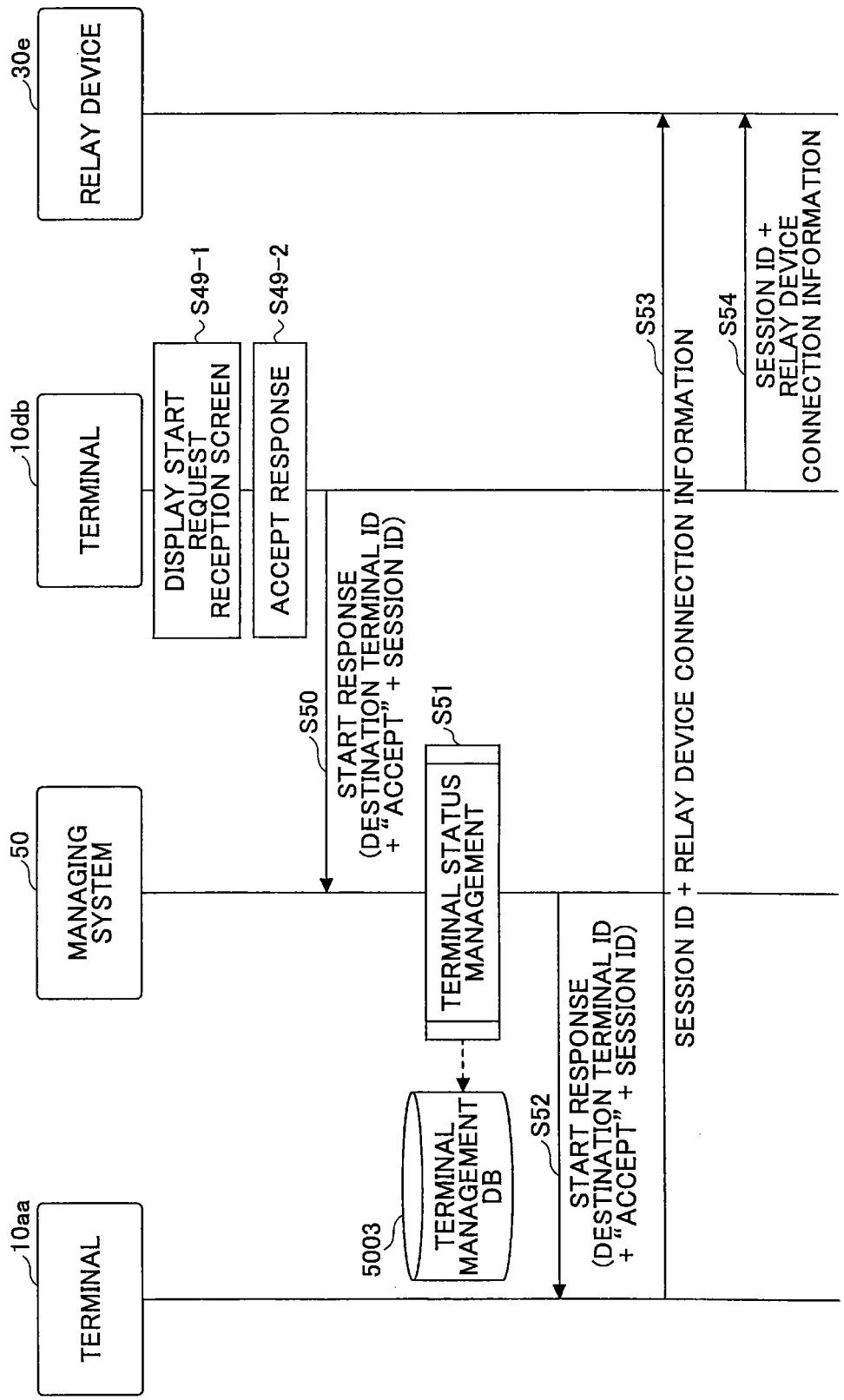
FIG. 28 is a sequence diagram for explaining a process to accept the request for starting the communication.
Figure 29:
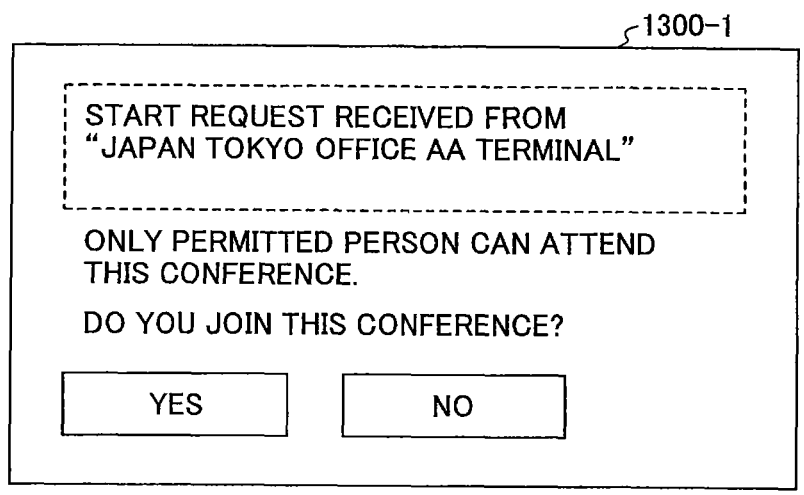
FIG. 29 is a diagram showing an example of a start request reception screen.
Figure 30:
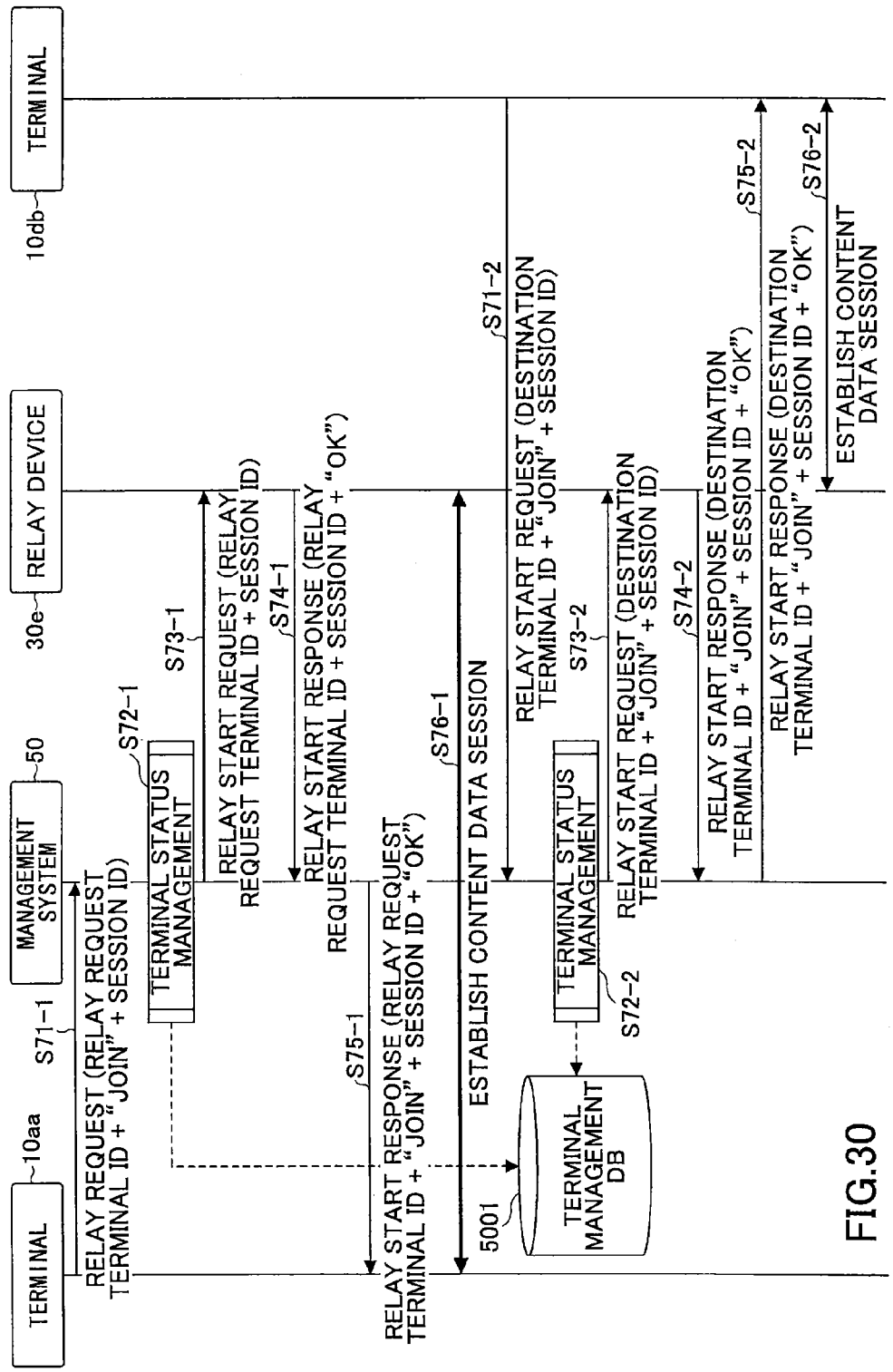
FIG. 30 is a sequence diagram for explaining a process to request for relaying the content data.
Figure 31:
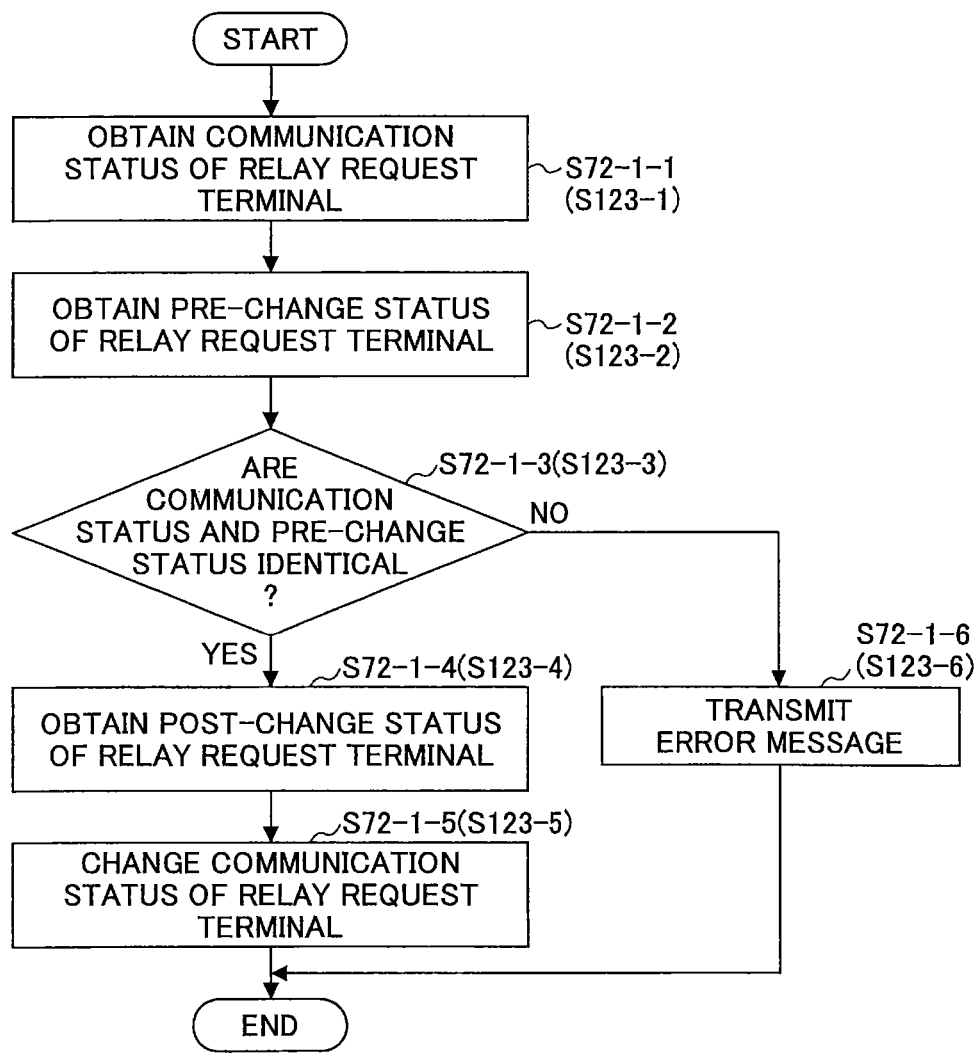
FIG. 31 is a flowchart for explaining a process to change the communication status.
Figure 32:
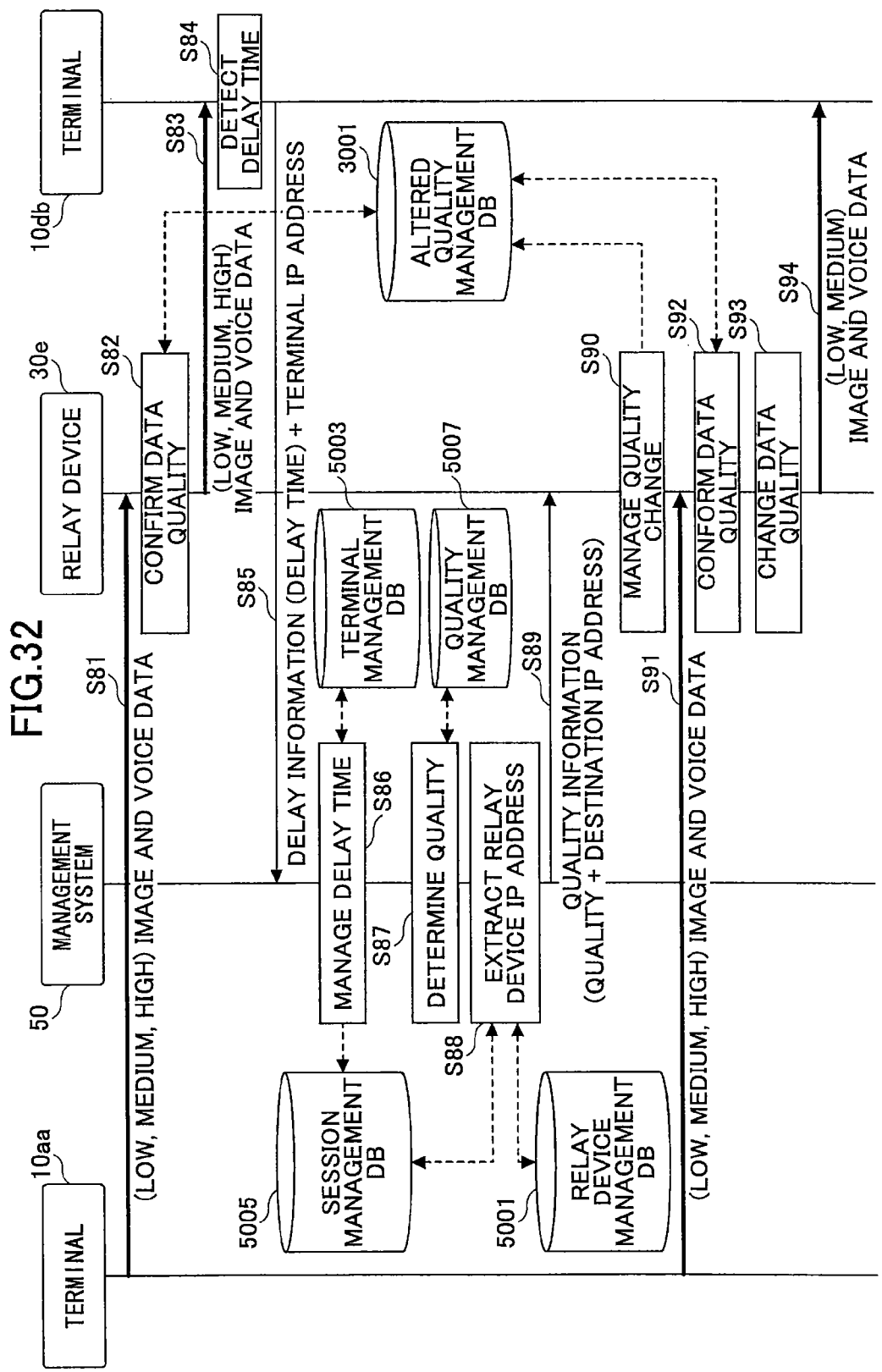
FIG. 32 is a sequence diagram for explaining a process to communicate the content data between the transmission terminals.
Figure 33:
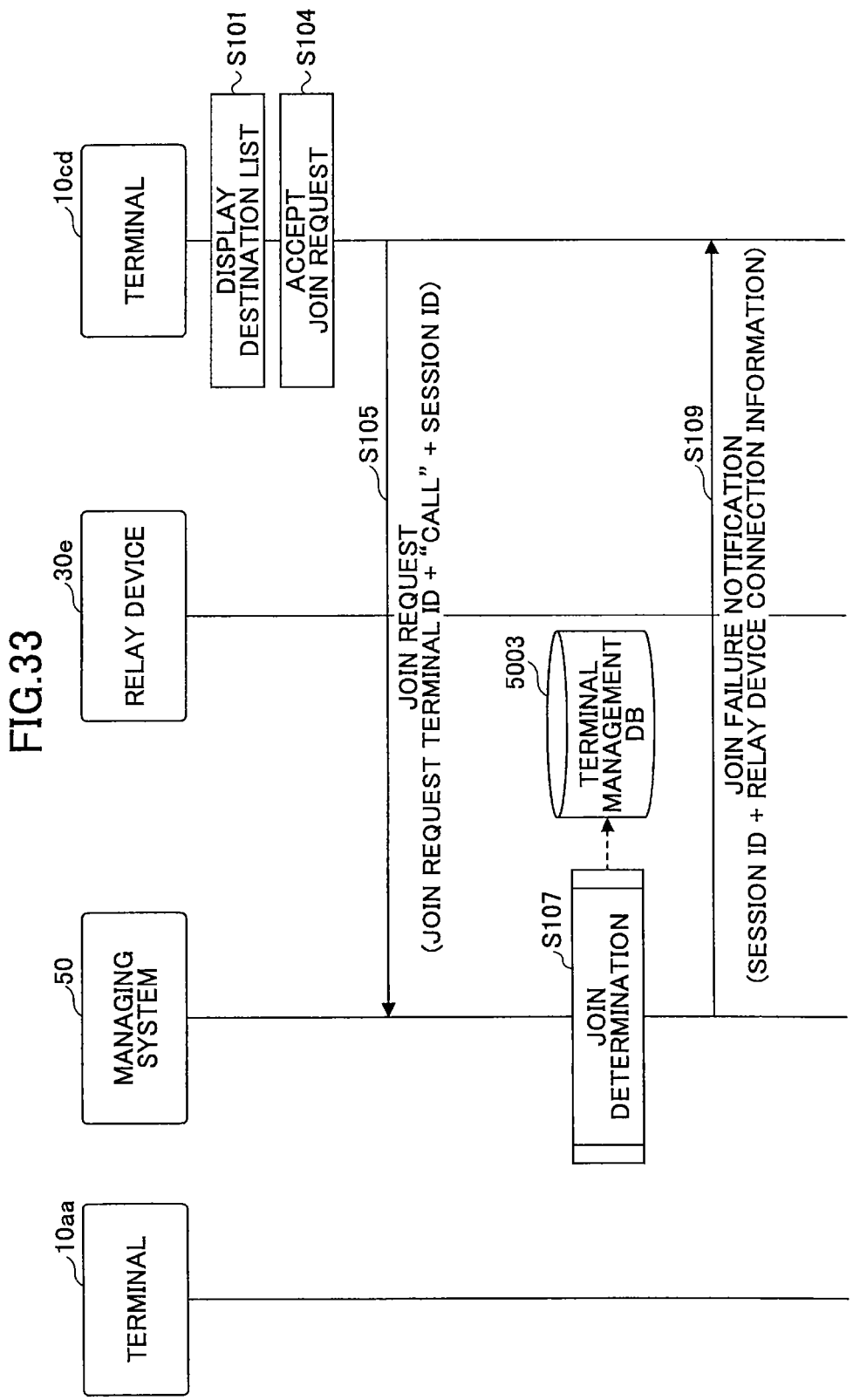
FIG. 33 is a sequence diagram for explaining a process to transmit a join request for joining a content data session.
Figure 35:
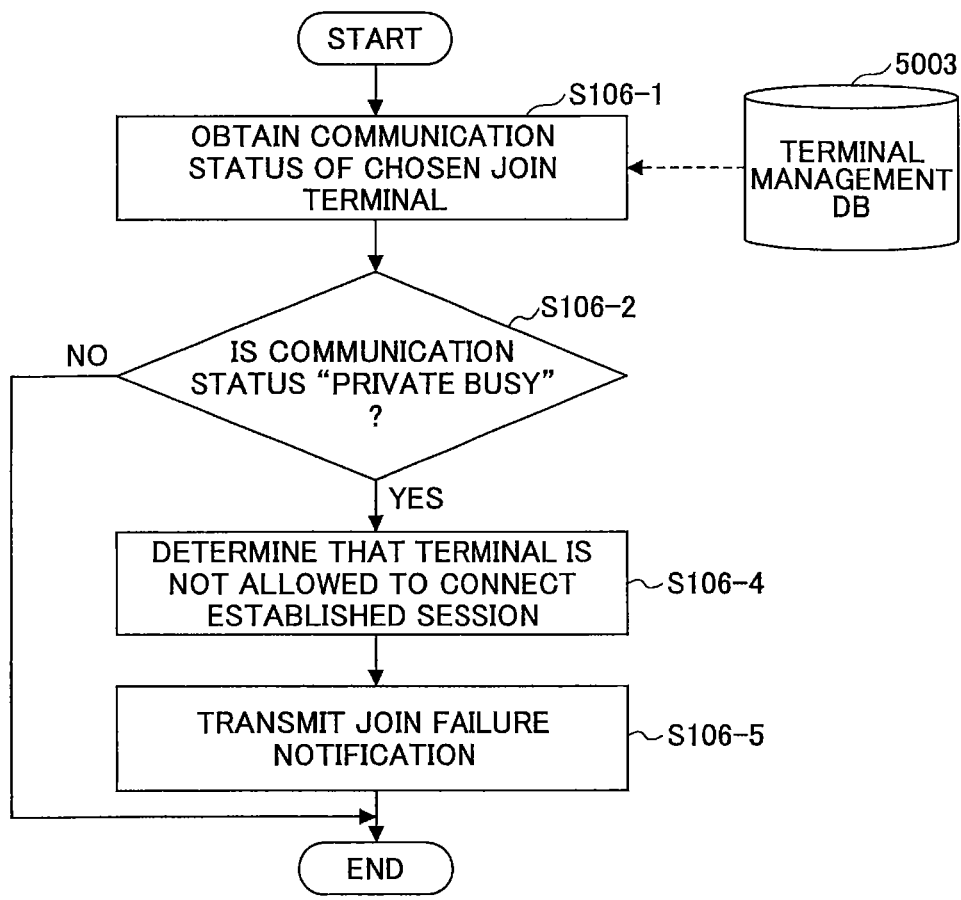
FIG. 35 is a flowchart for explaining a process to determine whether to accept the join request based on the communication status.
Figure 36:
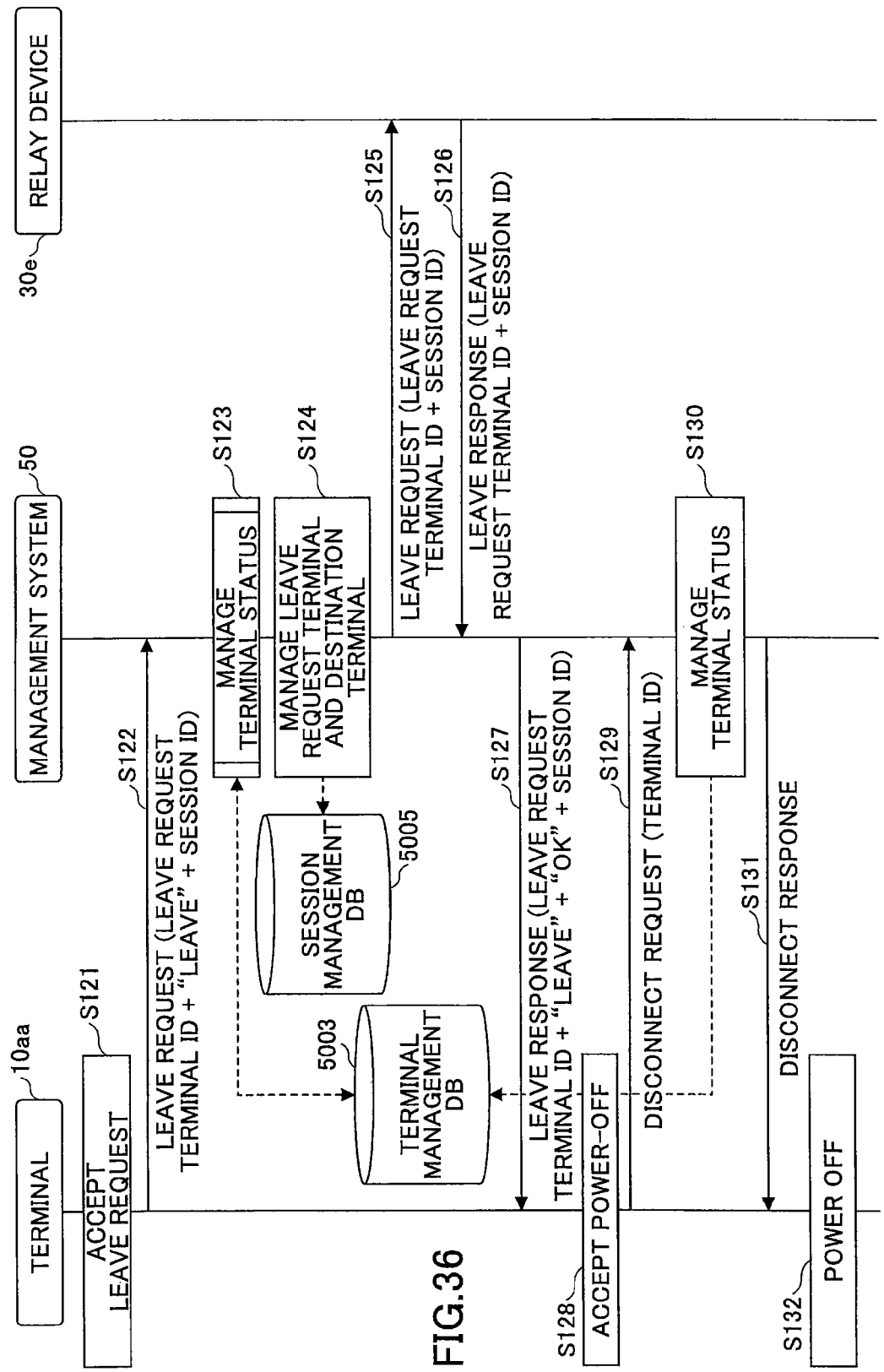
FIG. 36 is a sequence diagram for explaining a process to leave the content data session.
Figure 37:
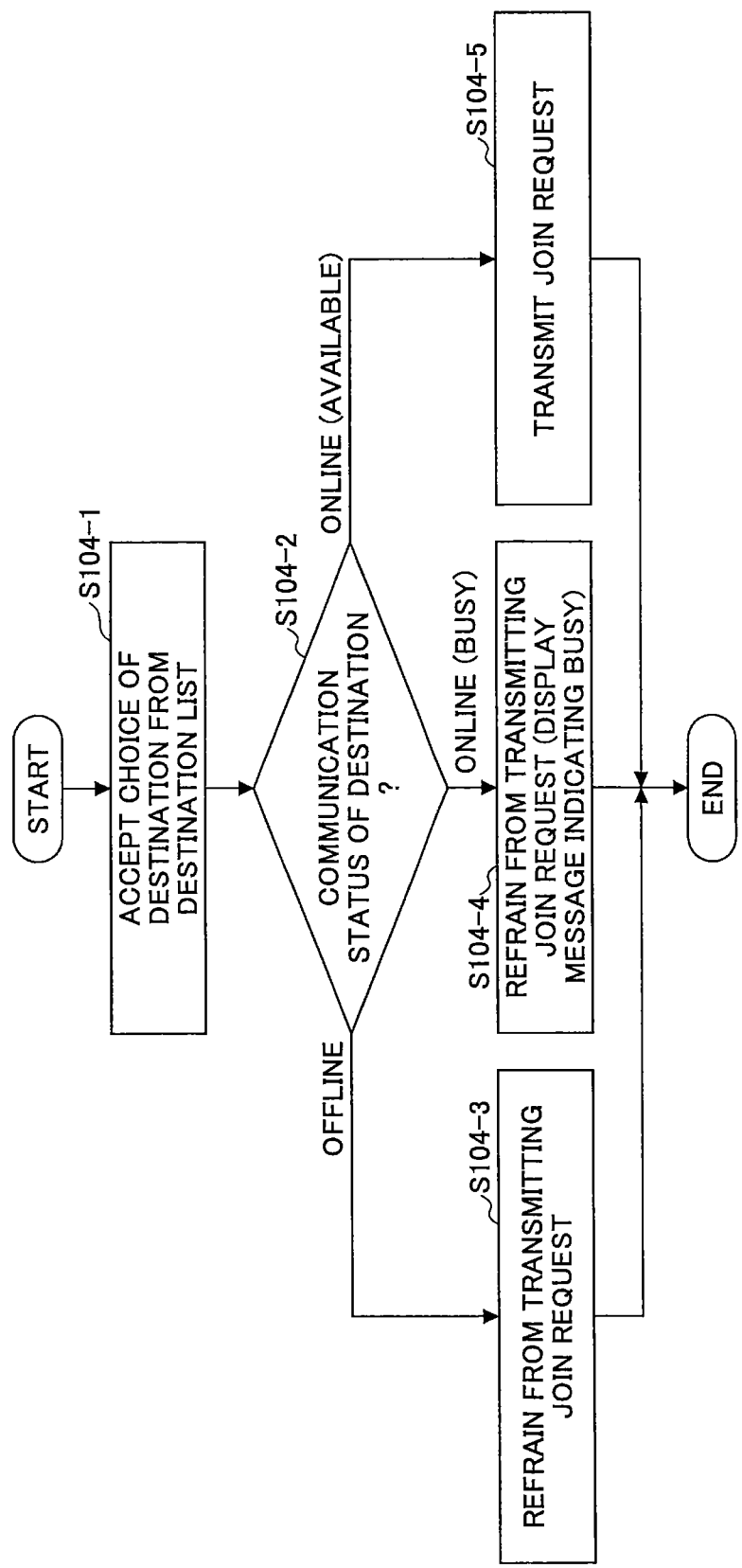
FIG. 37 is a flowchart for explaining a process performed by the terminal to determine whether the terminal is allowed to join a session.
Figure 38:
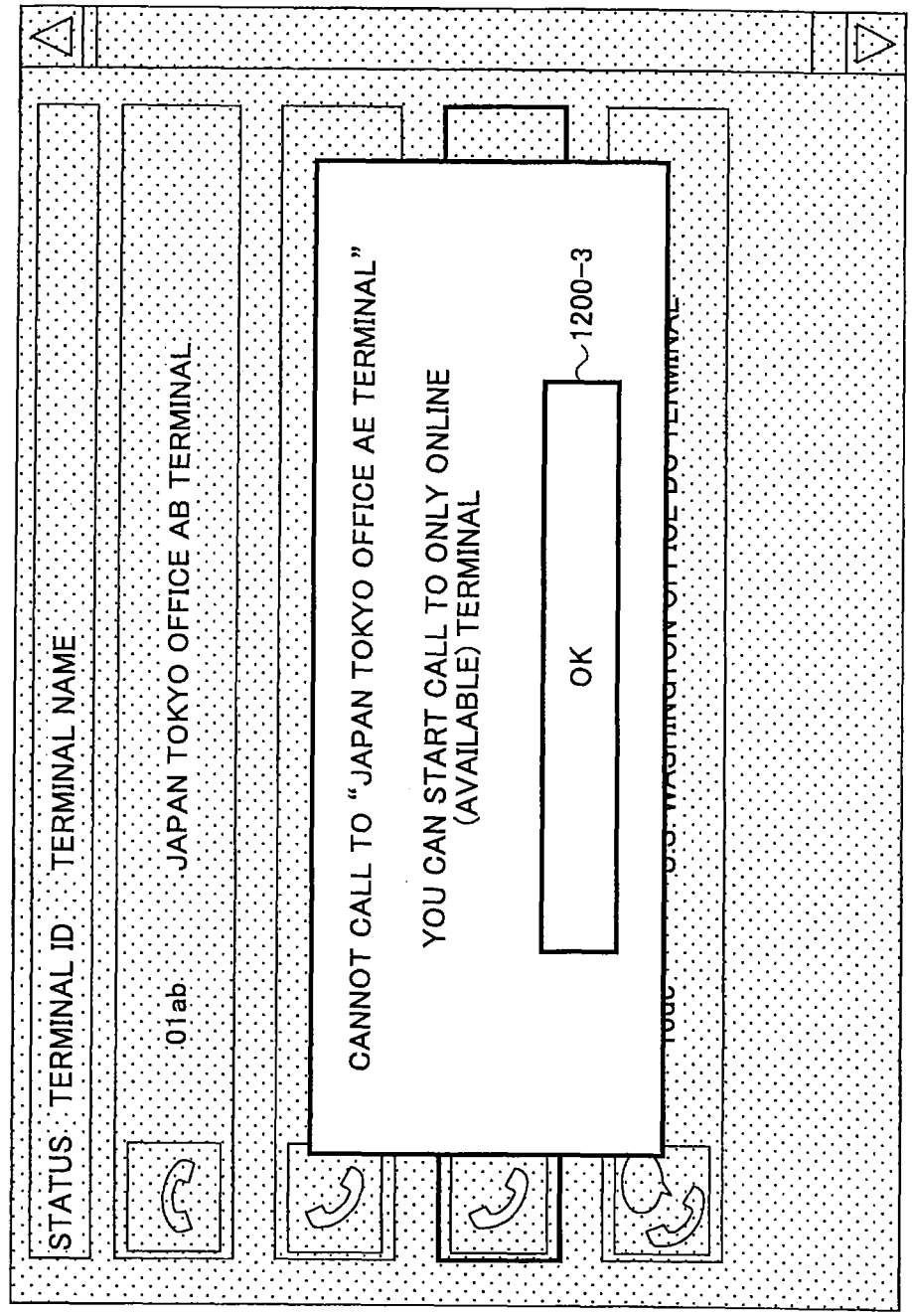
FIG. 38 is a diagram showing an example screen including a message indicating the destination is busy.

The configuration and function of the transmission system 1 are discussed above. Next, with reference to FIGS. 20-38, processes and operations executed by the transmission system 1 are explained. FIG. 20 is a sequence diagram for explaining a process to manage condition information representing operating condition of each relay device. FIG. 21 is a diagram showing communications of image data, sound data, and various kinds of management information in the transmission system. FIG. 22 is a sequence diagram for explaining a preparatory process to start communication between transmission terminals. FIG. 23 is a diagram showing an example screen of a destination list. FIG. 24 is a sequence diagram for explaining a process to request for starting a communication. FIG. 25 is a detailed flowchart for explaining a process to choose a destination performed by the requesting terminal (source terminal). FIG. 26 is a diagram showing an example screen of a start confirmation dialog. FIG. 27 is a flowchart for explaining a process to change the communication status. FIG. 28 is a sequence diagram for explaining a process to accept the request for starting the communication. FIG. 29 is a diagram showing an example of a start request reception screen. FIG. 30 is a sequence diagram for explaining a process to request for relaying the content data. FIG. 31 is a flowchart for explaining a process to change the communication status. FIG. 32 is a sequence diagram for explaining a process to communicate the content data between the transmission terminals. FIG. 33 is a sequence diagram for explaining a process to transmit a join request for joining a content data session. FIG. 34 is a diagram showing an example screen of a destination list. FIG. 35 is a flowchart for explaining a process to determine whether to accept the join request based on the communication status. FIG. 36 is a sequence diagram for explaining a process to leave the content data session. FIG. 37 is a flowchart for explaining a process performed by the terminal to determine whether to transmit the join request. FIG. 38 is a diagram showing an example screen of a destination list.

In the following discussion, it is assumed that terminals establish a restricted session (indicated in restriction information), and another terminal transmits a join request to the established session.

First, a process to manage status information representing statuses of each relay device 30 transmitted from the relay device to the management system 50 will be described with reference to FIG. 20. The state detection part 32 of each relay device shown in FIG. 5 detects its operating condition periodically (step S1-1-S1-4). Next, in order to manage the operating condition of each relay device in the management system 50 in real time, the transmitter/receiver part 31 of each relay device 30 transmits the status information to the management system 50 via the communication network 2 periodically. (Step S2-1-S2-4). The status information includes a relay device ID of each relay device 30 and an operating condition detected by the state detection part 32 of the relay device 30 using the relay device ID. As shown in FIG. 9, the relay devices (30*a*, 30*b*, 30*d*) operating correctly are "Online" in the transmission system 1. On the other hand, the relay device 30*c* is operating but a program to perform relaying functions is not working correctly. As a result, the relay device 30*c* is "Offline".

Next, the transmitter/receiver part 51 of the management system 50 receives the status information transmitted by each relay device 30, and stores the status information in the relay device management table (FIG. 9) in the non-volatile storage part 5000 via the store/read processing part 59 to manage it (step S3-1-S3-4). In this way, "Online", "Offline", or "Out of order" is stored for each relay device ID in the relay device management table shown in FIG. 9. In addition, the receipt date/time at which the management system 50 receives the status information is stored for each relay device ID. If the management system 50 is not able to receive the status information from one of the relay device 30, the operation condition and the receipt date/time may be blank in the relay device management table shown in FIG. 9. Alternatively, the operation condition and the receipt date/time may represent the previous operation condition or the receipt date/time.

FIG. 21 is a conceptual diagram showing sessions of transmitting and receiving of content data and various kinds of management data in the transmission system 1 according to the embodiment. As shown in FIG. 21, in the transmission system 1, a management data session "sei" is established among a source terminal, a destination terminal A, and a destination terminal B via the management system 50 for transmitting and receiving various kinds of management data. In addition, among the source terminal, the destination terminal A, and the destination terminal B, four sessions for high resolution image data, medium resolution image data, low resolution image data, and sound data are established via the relay device 30. Here, the four sessions are represented as a content data session "sed". Thus, the content data session "sed" is used for a video conference.

With reference to FIG. 22, a process to transmit or receive management information is discussed in a preparatory process to start communication between the terminals 10. In FIG. 22, all of the management information is transferred with the management data session "sei".

First, when a user of the terminal 10aa switches ON the power switch 109 shown in FIG. 2, the operation input receiving part 12 shown in FIG. 5 receives a power-ON signal to switch ON the power of the terminal 10aa (step S21). Upon reception of the power-ON signal as a trigger, the login request part automatically transmits the login request information indicating the login request from the transmitter/receiver part 11 to the management system via the communication network 2 (step S22). The login request information includes a terminal ID and a password for identifying the terminal 10aa which is described as the source terminal. The terminal ID and the password are data that are read from the storage unit 1000 via the store/read processing part 19 and then transmitted to the transmitter/receiver part 11. Note that when the login request information is transmitted from the terminal 10aa to the management system 50, the receiver side management system 50 may detect the IP address of the transmitter side terminal 10aa.

Next, the terminal authentication part 52 of the management system 50 authenticates the terminal 10aa based on whether the terminal ID and the password contained in the login request received via the transmitter/receiver part 51 are identical to those managed in the terminal authentication management DB 5002, by searching with the terminal ID and the password as search keys in the terminal authentication management table (FIG. 10) of the non-volatile storage part 5000 (step S23).

The terminal authentication part 52 manages identical terminal IDs and identical passwords. Thus, when the terminal authentication part 52 determines that the received login request comes from the terminal 10 having a valid access authorization, the state managing part 53 stores, in the terminal management table (FIG. 11), the terminal ID of the terminal 10aa in association with the operating state of the terminal 10aa, the receipt date/time of the login request information and the IP address of the terminal 10aa (step S24-1). Thus, the operating condition "online", the receipt date/time "2009. 11.10.13:40" and the terminal IP address "1.2.1.3" are managed in the terminal management table (FIG. 11) in association with the terminal ID "01aa".

Subsequently, the state management part 53 stores the operating condition "Online" and the communication status "None" for the terminal 10aa in a record specified by the terminal ID and the name of the terminal 10aa in the terminal management table (FIG. 11) (step S24-2). Thus, the operating condition "Online" and the communication status "None" are associated with the terminal ID "01aa" and managed in the terminal management table shown in FIG. 11.

Subsequently, the transmitter/receiver part 51 of the management system 50 transmits authentication result obtained by the terminal authentication part via the communication network 2 to the source terminal 10aa that has sent the login request (step S25). In the following, the case where the terminal authentication part 52 has determined that the terminal (e.g., in this case, the terminal 10aa) has the valid access authorization will be described.

When the terminal 10aa receives the authentication result indicating that the terminal has the valid access, the transmitter/receiver part 11 transmits a request for transmitting a destination list to the management system 50 via the communication network 2 (step S26). In this way, the transmitter/receiver part 51 of the management system 50 receives the request.

The terminal extraction part 54 searches the destination list management table (FIG. 12) by the terminal ID "01aa" of the source terminal 10aa that has sent the login request as a search key, and retrieves the terminal IDs of potential destination terminals capable of communicating with the source terminal (i.e., the terminal 10aa). As a result, the terminal extraction part 54 extracts the terminal IDs of the potential destination terminals capable of communicating with the source terminal (step S27). In addition, the terminal extraction part 54 searches the terminal management table (FIG. 11) by the extracted terminal IDs as search keys, and retrieves the names of the corresponding terminals (i.e. the names of the potential destination terminals). As a result, the terminal extraction part 54 extracts the names of the potential destination terminals. In this example, terminal IDs "01ab", "01ba", "01db", and "01dc" of the potential destination terminals (10ab, 10ba, 10db, and 10dc) associated with the terminal ID "01aa" of the source terminal 10aa are extracted. In addition, the terminal names "Japan Tokyo Office AB Terminal", "Japan Osaka Office BA Terminal", "U.S. Washington Office DB Terminal", and "U.S. Washington Office DC Terminal (now shown in FIG. 12)" of the potential destination terminals are extracted.

Next, the transmitter/receiver part 51 of the management system 50 reads data of a destination list frame (a destination list frame 1100-1 shown in FIG. 23) from the non-volatile storage part 5000 via the store/read processing part 59 (step S28). In addition, the transmitter/receiver part 51 transmits "destination list information" representing the destination list frame, the terminal IDs of the potential destination terminals extracted by the terminal extraction part 54, and the names of the potential destination terminals to the source terminal 10aa (step S29). In this way, the transmitter/receiver part 11 of the source terminal 10aa receives the destination list information, and the store/read processing part 19 stores the destination list information in the volatile storage part 1002 (step S30).

As discussed above, the destination list is not managed by each terminal 10 but by the management system 50. Thus, in case where a new terminal is newly added in the transmission system 1, an existing terminal is replaced with a new terminal, or a graphic of the destination list frame is changed, no handling is required for each terminal as the management system 50 is enabled to deal with such modifications collectively.

The terminal state acquisition part 55 searches the terminal management table (FIG. 11) by the terminal IDs ("01ab", "01ba", "01db", and "01dc") of the potential destination terminals extracted by the terminal extraction part 54 as search keys, and retrieves the operating condition and the communication status of the potential destination terminals (10ab, 10ba, 10db, 10dc) extracted by the terminal extraction unit 54 based on the respective terminal IDs (step S31).

Subsequently, the transmitter/receiver part 51 transmits, via the communication network 2, to the login request terminal status information including terminal IDs used as the search keys in step S31 and the operating conditions and the communication statuses of the potential destination terminals corresponding to the terminal IDs (step S32). In particular, in step S32, the status information including the terminal ID "01ab" as the search key and the operating condition "Offline" of the potential destination terminal (i.e. terminal 10ab) is transmitted to the login request terminal (i.e. terminal 10aa). Here, when the operation condition is "Offline", no communication status is included in the status information. In addition, also in step S32, the transmitter/receiver part 51 transmits to the login request terminal (the terminal 10aa) the status information for all potential destination terminals including the terminal 10ba (the terminal ID "01ba", the operating condition "online", and the communication status "Private Calling").

The store/read processing part 19 of the login request terminal (the terminal 10aa) stores the status information received from the management system 50 in the volatile storage part 1022 (step S33). Thus, by receiving the status information for each terminal, the login request terminal (the terminal 10aa) may obtain the operating conditions and the communication statuses of the potential destination terminal capable of communicating with the login request terminal (the terminal 10aa).

The destination list creating part 20 of the login request terminal (the terminal 10aa) creates, based on the destination list information and the status information stored in the volatile storage part 1002, a destination list in which the operating conditions and the communication statuses of the terminals as the potential destination terminals are reflected. In addition, the display control part 16 displays the destination list on the display 120aa shown in FIG. 1 at any timing.

Figure 23:
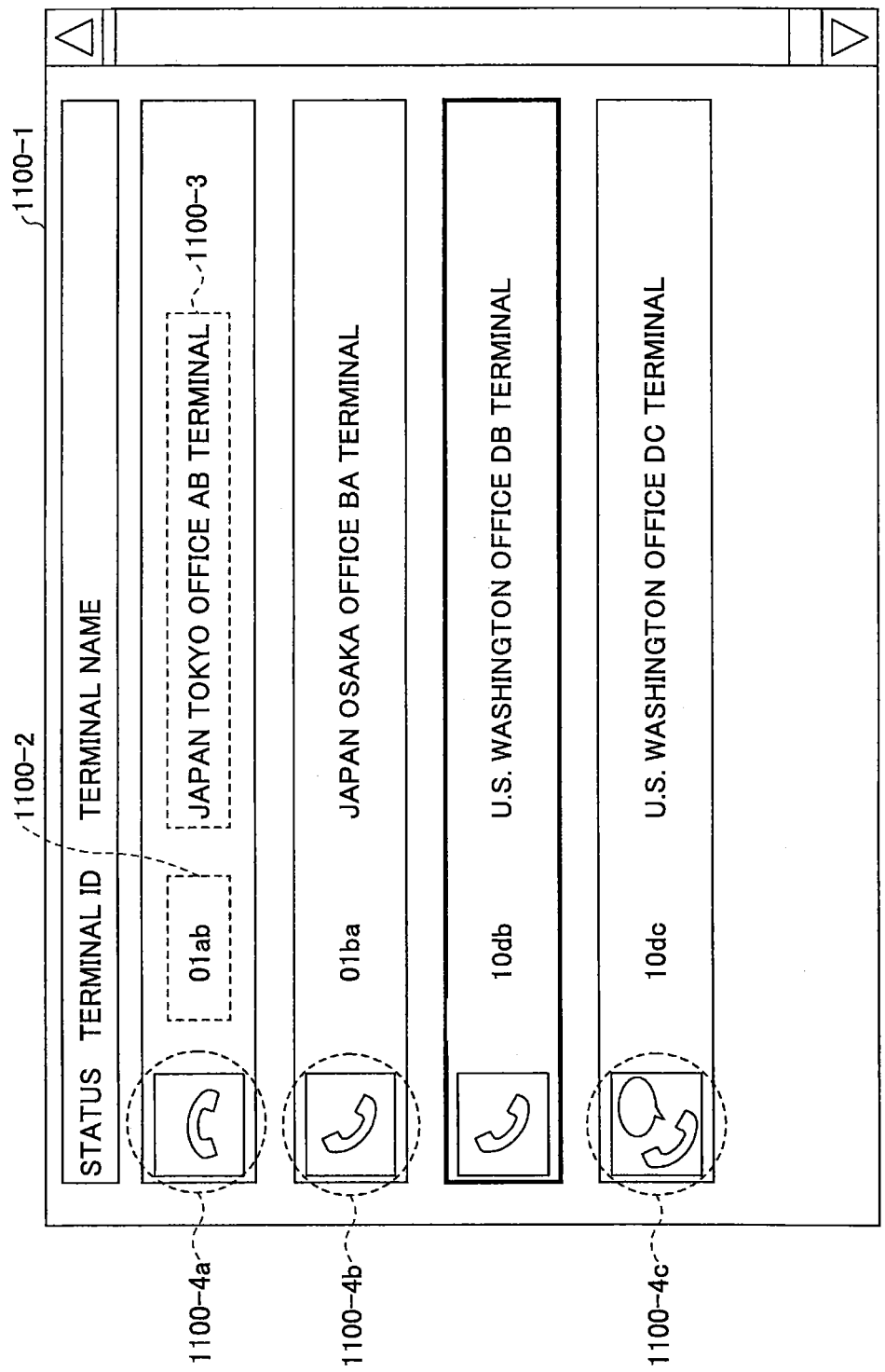
FIG. 23 is a diagram showing an example screen of a destination list.

FIG. 23 is a diagram showing an example screen of the destination list. As shown in FIG. 23, the destination list is a display screen having a destination list frame 1100-1 including a terminal ID 1100-2 of the potential destination terminals, the terminal name 1100-3, and icons 1100-4a-1100-4c reflecting the statuses of the potential destination terminals.

The types of the icons are an offline icon 1100-4a indicating that the terminal is offline and is not able to respond; an available icon 1100-4b indicating that the terminal is online and ready to respond; and an online icon 1100-4c indicating that the terminal is online but busy.

The destination list creation part 20 assigns the available icon 1100-4b to the potential destination terminal where the operating condition is "Online" and the communication status is "None". The destination list creation part 20 assigns the busy icon 1100-4c to the potential destination terminal where the operating condition is "Online" and the communication status is not "None". The destination list creation part 20 assigns the busy icon 1100-4a to the potential destination terminal where the operating condition is "Offline".

With reference to FIG. 22, the terminal extraction part 54 of the management system 50 searches the destination list management table (FIG. 12) by the terminal ID "01aa" of the source terminal 10aa that has sent the login request as a search key, and extracts terminal IDs of other source terminals that have been registered as potential destination terminals for the terminal ID "01aa" of the source terminal 10aa (step S35). In the destination list management table shown in FIG. 12, the terminal IDs to be extracted are "01ab", "01ba", "01cb", and "01db".

Subsequently, the terminal state acquisition part 55 of the management system 50 searches the terminal management table (FIG. 11) by the terminal ID "01aa" of the login request terminal (the terminal 10aa) that has sent the login request as a search key, and receives the operating condition and the communication status of the login request terminal (the terminal 10aa) which has sent the login request (step S36).

Subsequently, the transmitter/receiver part 51 transmits status information including the terminal ID "01aa", the operating condition "online", and the communication status "None" of the request source terminal 10aa obtained in step S36 to the terminals the operating conditions of which are presented as "Online" in the terminal management table (FIG. 11) among the terminals (10ab, 10ba, 10cb, and 10db) corresponding to the terminal IDs ("01ab", "01ba", "01cb", and "01db") extracted in step S35 (steps S37- and S37-2).

Next, the terminal 10ba and the terminal 10db display the status information about the potential destination terminals on the display 120, respectively (step S38-1, S38-2). Note that when the transmitter/receiver part 51 transmits the status information to the terminals (10ba, 10db), the transmitter/receiver part 51 refers to the IP addresses of the terminals managed in the terminal management table (FIG. 11) based on the respective terminal IDs ("01ba", "01db"). Accordingly, the terminal ID "01aa", the operating condition "Online", and the communication status "None" of the login request terminal (the terminal 10aa) may be transmitted to the terminals (the terminals 10ba, 10db) capable of communicating with the login request terminal (the terminal 10aa).

In a similar manner as step S21, when the user of another terminal 10 switches ON the power switch 109 shown in FIG. 2, the operation input receiving part 12 shown in FIG. 5 receives a power-ON signal and subsequently the other terminal 10 will perform a process similar to the above-described process of steps S22 through S38-1, 38-2. Thus, a description of the process of steps S22 through S38-1, 38-2 is omitted.

Next, with reference to FIG. 24, a process to request for starting a communication with other terminals is discussed. In the process shown the FIG. 24, various kinds of management data are transferred with the management data session sei.

In an example of FIG. 24, the terminal 10aa which is allowed to login in FIG. 22 transmits a start request. Thus, the terminal 10aa operates as a source terminal in the example. The terminal 10aa as the source terminal may communicate with at least one of the terminals in which the operating condition is "Online" and the communication status "None" based on the status information for the potential destination terminal received in step S32 discussed in FIG. 22.

In the transmission system 1, the source terminal (the terminal 10aa) may communicate with the terminal 10db in which the operating condition is "Online" and the communication status is "None" in the terminals (10ab, 10ba, 10db, and 10dc) as the potential destination terminals. In the following example, the case in which the user of the source terminal (the terminal 10aa) operates the terminal to start communicating with the destination terminal (the terminal 10db) is explained.

In a state prior to the beginning of the process shown in FIG. 22, the display 120aa of the terminal 10aa as the source terminal shows the destination list shown in FIG. 23. In addition, the user of the source terminal may choose another terminal (i.e. a terminal for starting a session) from the destination list.

In the process shown in FIG. 24, a process for choosing a destination terminal is performed when the user of the source terminal pushes the operation button 108 shown in FIG. 2 to choose the destination terminal (the terminal 10db) (step S41).

FIG. 25 is a detailed flowchart for explaining a process to choose the destination terminal performed by the source terminal. When the destination terminal 10db is chosen by the user via the operation button 108, the operation input receive part 12 shown in FIG. 5 accepts a request for starting a communication (i.e. a session) with the destination terminal (the terminal 10db) (step S41-1). Next, the display control part 16 displays a start confirmation dialog 1200-1 shown in FIG. 26 on the destination list (step S41-2).

The start confirmation dialog 1200-1 is a user interface to confirm the start request accepted in step S41-1. The start confirmation dialog 1200-1 has a "Proceed" button 1200-2 to start to transmit the start request and a "Cancel" button 120-3 to cancel the transmission of the start request.

In this embodiment, since only a restricted session is expected, no item exists to specify whether to limit terminals which are allowed to join a session started by the start request. However, in order to make it possible to establish a non-restricted session, a specific button to start a restricted session (or non-restricted session) such as a "Start Restricted Session" (or "Start Non-Restricted Session") button may be used.

Here, when the user pushes the "Proceed" button 1200-2, the transmitter/receiver part 11 creates a start request including restriction information representing that only permitted terminal(s) may join the session started from the start request (step S41-3). The start request created in step S41-3 includes the restriction information "Private Invite" indicating the start of a restricted session; the terminal ID "01aa" of the source terminal; and the terminal ID "01db" of the destination terminal.

With reference back to FIG. 24, the transmitter/receiver part 11 of the terminal 10aa transmits the start request including the terminal ID "01aa" of the source terminal (the terminal 10aa), the terminal ID "01db" of the destination terminal (the terminal 10db), the restriction information indicating the restricted session, and the IP address of the source terminal to the management system 50 (step S42). In this way, by receiving the start request, the transmitter/receiver part 51 of the management system 50 is able to obtain the IP address "1.2.1.3" of the source terminal (the terminal 10aa) which has transmitted the start request.

Next, based on the terminal ID "01aa" of the source terminal (the terminal 10aa) and the terminal ID "01db" of the destination terminal (the terminal 10db) included in the start request, the state management part 53 modifies a field of a record including the communication status of the terminal ID "01aa" and "01db" in the terminal management table of the terminal management DB 5003 (FIG. 11) (step S43).

With reference to FIG. 27, the process of step 43 is discussed further. First, the state management part 53 shown in FIG. 5 obtains the communication status of the terminal managed in the terminal management DB 5003 (step S43-1). Here, the "Private Invite" included in the start request received by the transmitter/receiver part 51 is identified as a change request. The change request determination part determines whether the change request is a pre-determined change request such as "Private Invite". Based on the determination, the state management part 53 obtains the communication status of the source terminal (the terminal 10aa) as well as the destination terminal (the terminal 10db). The state management part 53 searches the terminal management table (FIG. 11) by the terminal ID "01aa" of the source terminal (the terminal 10aa) as a search key, and obtains the communication status "None" of the source terminal (the terminal 10aa) which has sent the start request. Similarly, the state management part 53 obtains the communication status "None" of the destination terminal (the terminal 10db).

Next, the state management part 53 obtains pre-change statuses of the source terminal and the destination terminal corresponding to the change request "Private Invite" (step S43-2). In this case, the state management part 53 searches the status change management table (FIG. 17) by the change request "Private Invite" and the terminal information "source terminal" as search keys, and obtains the pre-change status "None" of the source terminal. Similarly, the state management part 53 searches the status change management table (FIG. 17) by the change request "Private Invite" and the terminal information "destination terminal" as search keys, and obtains the pre-change status "None" of the destination terminal.

Next, the state management part 53 compares the obtained communication status with the pre-change status, and determines whether they are identical (step S43-3). Here, the state management part 53 compares the obtained communication status "None" of the source terminal (the terminal 10aa) with the obtained pre-change status "None" of the source terminal, and determines whether they are identical. Similarly, the state management part 53 compares the obtained communication status "None" of the destination terminal (the terminal 10db) with the obtained pre-change status of the destination terminal, and determines whether they are identical.

In step S43-3, when the communication status and the pre-change status of the source terminal are identical and the communication status; and the pre-change status of the destination terminal are identical (step S43-3, Yes), the state management part 53 obtains post-change statuses of the source terminal and the destination terminal corresponding to the change request "Private Invite" (step S43-4). Here, the state management part 53 searches the status change management table (FIG. 17) by the change request "Private Invite" and the terminal information "Source Terminal" as search keys, and obtains the post-change status "Private Calling" of the source terminal. Similarly, the state management part 53 searches the status change management table (FIG. 17) by the change request "Private Invite" and the terminal information "Destination Terminal" as search keys, and obtains the post-change status "Private Ringing" of the destination terminal.

Based on the terminal ID "01aa" of the source terminal (the terminal 10aa) and the terminal ID "01db" of the destination terminal (the terminal 10db), the state management part 53 modifies fields of the communication status on records including the terminal ID "01aa" and "01db" in the terminal management table (FIG. 11) (step S43-5). Here, based on the obtained post-change status of the source terminal, the state management part 53 changes into "Private Calling" the field of the communication status on the record including the terminal ID "01aa" in the terminal management table. Similarly, based on the obtained post-change status of the destination terminal, the state management part 53 changes into "Private Ringing" the field of the communication status on the record including the terminal ID "01db" in the terminal management table.

In step S43-3, when it is determined that the communication status and the pre-change status of the source terminal are not identical; or the communication status and the pre-change status of the destination terminal are not identical (step S43-3, No), the state management part 53 does not modify the field of the communication status on the record including the terminal ID "01aa" and the terminal ID "01db" in the terminal management table (FIG. 11). This is because either the source terminal (the terminal 10aa) or the destination terminal (the terminal 10db) is not able to start a communication. In this case, the transmitter/receiver part 51 creates a pre-determined error message, and transmits it to the source terminal (the terminal 10aa) to finish the process (step S43-6). The source terminal displays the error message on the display 120.

With reference back to FIG. 24, the process after the communication statues are changed in step S43-5 is discussed below. The session ID creation part 56a creates a session ID "se1" to identify a session (a content data session "sed") for performing a video conference between the source terminal (the terminal 10aa) and the destination terminal specified by the source terminal (step S44). When the session ID is created, the session management part 57 stores the session ID "se1" in the volatile storage part 5100.

Next, the relay device selection part 56 of the management system 50 selects a relay device 30 for relaying content data in the content data session "sed" established between the source terminal "10aa" and the destination terminal "10db" (step S45). Here, the relay device extraction part 56b searches the relay-device management table (FIG. 15) by the terminal ID "01aa" of the source terminal (the terminal 10aa) and the terminal ID "01db" of the destination terminal (the terminal 10db) included in the start request transmitted by the source terminal (10aa), and extracts relay device IDs "111a" and "111d" corresponding to the terminal (10aa, 10db).

When the extracted relay device IDs are identical, the selection part 56c refers to the operating condition of the extracted relay device ID in the operating conditions of the relay devices 30 managed in the relay device management table (FIG. 9). When the operating condition of the relay device ID is "Online", the selection part 56c selects the extracted relay device as the relay device for relaying the content data. When the extracted relay device IDs are not identical or the operating condition of the relay device ID is "Offline", the selection part 56c selects relay device 30e having the relay device ID "111e" as the relay device for relaying the content data. In the following discussion, it is assumed that the selection part 56c selects the relay device 30e.

After the relay device 30e is selected, the session management part 57 stores the relay device ID "111e" of the selected relay device, the terminal ID "01aa" of the source terminal (the terminal 10aa), and the terminal ID "01db" of the destination terminal (the terminal 10db) in the fields of "Relay Device ID", "Source Terminal ID", and "Destination Terminal ID" on the record including the session ID "se1" in the session management table (FIG. 13) of the non-volatile storage part 5000 (step S46).

Next, the transmitter/receiver part 51 shown in FIG. 5 transmits to the source terminal (the terminal 10aa) the session ID created by the session ID creation part 56a and relay device connection information used to connect the relay device 30e selected by the selection part 56c (step S47). The relay device connection information may include the IP address "1.1.1.3", authentication information, and port information about the relay device 30e. In this way, the terminal 10aa may obtain the relay device connection information used to connect to the relay device 30e relaying the content data in the session identified by the session ID "se1".

Next, the transmitter/receiver part 51 transmits to the destination terminal (the terminal 10db) start request including the terminal ID "01aa" of the source terminal (the terminal 10aa), "Private Invite", and the session ID "se1"; the relay device connection information used to connect the relay device 30e; and the IP address of the management system 50 (step S48). Thus, the transmitter/receiver part 11 of the destination terminal (the terminal 10db) is able to receive the start request, and obtains the relay device connection information used to connect the relay device 30e relaying the content data and the IP address "1.1.1.2" of the management system which has sent this information.

With reference to FIGS. 28 and 29, a process in which a user of the destination terminal which has received the start request pushes the operation button 108 and the destination terminal starts a communication (i.e. establishes a session) with the source terminal (the terminal 10aa) is discussed.

At the beginning of the communication process shown in FIG. 28, the display 120db of the destination terminal (the terminal 10db) shows a start request reception screen indicating that a start request is received (step S49-1). As shown in FIG. 29, the start request reception screen 1300-1 indicates that the start request is received. In addition, when the start request includes restriction information representing that the conference is restricted, the start request reception screen 1300-1 may show a message such as "Only permitted person can attend this conference" (i.e. a message indicating that the conference is restricted).

By viewing the start request reception screen, the user may confirm that the start request is received. In addition, the user may confirm whether the video conference relating to the start request is restricted. In this embodiment, since only the restricted session is used, the message indicating that the conference is restricted may be omitted.

In response to the push operation of the operation button 108 by the user of the destination terminal, the operation input receive part 12 accepts a response for allowing to start a communication (i.e. establish a session) with the source terminal (the terminal 10aa) (step S49-2). Next, the transmitter/receiver part 11 of the destination terminal (the terminal 10db) transmits to the management system 50 a start response including the terminal ID of the destination terminal (the terminal 10db); the terminal ID of the source terminal (the terminal 10aa); a change request "Accept" indicating that an establishment of a session is allows; and the session ID "se1" (step S50).

When the transmitter/receiver part 51 of the management system 50 receives the start response, based on the terminal ID "01aa" of the source terminal (the terminal 10aa) and the terminal ID "01db" of the destination terminal (the terminal 10db), the state management part 53 changes fields of the communication statuses on the records including the terminal ID "01aa" and "01db" in the terminal management table (FIG. 11).

With reference to FIG. 27, the process of step S51 is discussed in detail. First, when the transmitter/receiver part 51 of the management system 50 receives the start response, the state management part 53 obtains the communication status of the terminal managed in the terminal management table (FIG. 11) (step S51-1) similarly to step S43-1. Here, the change request determination part 61 determines that the change request "Accept" received by the transmitter/receiver part 51 is a pre-determined change request. Based on the determination, the state management part 53 obtains not only the communication status "Private Ringing" of the destination terminal (the terminal 10db) but also the communication status "Private Calling" of the source terminal (the terminal 10aa).

Next, similarly to step S43-2, the state management part 53 obtains the pre-change status "Private Calling" and "Private Accepted" of the source terminal corresponding to the change request "Accept" managed in the status change management table (FIG. 17).

In addition, the state management part 53 obtains the pre-change status "Private Ringing" of the destination terminal corresponding to the change request "Accept" managed in the status change management table (FIG. 17).

Next, the state management part 53 compares the obtained communication status with the pre-change status, and determines whether they are identical (step S51-3). Here, the state management part 53 compares the obtained communication status "Private Calling" of the source terminal (the terminal 10aa) with either the obtained pre-change status "Private Calling" or "Private Accepted" of the source terminal, and determines whether they are identical. Similarly, the state management part 53 compares the obtained communication status "Private Ringing" of the destination terminal (the terminal 10db) with the obtained pre-change status "Private Ringing" of the destination terminal, and determines whether they are identical.

In step S51-3, when the communication status and the pre-change status of the source terminal are identical and the communication status; and the pre-change status of the destination terminal are identical (step S51-3, Yes), the state management part 53 obtains post-change statuses of the source terminal and the destination terminal corresponding to the change request "Accept" included in the start response (step S51-4). Here, the state management part 53 searches the status change management table (FIG. 17) by the change request "Accept", the terminal information "Source Terminal", and the pre-change status "Private Calling" of the source terminal as search keys, and obtains the post-change status "Private Accepted" of the source terminal. Similarly, the state management part 53 searches the status change management table (FIG. 17) by the change request "Accept", the terminal information "Destination Terminal", and the pre-change status "Private Ringing" of the destination terminal as search keys, and obtains the post-change status "Private Accepted" of the destination terminal.

Based on the terminal ID "01aa" of the source terminal (the terminal 10aa) and the terminal ID "01db" of the destination terminal (the terminal 10db), the state management part 53 modifies fields of the communication status on the records including the terminal ID "01aa" and "01db" in the terminal management table (FIG. 11) (step S51-5). Here, based on the obtained post-change status of the source terminal, the state management part 53 changes into "Private Accepted" the field of the communication status on the record including the terminal ID "01aa" in the terminal management table. Similarly, based on the obtained post-change status of the destination terminal, the state management part 53 changes into "Private Accepted" the field of the communication status on the record including the terminal ID "01db" in the terminal management table.

In step S51-3, when it is determined that the communication status and the pre-change status of the source terminal are not identical; or the communication status and the pre-change status of the destination terminal are not identical (step S51-3, No), the state management part 53 does not modifies the field on the record including the terminal ID "01aa" and the terminal ID "01db" in the terminal management table (FIG. 11). In this case, the transmitter/receiver part 51 creates a pre-determined error message, and transmits it to the destination terminal (the terminal 10db) to finish the process (step S51-6).

With reference back to FIG. 28, the subsequent process is discussed assuming that the communication statues are modified in step S51-5. The transmitter/receiver part 51 transmits to the source terminal (the terminal 10aa) a start response including the terminal ID "01db" of the destination terminal (the terminal 10db); the change request "Accept" indicating that the communication with the destination terminal is allowed; and the session ID "se1" (step S52). When receiving the start response, the transmitter/receiver part 11 of the source terminal (the terminal 10aa) transmits to the relay device 30e the session ID "se1" and the relay device connection information obtained in step S47 to connect to the relay device 30e (step S53). On the other hand, the transmitter/receiver part 11 of the destination terminal (the terminal 10db) transmits to the relay device 30e the session ID "se1" and the relay device connection information obtained in step S48 to connect to the relay device 30e (step S54).

Next, with reference to FIG. 30, a process in which the relay device 30e relays content data between the source terminal (the terminal 10aa) and the destination terminal (the terminal 10db) is discussed. In the process shown in FIG. 30, various kinds of information are transferred with the management data session "sei".

After the source terminal (the terminal 10aa) has connected to the relay device 30e (step S53), the transmitter/receiver part 11 transmits to the management system 50 a relay request including the terminal ID "01aa" of the source terminal (the terminal 10aa); the session ID "se1"; and a change request "Join" to request for starting relay (step S71-1).

When the transmitter/receiver part 51 of the management system 50 receives the relay request, based on the terminal ID "01aa" of the source terminal included in the relay request, the state management part 53 modifies the field of the communication status on the record including the terminal ID "01aa" in the terminal management table (FIG. 11) (step S72-1).

With reference to FIG. 31, the process in step S72-1 is discussed in detail. In FIG. 31, the source terminal which has transmitted the relay request is called as "relay request terminal". First, the state management part 53 shown in FIG. 5 obtains the communication statuses of the terminals managed in the terminal management DB 5003 (step S72-1-1). Here, the change request determination part 61 determines that the change request "Join" received by the transmitter/receiver part 51 is not a pre-determined change request in advance. In response to the determination, the state management part 53 obtains only the communication status of the relay request terminal (the terminal 10aa). The state management part 53 searches the terminal management table (FIG. 11) by the terminal ID "01aa" of the relay request terminal (the terminal 10aa) as a search key, and obtains the communication status "Private Accepted" of the relay request terminal (the terminal 10aa) which has sent the relay request.

Next, the state management part 53 obtains pre-change status corresponding to the change request "Join" (step S72-1-2). In this case, the state management part 53 searches the status change management table (FIG. 16) by the change request "Join" as a search key, and obtains the pre-change status "Private Accepted".

Next, the state management part 53 compares the obtained communication status with the pre-change status, and determines whether they are identical (step S72-1-3). Here, the state management part 53 compares the obtained communication status "Private Accepted" of the relay request terminal (the terminal 10aa) with the obtained pre-change status "Private Accepted", and determines whether they are identical.

In step S72-1-3, when the communication status and the pre-change status of the source terminal are identical (step S72-1-3, Yes), the state management part 53 obtains a post-change status corresponding to the change request "Join" (step S72-1-4). Here, the state management part 53 searches the status change management table (FIG. 17) by the change request "Join" as a search key, and obtains the post-change status "Private Busy".

Based on the terminal ID "01aa" of the source terminal (the terminal 10aa), the state management part 53 modifies the field of the communication status on record including the terminal ID "01aa" in the terminal management table (FIG. 11) (step S72-1-5). Here, based on the obtained post-change status, the state management part 53 changes into "Private Busy" the field of the communication status on the record including the terminal ID "01aa" in the terminal management table.

In step S72-1-3, when it is determined that the communication status and the pre-change status of the relay request terminal are not identical (step S72-1-3, No), the state management part 53 does not modifies the field of the communication status on the record including the terminal ID "01aa" in the terminal management table (FIG. 11). In this case, the transmitter/receiver part 51 transmits an error message to the relay request terminal (the terminal 10aa) to finish the process (step S72-1-6).

With reference back to FIG. 30, the process after the communication statues are changed in step S72-1-5 is discussed below. The management system 50 transmits to the relay device 30e a relay start request including the terminal ID "01aa" of the relay request terminal and the session ID "se1" (step S73-1). When the relay start request is received, the relay device 30e transmits to the management system a relay start response including a notification "OK" indicating that the starting relay is allowed (step S74-1). After receiving the response, the transmitter/receiver part 51 of the management system transmits this relay start response to the relay request terminal (the terminal 10aa) (step S75-1). In this way, a content data session "sed" is established between the relay request terminal (the terminal 10aa) and the relay device 30e (step S76-1).

On the other hand, after the destination terminal (the terminal 10db) has connected to the relay device 30e (step S54 shown in FIG. 28), the transmitter/receiver part 11 transmits to the management system 50 a relay request including the terminal ID "01db" of the destination terminal (the terminal 10db); the session ID "se1"; and a change request "Join" to request for starting relay (step S71-2).

Next, similarly to steps S72-1, S73-1, S74-1, and S75-1 performed by the management system 50 and the relay device 30e, content data session "sed" between the destination terminal (the terminal 10db) and the relay device 30e is established (steps S72-2, S73-2, S74-2, S75-2, and S76-2). In step S72-2, the destination terminal which has transmitted the relay request is treated as a relay request terminal. When the content data session "sed" between the relay request terminal (the terminal 10aa) and the relay device 30e and the content data session "sed" between the destination terminal (the terminal 10db) and the relay device 30e are established, the relay device 30e may relay three types of image data (i.e. low resolution, medium resolution, and high resolution) and voice data between the terminals (10aa, 10db). Thus, the terminals (10aa, 10db) may start a video conference.

With reference to FIGS. 5 and 32, a process to transfer content data for the video conference between the source terminal (the terminal 10aa) and the destination terminal (the terminal 10db) is discussed. Processes such as a transfer of the content data and a detection of delay time stated later are common in data flows from the terminal 10aa to the terminal 10db and vice versa. Thus, one of the flows is explained and the other is not explained.

The transmitter/receiver part 11 of the source terminal (the terminal 10aa) transmits, via the communication network 2, to the relay device 30e image data of a target imaged in the imaging part 14 and voice data input by the voice input part 15a with the content data session "sed" (step S81). In the transmission system 1, three types of image data (i.e. low, medium, and high resolution) shown in FIG. 21 and voice data are transferred. Thus, the transmitter/receiver part 31 of the relay device 30e receives the three types of the image data and voice data.

Next, the data quality check part 33 searches the altered quality management table (FIG. 7) by the IP address "1.3.2.4" of the destination terminal (the terminal 10db) as a search key, and extracts the quality of the image data to be relayed. Thus, the data quality check part 33 confirms the quality of the image data to be relayed (step S82). In the transmission system 1, the confirmed quality of the image data is "High Resolution" and it is identical with the quality of the image data received by the transmitter/receiver part 31, the relay device 30e relays the image data and the voice data as the same quality to the destination terminal (the terminal 10db) with the content data session "sed" (step S83). Therefore, the transmitter/receiver part 11 of the destination terminal (the terminal 10db) may receive the content data, and the display control part 16 may display an image based on the image data on the display 120 while the voice output part 15b may output voice based on the voice data.

Next, the delay detection part 18 of the terminal 10db detects delay time of the image data received by the transmitter/receiver part 11 at a certain intervals (e.g. 1 sec) (step S84). In this embodiment, it is assumed that the delay time is 200 ms.

The transmitter/receiver part 11 of the destination terminal (the terminal 10db) transmits, via the communication network 2, to the management system 50 delay information representing the delay time "200 ms" with the management data session "sei". In this way, the management system 50 may obtain the delay time as well as the IP address "1.3.2.4" of the terminal 10db which has sent the delay information.

The delay time management part 60 of the management system 50 searches the terminal management table (FIG. 11) by the IP address "1.3.2.4" of the destination terminal (the terminal 10db) as a search key, and extracts the corresponding terminal ID "01db". In addition, the delay time management part 60 stores the delay time "200 ms" represented in the delay information in the field of the delay time on the record of the terminal ID "01db" (step S86).

Next the quality determination part 58 searches the quality management table (FIG. 14) by the delay time "200 ms" as a search key, and extracts the corresponding quality "Medium Resolution" of the image data. Thus, the quality determination part 58 determines that the quality is "Medium Resolution" (step S87).

The transmitter/receiver part 51 searches the relay device management table (FIG. 9) by the relay device ID "111e" associated with the terminal ID "01db" in the session management table (FIG. 13) as a search key, and extracts the corresponding IP address "1.1.1.3" of the relay device 30e (step S88).

The transmitter/receiver part 15 transmits, via the communication network 2, to the relay device 30e quality information representing the quality "Medium Resolution" of the image data determined in step S87 with the management data session "sei" (step S89). The quality information includes the IP address "1.3.2.4" of the destination terminal (the terminal 10db) which is used as a search key in step S86. The altered quality management part 34 of the relay device 30e stores the IP address "1.3.2.4" of the destination terminal 10 (the terminal 10db) and the quality "Medium Resolution" of the image data to be relayed by associating them (step S90).

Next, similarly to step S81, the source terminal (the terminal 10aa) transmits to the relay device 30e three types of the image data and voice data with the content data session "sed" (step S91). Similarly to step S82, the data quality check part 33 searches the altered quality management table (FIG. 7) by the IP address "1.3.2.4" of the destination terminal (the terminal 10db) as a search key, and extracts the quality "Medium Resolution" of the image data to be relayed. Thus, the data quality check part 33 confirms the quality of the image data to be relayed (step S92).

In the transmission system 1, the confirmed quality of the image data is "Medium Resolution", which is lower than the quality "High Resolution" of the image data received by the transmitter/receiver part 31. Thus, the data quality change part 35 reduces the quality of the image data from "High Resolution" to "Medium Resolution" (step S93). Next, the transmitter/receiver part 31 transmits, via the communication network 2, to the terminal 10*db* the image data the quality of which has been changed into "Medium Resolution" and the voice data which has not been changed with the content data session "sed" (step S94). In this way, when the delay is detected by the destination terminal receiving the image data, the relay device 30*e* changes the quality of the image data and makes it possible to avoid making the attendees of the video conference uncomfortable.

During the video conference, the terminal 10 joining the video conference (i.e. the display 120 of the terminal 10 joining the established session) may display an indication of whether the video conference is using the restricted session or not so that the user may know that the video session is restricted.

Next, with reference to FIG. 33, a process in which the terminal 10*cb* transmits a join request to request for joining the content data session established between the source terminal (the terminal 10*aa*) and the destination terminal (the terminal 10*db*) is discussed The terminal 10*cb* operates as a join request terminal which transmits the join request. In the process shown in FIG. 33, various kinds of information are transferred with the management data session "sei".

When a user desires to join an established session and a video conference using the established session, the user operates his terminal (the terminal 10*cb* in this case) according to the login process discussed with FIG. 22 so that the display 120*cd* of the terminal 10*cd* shows the destination list (step S101).

As shown in FIG. 34, the display 120*cd* of the terminal cd shows the destination list 1400 indicating destination terminals capable of establishing a session with the terminal 10*cd* as the source terminal.

The user of the join request terminal (the terminal 10*cb*) operates the operation button 108 shown in FIG. 2 to choose a terminal which has joined a session (hereinafter called a "join terminal") that the user desires to join from the destination list 1400. In response to the choice, the operation input receive part 12 accepts a join request for joining the established content data session (step S104). In the following discussion, it is assumed that the terminal 10*db* is chosen as the join terminal.

The transmitter/receiver part 11 of the join request terminal (the terminal 10*cb*) which requests for joining the established session transmits to the management system 50 a join request including the terminal ID "01cb" of the join request terminal (the terminal 10*cb*); a change request "Call" indicating that the terminal 10*cb* requests for joining the content data session; and the terminal ID "01db" of the chosen join terminal (step S105).

When the management system 50 receives the join request, the management system 50 determines, using the destination list management table (FIG. 12), whether to connect the join request terminal (the terminal 10*cb*) with the join terminals (the terminals 10*aa*, 10*db*) joining the content data session "sed" (step S107). With reference to FIG. 35, the process in step 107 is discussed in detail. FIG. 35 is a flowchart for explaining a process to determine whether to accept the join request based on the communication status.

The state management part 53 searches the terminal management table (FIG. 11) by the terminal ID "01db" of the chosen join terminal (the terminal 10*db*) indicated in the join request as a search key, and obtains the communication status of the join terminal (the terminal 10*db*) (step S106-1). The join determination part 63 refers to the obtained communication status. When the obtained communication status is not "Private Busy" (step S106-2, No), the process ends.

On the other hand, when the obtained communication status is "Private Busy" as this embodiment in which the restricted session is established (step S106-2, Yes), the join determination part 63 determines that the join request terminal is not allowed to connect to the established session (step S106-4). Next, the transmitter/receiver part 11 transmits to the join request terminal (the terminal 10*cd*) a join failure notification indicating that the join request terminal is not allowed to join the session (step S106-5, step S109 in FIG. 33). When the join request terminal (the terminal 10*cd*) receives the join failure notification, the join request terminal displays the notification on the display 120.

With reference to FIG. 36, a process in which the terminal 10*aa* leaves the content data session established among the terminals (10*aa*, 10*cb*, 10*db*) is discussed. In FIG. 36, all of the management information is transferred with the management data session "sei".

When a user of the terminal 10*aa* pushes the operation button 108 shown in FIG. 2, the terminal 10*aa* accepts a request to leave the content data session (step S121). The transmitter/receiver part 11 of the terminal 10*aa* transmits to the management system 50 a leave request including the terminal ID "01aa" of the terminal 10*aa*; a change request "Leave" indicating the terminal 10*aa* requests for leaving the content data session; and the session ID "se1" (step S122). In the following discussion, the terminal which transmits the leave request is called as a "leave request terminal".

When receiving the leave request, the state management part 53 of the management system 50 modifies, based on the terminal ID "01aa" of the terminal 10*aa* included in the leave request, the field of the communication status on the record including the terminal ID "01aa" in the terminal management table (FIG. 11) (step S123).

Here, with reference to FIG. 31, the process in step S123 is discussed in detail. In this discussion, the word "Relay Request Terminal" shown in FIG. 31 shall be deemed to be replaced with "Leave Request Terminal". First, the state management part 53 shown in FIG. 5 obtains the communication statuses of the terminals managed in the terminal management DB 5003 (step S123-1). Here, the change request determination part 61 determines that the change request "Leave" received by the transmitter/receiver part 51 is not a pre-determined change request in advance. In response to the determination, the state management part 53 obtains only the communication status of the leave request terminal (the terminal 10*aa*). The state management part 53 searches the terminal management table (FIG. 11) by the terminal ID "01aa" of the terminal 10*aa* as a search key, and obtains the communication status "Private Busy" of the leave request terminal (the terminal 10*aa*).

Next, the state management part 53 obtains pre-change status corresponding to the change request "Leave" (step S123-2). In this case, the state management part 53 searches the status change management table (FIG. 16) by the change request "Leave" as a search key, and obtains the pre-change status "Private Busy".

Next, the state management part 53 compares the obtained communication status with the pre-change status, and determines whether they are identical (step S123-3). Here, the state management part 53 compares the obtained communication status "Private Busy" of the leave request terminal (the terminal 10*aa*) with the obtained pre-change status "Private Busy", and determines whether they are identical.

In step S123-3, when the communication status and the pre-change status of the source terminal are identical (step S123-3, Yes), the state management part 53 obtains a post-change status corresponding to the change request "Leave" (step S123-4). Here, the state management part 53 searches the status change management table (FIG. 16) by the change request "Leave" as a search key, and obtains the post-change status "None".

Based on the terminal ID "01aa" of the leave request terminal (the terminal 10aa), the state management part 53 modifies the field of the communication status on record including the terminal ID "01aa" in the terminal management table (FIG. 11) (step S123-5). Here, based on the obtained post-change status, the state management part 53 changes into "None" the field of the communication status on the record including the terminal ID "01aa" in the terminal management table.

In step S123-3, when it is determined that the communication status and the pre-change status of the relay request terminal are not identical (step S123-3, No), the state management part 53 does not modify the field of the communication status on the record including the terminal ID "01aa" in the terminal management table (FIG. 11). In this case, the transmitter/receiver part 51 transmits an error message to the relay request terminal (the terminal 10aa) to finish the process (step S123-6).

With reference back to FIG. 36, the process after the communication statues are changed in step S123-5 is discussed below. The session management part 57 removes the terminal ID "01aa" from the field of the leave request terminal on the record including the session ID "se1" in the session management table (FIG. 13) in the non-volatile storage part 5000. The management system 50 transmits a leave request to the relay device 30e (step S125). The leave request indicates that the leave request terminal requests for leaving the session. The leave request includes the terminal ID "01aa" of the leave request terminal (the terminal 10aa) and the session ID "se1". In this way, the relay device 30e disconnects from the content data session for the terminal 10aa, and stops the connection for the terminal 10aa. Next, the relay device 30e transmits a leave response to the management system 50 (step S126). The leave response indicates that the leave request terminal is allowed to leave the session. The leave response includes the terminal ID "01aa" of the leave request terminal (the terminal 10aa) and the session ID "se1".

When the management system 50 receives the leave response, the transmitter/receiver part 51 transmits to the terminal 10aa a leave response including the terminal ID "01aa" of the leave request terminal (the terminal 10aa); a change request "Leave"; the session ID "se1"; and a notification "OK" indicating that the leave request terminal is allowed to leave the session (step S127). When receiving the leave response, the leave request terminal (the terminal 10aa) accepts a request for power-off in response to a push of the power switch 109 (step S128). When the request for power-off is accepted, the transmitter/receiver part 11 transmits to the management system 50 a disconnect request including the terminal ID "01aa" of the leave request terminal (the terminal 10aa) and a notification to disconnect the connection between the leave request terminal and the management system 50 (step S129).

When the transmitter/receiver part 51 of the management system 50 receives the disconnect request, based on the terminal ID "01aa" of the leave request terminal (the terminal 10aa) included in the disconnect request, the state management part 53 removes the entry of the field of the communication status on the record including the terminal ID "01aa" in the terminal management table (FIG. 11) (step S130). Next, the transmitter/receiver part 51 transmits to the leave request terminal (the terminal 10aa) a disconnect response indicating that the leave request terminal is allowed to disconnect (step S131). In this way, the management system 50 stops the management data session for the leave request terminal (the terminal 10aa) and stops the connection between the leave request terminal and the management system 50.

When accepting the disconnect response, the leave request terminal (the terminal 10aa) turns off the power and ends the process (step S132). The terminals 10cb, 10db may disconnect from the content data session "sed" to finish the video conference similarly to steps S121-S132.

Advantage of the Transmission System

As stated above, in the transmission system 1 according to this embodiment, the transmitter/receiver part 51 of the management system accepts from the third terminal (the terminal 10cb) a join request to the established session between the first terminal (the terminal 10aa) and the second terminal (the terminal 10db). When the established session is restricted, the join determination part 63 prevents the third terminal from joining the session. As a result, the management system 50 may prevent a third party from joining a session for a conference in which secure information is communicated.

Also, the management system 50 controls connections for the first terminal (the terminal 10aa), the second terminal (the terminal 10db), and the third terminal (the terminal 10cb). The transmitter/receiver part 51 transmits to the third terminal relay device connection information used to connect to the relay device 30e which relays content data transmitted by the first terminal to the second terminal. In this way, the third terminal may connect with the relay device 30e with this relay device connection information.

As discussed with FIG. 33 in this embodiment, the terminal 10cd (i.e. the join request terminal) chooses a terminal joining the restricted content data session from the destination list, and transmits the join request to the management system 50. After receiving the join request, the management system 50 determines whether the join request terminal is allowed to join the session. Alternatively, the terminal 10cd may have the join determination part (not shown), and the join determination part may determine whether the terminal is allowed to join the session.

In this case, at step S104 shown in FIG. 33, when the terminal 10cd accepts a request to join an established content data session from a user, the join determination part determines whether the terminal is allowed to join the session.

FIG. 37 is a flowchart for explaining a process performed by the terminal to determine whether the terminal is allowed to join a session. In this variant, similarly to the above-mentioned embodiment, the operating condition of the source terminal joining the restricted content data session is "Online (Busy)" and the communication status is "Private Busy". Similarly to the above-mentioned embodiment, at steps S37-1, S37-2 in FIG. 22, the operating condition and the communication status of the source terminal are received in advance, and the icon corresponding to the status is shown in the destination list shown in FIG. 34. In more detail, the icon "Online (Busy)" is displayed on the destination list for the source terminal.

First, a user chooses a destination terminal (hereinafter called a "join terminal") from the destination list shown in FIG. 34, which has joined a session that the user desired to join (step S101 in FIG. 33); the join determination part accepts the choice (step S104-1). Next, the join determination part refers to the destination list to confirm the communication status of the chosen join terminal (step S104-2).

When the communication status is "Offline" (step S104-2, Offline), the transmitter/receiver part 11 refrains from transmitting a join request to the management system 50 (step S104-3).

When the communication status is "Online (Busy)" (step S104-2, Online (Busy), the transmitter/receiver part 11 refrains from transmitting a join request to the management system 50, and displays a message indicating that the destination terminal is busy on the display (step S104-4).

FIG. 38 is a diagram showing an example screen including a message indicating the destination is busy. In this way, the user may learn that the session that the user desires to join is restricted.

When the communication status is "Online (Available)" (step S104-2, Online (Available), the join determination part determines that the session is not restricted, and the transmitter/receiver part 11 transmits a join request to the management system 50 to connect to the destination terminal (step S104-5).

In this embodiment, the terminal 10cd has the join determination part (not shown) which determines whether the terminal 10cd is able to join the session. Thus, the join request is not transmitted to the management system 50 if the session is restricted. As result, the load of the management system 50 may be decreased.

For example, in the above-mentioned embodiment, it is possible to hide that the session is restricted by changing the operating condition of the join terminal which has joined the restricted session into "Offline" to show it on the destination list.

However, when the join terminal which has joined the restricted conference is shown as "Offline", in case where all destination terminals are "Offline", it is difficult for the user to identify that they have been "Offline" or joined the restricted session, or the communication system itself is down.

In addition, it is difficult for the user to identify the reason why the terminal to which the user desires to connect is "Offline" (i.e. the terminal has joined the restricted session or the terminal has just disconnected).

Thus, it is hard for the user to determine that he should wait for the end of the restricted session or he should ask a system administrator to connect the terminal to the communication system.

To deal with the situation, in this embodiment, the join terminal in the restricted session is shown as the communication status "Online (Busy)" on the destination list. In addition, when the terminal is chosen by the user, as shown in FIG. 38, the user is notified that he cannot start a call to the terminal (i.e. transmit a join request). Thus, the user may clearly know that the chosen terminal from the destination list has joined the restricted session.

Note that the transmission system 1 in this embodiment discussed above may be modified or improved.

Supplement

The terminal ID to identify the terminal 10 in the transmission system 1 may be replaced with a user ID to identify the user of the terminal as needed. In this case, the management system 50 may accept a login request with the user ID instead of the terminal ID (step S22). The management system 50 may manage the user ID after the step.

The management system 50 and the program supply system 90 may be implemented in a single computer or a plurality of computers in which each part is deployed separately. When the program supply system is implemented in a single computer, programs transmitted by the program supply system 90 are transmitted in separate modules or a single module. In addition, when the program supply system 90 is implemented in a plurality of computers, the programs may transmitted by the computers in separate modules.

In addition, storage media storing the programs for the terminal and the relay device and the transmission management programs; the HD 204 storing the above-mentioned programs; and the program supply system 90 having the HD 204 are used when the programs for the terminal and the relay device and the transmission management programs are provided to users as program products domestically or abroad.

In the transmission system 1, the quality of the image data is managed with the resolution in the altered quality management table shown in FIG. 7 and the quality management table shown in FIG. 14, but the quality is not limited to the resolution. For example, a depth of the image data, a sampling frequency of voice data, and a bit length of the voice data may be used to manage the quality.

The receipt date/time is managed in the relay device management table shown in FIG. 9, the terminal management table shown in FIG. 11, and the session management table shown in FIG. 13, but the receipt date/time may be managed in different manners. For example, just receipt time may be managed in the tables.

In the above-mentioned transmission system 1, the IP address of the relay device is managed in the relay device management table shown in FIG. 9, and the IP address of the terminal is managed in the terminal management table shown in FIG. 11, but the relay device and the terminal may be managed with other identifiers. For example, in order to identify the relay device 30 or the terminal in the communication terminal 2, specific information such as a fully qualified domain name (FQDN) may be used. In this case, the IP address associated with the FQDN is managed in a domain name system (DNS) server. In addition, the specific information may be expressed as "relay device connection target information representing the connection target to the relay device 30 in the communication network 2" or "relay device destination information representing the destination to the relay device 30 in the communication network 2". Similarly, the specific information may be expressed as "terminal connection target information representing the connection target to the terminal 10 in the communication network 2" or "terminal destination information representing the destination to the terminal 10 in the communication network 2".

The word "video conference" may be replaced with "TV conference" in the transmission system 1.

In the above-mentioned embodiment, the transmission system 1 is explained using an example of the video conference. However, this invention is not limited to the example. For example, the transmission system 1 may be a telecommunication system with an IP phone or an Internet phone. Alternatively, the transmission system 1 may be a car navigation system. In this case, for example, one of the terminals 10 may be a car navigation device installed in a car, and another may be an administration terminal or an administration server which manages the car navigation system in a control center or another car navigation device installed in another car.

Figure 53:
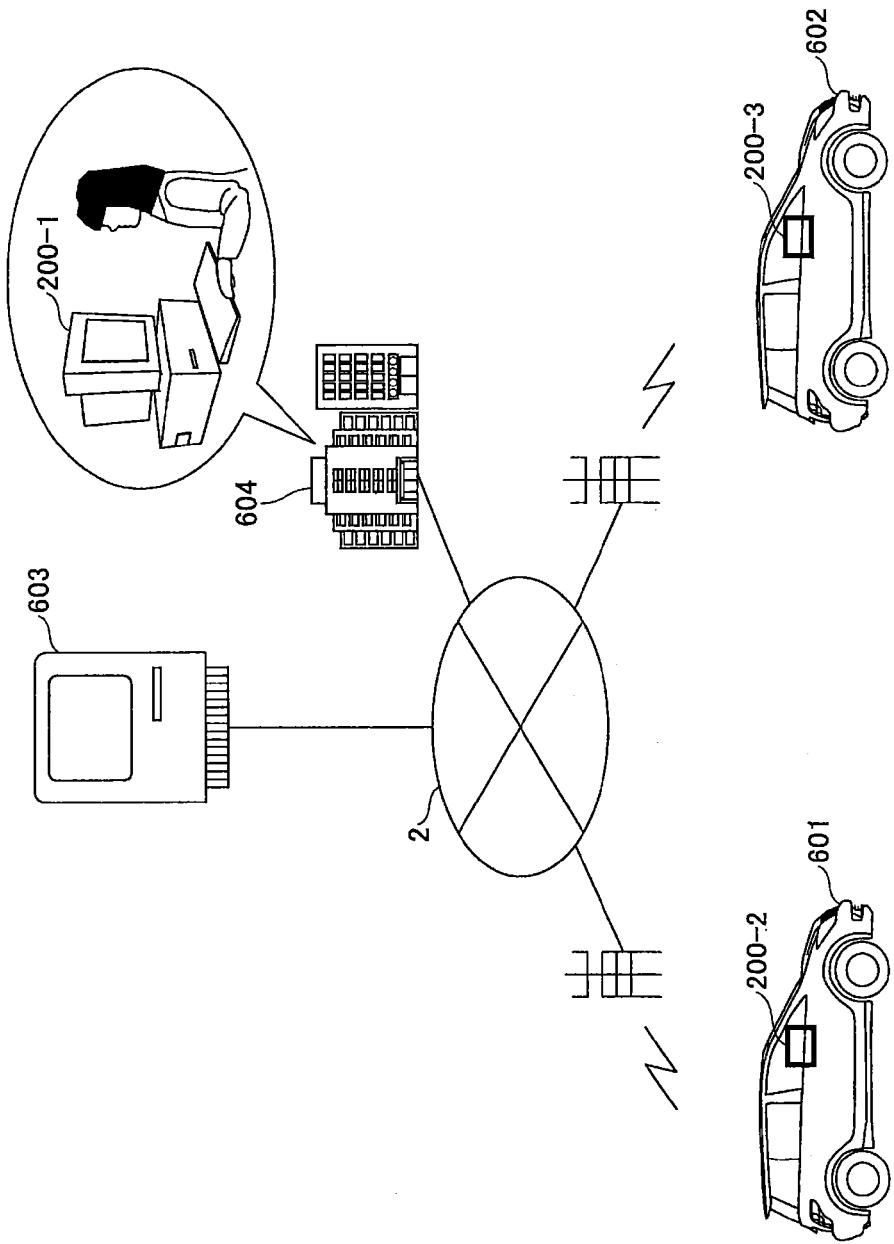
FIG. 53 is a diagram showing a system including a car navigation device as a transmission terminal according to an embodiment of the invention.

FIG. 53 is a diagram showing a system including a car navigation device as a transmission terminal. Here, one of the terminals 10 is a car navigation device 200-2 installed on a car 601. Another terminal 10 is an administration terminal 200-1 used by a communicator working in an administration center 604; an administration server 603 managing the car navigation devices; or another car navigation device 200-3 installed in another car 602.

Figure 54:
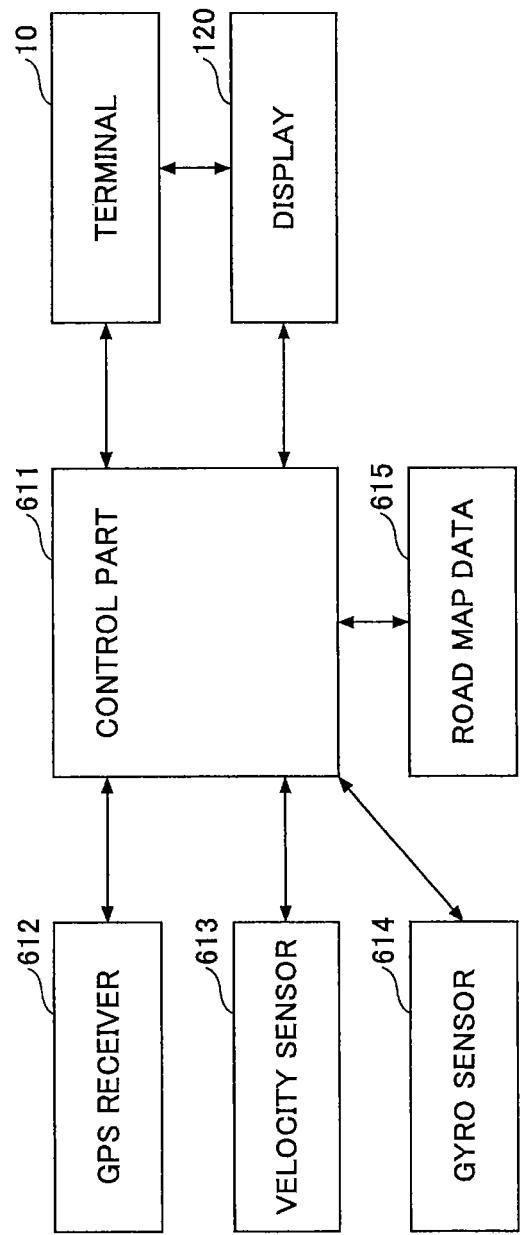
FIG. 54 is a diagram showing a configuration of the car navigation device.

FIG. 54 is a diagram showing a configuration of the car navigation device. The car navigation device has a control part 611 configured to control the device itself, a GPS receiver 612, a velocity sensor 613, a gyro censor 614, and road map data 615. The terminal 10 according to this embodiment is connected to the control part 611. The control part 611 may be implemented by a microcomputer, which executes programs to provide car navigation functions. The GPS receiver 612 is configured to receive signals from GPS satellites, and outputs coordinates of the current position. The velocity sensor 613 is configured to detect a velocity of the car (rotating velocity of the wheels). The gyro sensor 614 is configured to detect an angle rate, and detects a travelling direction of the car by integrating the angle rate.

The road map data 615 represents roads by combinations of nodes and links. The road map data 615 may be stored in the car in advance or may be downloaded from an external device. The road map is displayed on the display 120.

In addition, the car navigation device may provide additional functions such as an audio function to output music or a TV program or a browser function to show a web site.

The control part 611 estimates the current position of the car by applying an autonomous navigation using the travelling direction detected by the gyro censor 614 and the travelling distance detected by the velocity sensor 613 to the coordinates obtained by the GPS receiver 612. The current position of the car is displayed on the road map with a my car indicator.

The car navigation device is connected to the communication network 2 via a cell phone network with a function of the terminal 10 or a cell phone.

The terminal 10 displays a screen shown in FIG. 23 (or FIGS. 46, 50, 51, and 52 described later) on the display 120. Thus, a driver or a passenger may choose a destination terminal from the destination terminal displayed on the display 120. After logging in, the terminal may transmit or receive image data from the camera or voice data. In addition, in response to an operation of the driver or the passenger, the terminal may capture display data such as a road map or a TV screen. In this case, the car navigation device may transmit the display data to the other car navigation device.

Thus, similarly to the terminal 10 placed in an office, the car navigation device may transmit and receive the image data, the voice data, and the display data.

Figure 39:
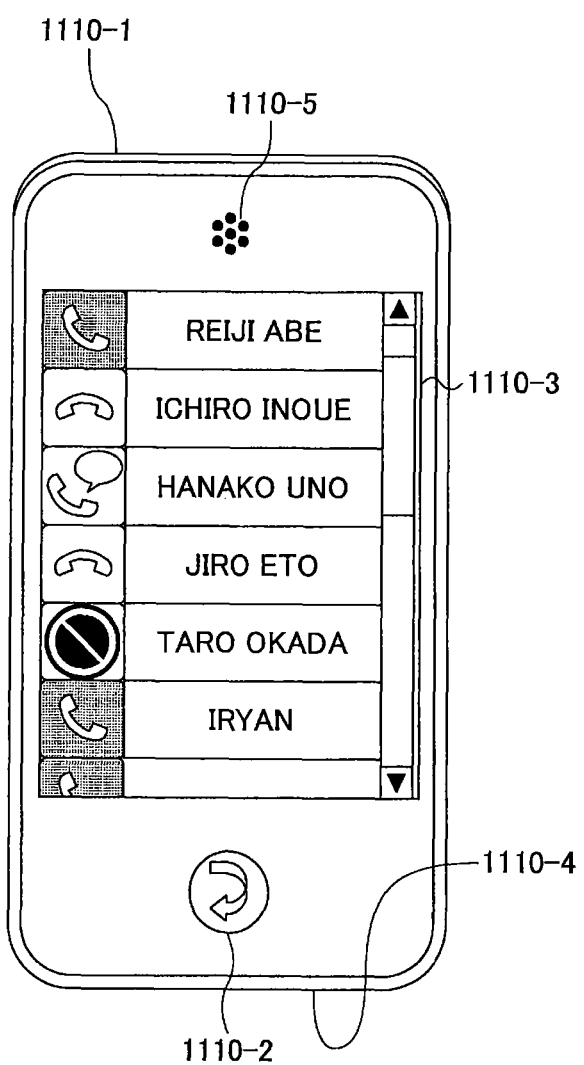
FIG. 39 is a diagram showing an example screen of a destination list in another embodiment.

In addition, the transmission system 1 may be a voice conference system or a PC screen sharing system. Alternatively, the transmission system 1 may be a communication system of a cell phone. In this case, the terminal 10 is a cell phone. An example screen of the destination list is shown in FIG. 39. FIG. 39 is a diagram showing a configuration of the terminal 10 as the cell phone and an example screen of the destination list. As shown in FIG. 39, the terminal as the cell phone has a body 1110-1; a menu button 1110-2 placed on the body 1110-1; a display 1110-3 placed on the body 1110-1; a microphone 1110-4 placed at the bottom of the body 1110-1; and a speaker 1110-5 placed on the body 1110-1. The menu button 1110-2 is used to display a menu screen indicating icons of various applications. The display 1110-3 includes a touch sensor so that the user chooses a destination name to call another cell phone.

In the above-mentioned embodiment, the content data has only the image data and the voice (sound) data, but it is not limited to those examples. For example, the content data may include touch data. In this case, the touch data input by the user on a cell phone is transferred to another cell phone. In addition, the content data may include smell data. In this case, the smell data detected by a cell phone is transferred to another cell phone. The content data may include at least one of the image data, the voice data, the touch data, and the smell data.

In addition, the transmission system 1 in the above-mentioned embodiment is discussed using an example of the video conference. However, the transmission system 1 may be used for any meetings or conversation between colleagues, families, or friends. Furthermore, the transmission system 1 may be used for one-way communication such as a seminar or a class.

Configuration of Another Transmission System

The basic configuration of the transmission system used in the embodiment of this invention is discussed above. In the following, a transmission system 1A, which is a variant of the transmission system 1, and devices included in the transmission system 1A are discussed. The transmission system 1A may distribute a call for a destination to a plurality of terminals, and improves efficiency of the system. The hardware configurations of devices in the transmission system 1A are identical with ones shown in FIGS. 2-4.

Figure 40:
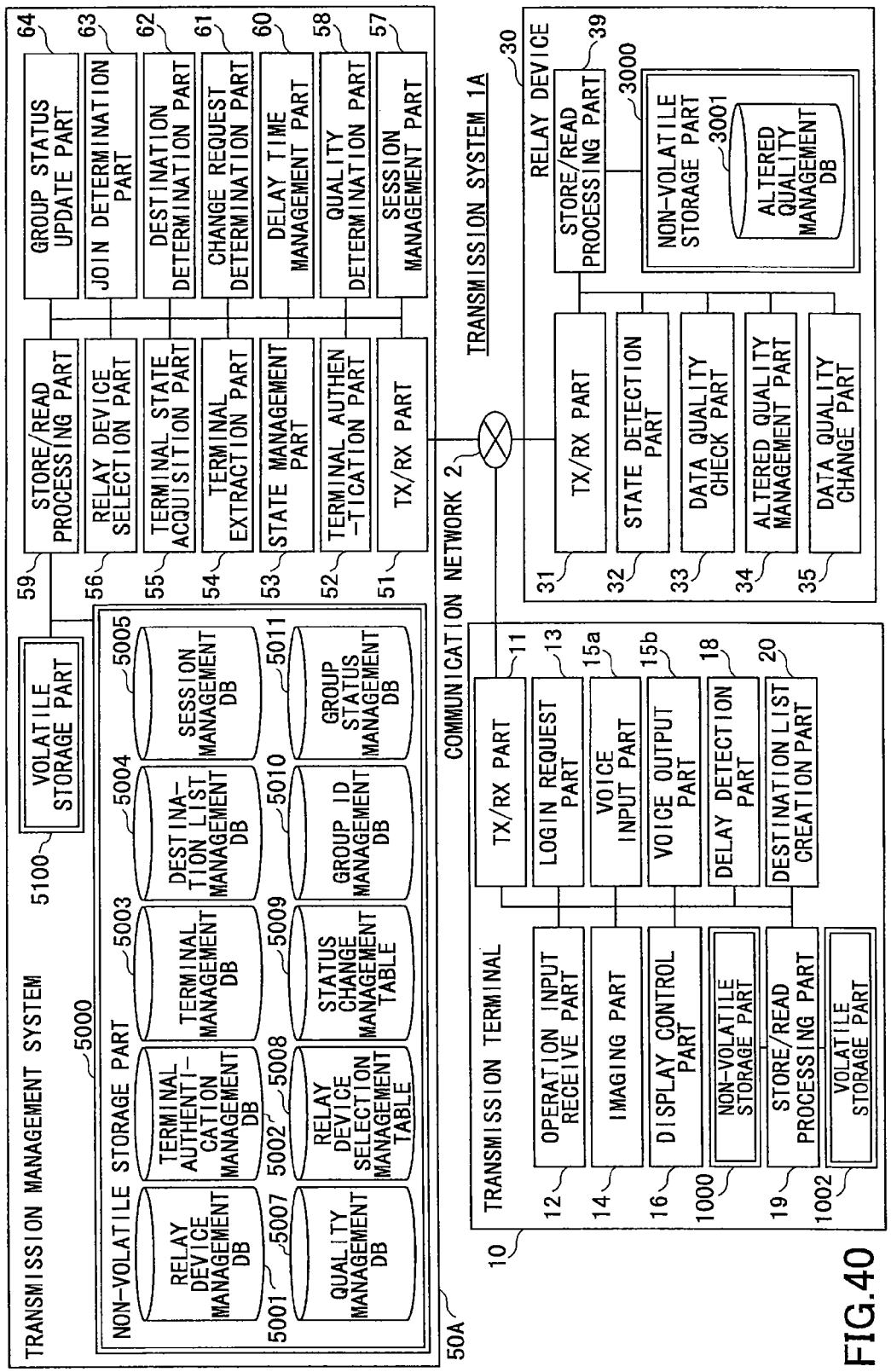
FIG. 40 is a block diagram showing a functional configuration of each terminal, device, and system included in the transmission system according to the embodiment.

FIG. 40 is a block diagram showing a functional configuration of the transmission system 1A according to the embodiment. The functional configuration shown in FIG. 40 corresponds to one shown in FIG. 5. Compared to the management system 1 shown in FIG. 5, some parts of functions of the management system are modified in the management system 1A. In the following, the difference is discussed mainly. The functions of the terminal 10 and the relay device 30 included in the transmission system 1A are similar to the transmission system 1. Thus, the discussion for the functions of the terminal 10 and the relay device 30 are omitted.

The non-volatile storage part 5000 of the management system 50A according to this embodiment has a group ID management DB 5010 and a group status management DB 5011. Both tables are discussed below.

(Group ID Management Table)

The non-volatile storage part 5000 includes a group ID management DB 5010 formed of a group ID management table shown in FIG. 43. FIG. 43 is a diagram showing the group ID management table. The group ID management table indicates whether each terminal ID is a group ID.

Here, the group ID is discussed in detail. The group ID defines a group including one or more terminal IDs. The group ID is displayed on the destination list similarly to the terminal ID. However, when a terminal requests for call to the group ID, the management system 5A establishes one of the terminal IDs associated with the group ID. A destination list management table shown in FIG. 42 corresponds to FIG. 12. Here, the group ID "01xx" is set as the destination terminal ID for the terminal having the terminal ID "01aa".

As shown in FIG. 43, when the terminal ID is the group ID, the field of "Group ID Flag" is set to "True", and grouped terminal IDs and the group name is set. On the other hand, when the terminal ID is not the group ID, the field of "Group ID Flag" is set to "False", and no value is set for "Grouped Terminal IDs" and "Group Name".

(Group Status Change Management Table)

The non-volatile storage part 5000 includes a group status management DB 5011 formed of a group status change management table shown in FIG. 44. FIG. 44 is a diagram showing the group status change management table. In this group status change management table, the group ID of each group is associated with the operating condition.

Functions of Management System

With reference back to FIG. 40, the management system 50A according to this embodiment has a group status update part 64 compared to the management system 50 shown in FIG. 5. The group status update part 64 is configured to execute a process shown in FIG. 48 (discussed later) at any timing, and updates the operating condition of the group in the group status change management table.

The group status update part 64 is configured to refer to the group ID management table, and identifies the terminal ID where the "Group ID Flag" is "True" (i.e. the group ID). Next, the group status update part 64 obtains operating conditions of the terminals having the terminal IDs associated with the group ID from the terminal management table shown in FIG. 41 (some values are different from the table shown in FIG. 11). When the operating condition of at least one terminal is "Online (Available)", the group status update part 64 determines that the status of the group is "Online (Available)", and sets it in the group status change management table shown in FIG. 44. On the other hand, when the operating conditions of all terminals are "Offline" or "Online (Busy)", the group status update part 64 determines that the status of the group is "Offline", and sets it in the group status change management table shown in FIG. 44.

Note that the group status update part 64 may set a certain status such as "Online (Unavailable)" as the status of the group when the operating conditions of all terminals are "Offline" or "Online (Busy)". The operating condition of the group is displayed on the terminal which has registered the group ID to the destination list as needed.

In addition, the terminal extraction part 54 of the management system 50A according to this embodiment is configured to extract the terminal IDs including the group ID from the destination list management table (FIG. 42). The terminal extraction part 54 searches the destination list management table by the group ID as a search key, and extracts the terminal IDs of other terminal IDs which have registered the group ID as a potential destination terminal.

Furthermore, the terminal state acquisition part according to this embodiment is configured to search the terminal management table (FIG. 41) by the terminal ID as a search key, and retrieve the operating condition and the communication status for each terminal ID. Also, the terminal state acquisition part 55 searches the group status change management table (FIG. 44) by the group ID as a search key, and retrieves the operating condition for each group ID. Thus, the terminal state acquisition part 55 may acquire the operation condition of the group capable of communicating with the terminal which has sent the login request.

In this way, the transmission system 1A introduces the group ID which is treated equally with the terminal ID, and automatically establishes a session between the terminal requesting call to the group ID and one of the terminals associated with the group ID. Thus, the transmission system 1A achieves a call distribution function. With this function, especially between a store of a service provider, which has the small number of stores, and its call center, efficient video conferencing is achieved using the relay device 30. In other word, the user does not have to choose one of the terminals in the call center from the destination list. In addition, the service provider may dynamically determine the number of terminals in the call center depending on the demand of the calls from the store.

Process/Operation of Embodiment

With reference to FIGS. 45, 47, 48, and 49, a process performed in the transmission system 1A is discussed.

Figure 45:
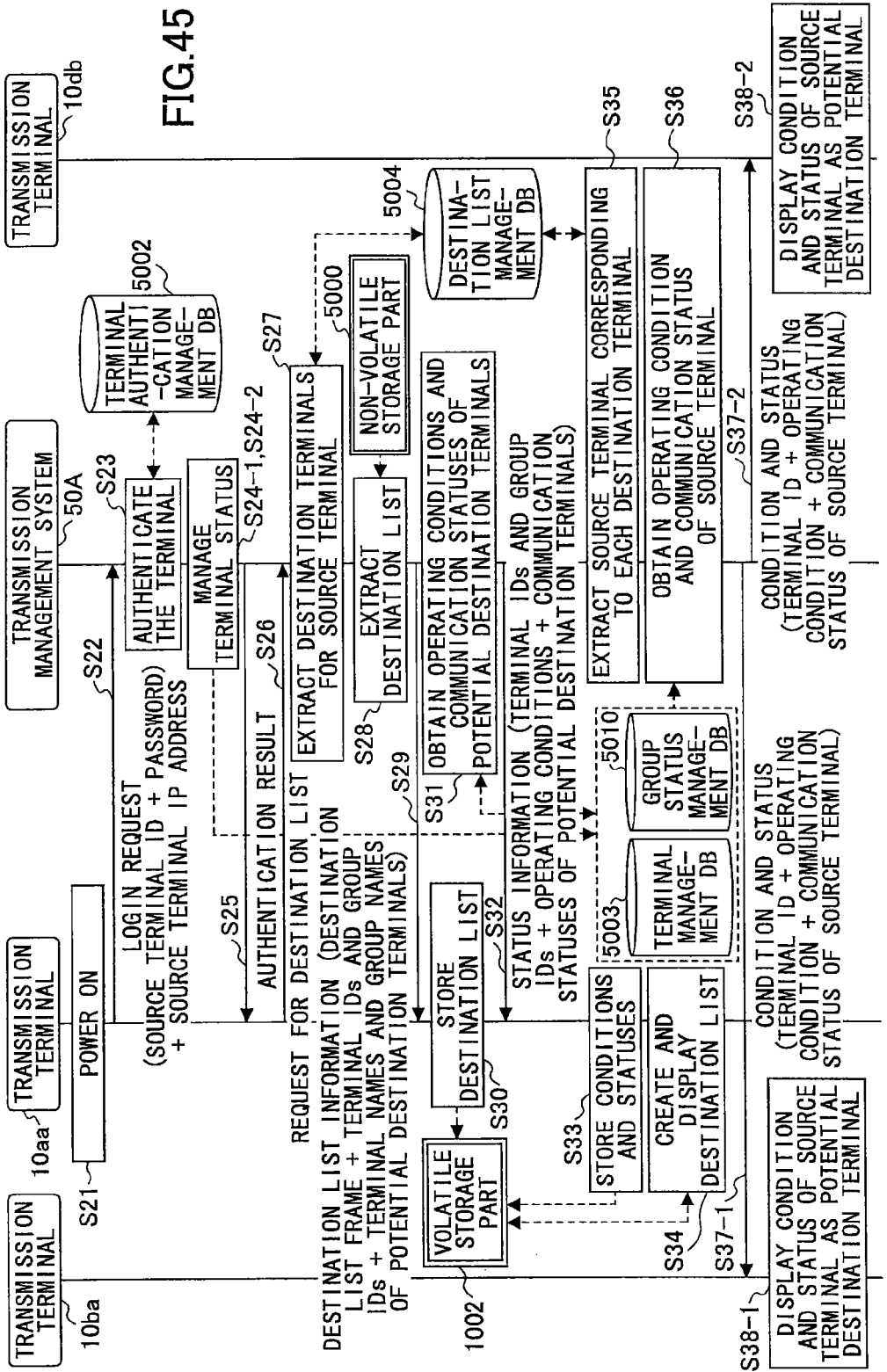
FIG. 45 is a sequence diagram for explaining a preparatory process to start communication between transmission terminals.

FIG. 45, which corresponds to FIG. 22, shows a sequence diagram representing a process to start a call between terminals. A process from when the terminal 10aa turns on to when it transmits a request for a destination list (steps S21-S26) is in common with FIG. 22.

At step S27, the terminal extraction part 54 searches the destination list management table (FIG. 42) by the terminal ID "01aa" of the source terminal 10aa that has sent the login request as a search key, and retrieves the terminal IDs (including the group ID) of potential destination terminals capable of communicating with the source terminal (i.e., the terminal 10aa). As a result, the terminal extraction part 54 extracts the terminal IDs of the potential destination terminals capable of communicating with the source terminal.

In this example, terminal IDs "01ab" and "01xx" of the potential destination terminals associated with the terminal ID "01aa" of the source terminal 10aa are extracted. In addition, the terminal names "Japan Tokyo Office AB Terminal" and the group name "Call Center" corresponding to the potential destination terminals are extracted. The terminal name and the group name are obtained from the terminal management table shown in FIG. 41 and the group ID management table shown in FIG. 43 with the terminal ID and the group ID, respectively.

Next, similarly to step S28 shown in FIG. 22, the transmitter/receiver part 51 reads data of the destination list frame, and transmits to the source terminal 10aa "destination list information" including the destination list frame, the terminal ID and the group ID, and the terminal name and the group name (step S29).

In this way, the transmitter/receiver part 11 of the source terminal 10aa receives the destination list information, and the store/read processing part stores the destination list information in the volatile storage part 1002 (step S30).

The terminal state acquisition part 55 of the management system 50A searches the terminal management table (FIG. 41) and the group status change management table (FIG. 44) by the terminal IDs ("01ab" and "01xx") of the potential destination terminals extracted by the terminal extraction part as search keys, and retrieves the operating condition (both the terminal and the group) and the communication status (the terminal only) of the potential destination terminals extracted by the terminal extraction unit 54 based on the terminal ID and the group ID (step S31).

Subsequently, the transmitter/receiver part 51 transmits, via the communication network 2, to the login request terminal status information including the terminal ID (including the group ID) used as the search key in step S31 and the operating condition (both the terminal and the group) and the communication status (the terminal only) of the potential destination terminals corresponding to the terminal ID and the group ID (step S32). In particular, in step S32, the status information including the terminal ID "01ab" as the search key and the operating condition "Offline" of the potential destination terminal (i.e. terminal 10ab) is transmitted to the login request terminal (i.e. terminal 10aa). In addition, the status information including the group ID "01xx" as the search key and the operating condition "Online (Available)" of the potential destination terminal (i.e. the group "01xx") is transmitted to the login request terminal (i.e. terminal 10aa).

The subsequent steps are in common with FIG. 22.

Figure 46:
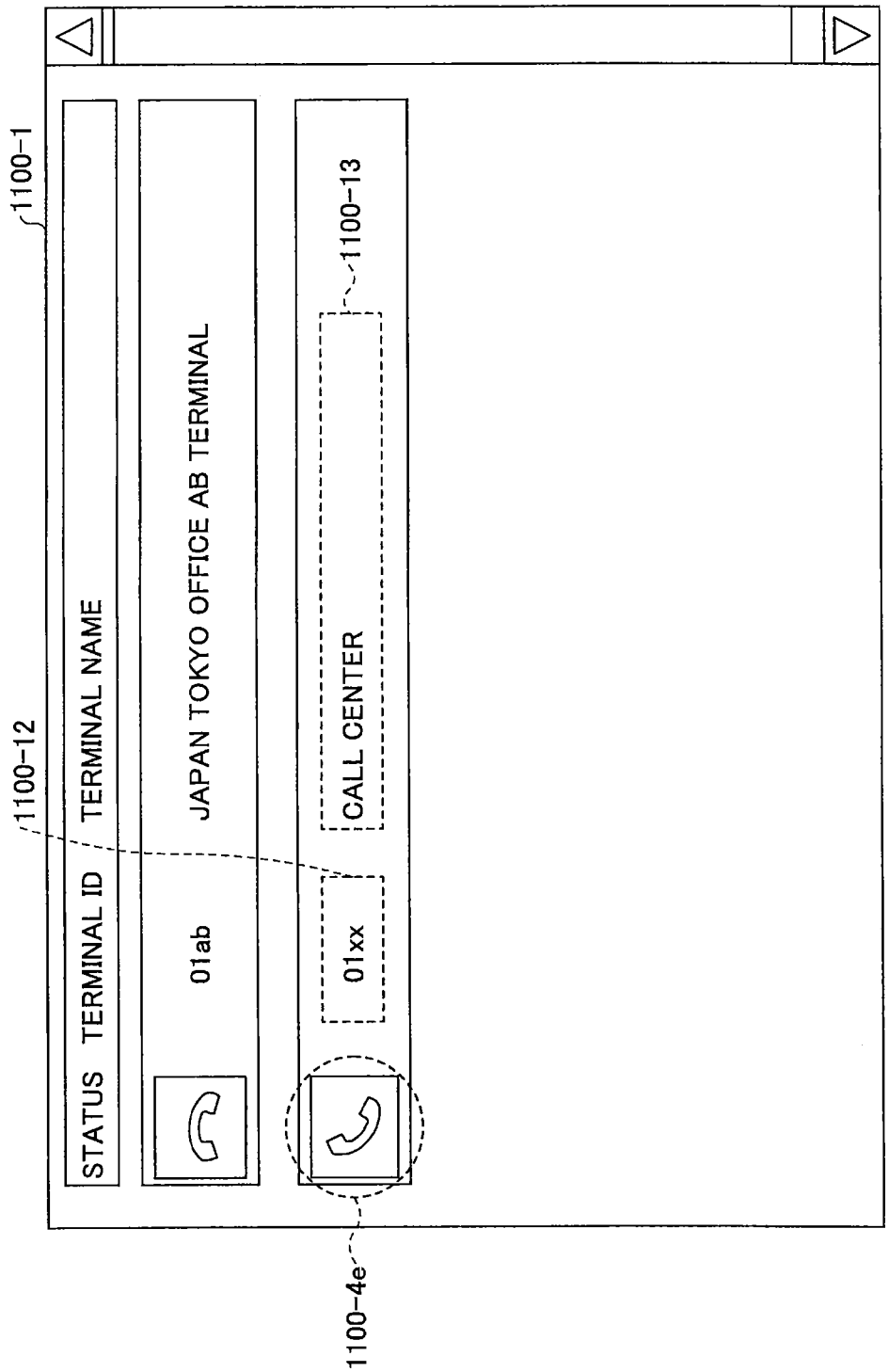
FIG. 46 is a diagram showing an example screen of a destination list.

FIG. 46, which corresponds to FIG. 23, is a diagram showing an example screen of the destination list on the transmission system 1A. The configuration of the screen is similar to the FIG. 23, but the group name is displayed on the list in FIG. 46. As shown in FIG. 46, the destination list is a display screen having a destination list frame 1100-1 including a group ID 1100-12 of the potential destination terminal, the group name 1100-13, and icon 1100-4e reflecting the status of the group.

The types of the icons are an offline icon (e.g. the icon 1100-4a shown in FIG. 23) indicating that all terminals of the group are offline and are not able to respond; an available icon 1100-4*e* indicating that at least one of the terminals is online and ready to respond; and an busy (unavailable) icon (e.g. the icon 1100-4*f* shown in FIG. 50) indicating that all terminals are online but busy. Any shapes of the icons may be used. When the busy (unavailable) icon is displayed, the user cannot choose the terminal as the destination. In addition, FIG. 50 shows an example screen in which terminal IDs 1100-13 of the terminals associated with the group are listed in the destination list frame 1100-1 with the group name. In this case, at steps S29 and S32 shown in FIG. 45, the terminal names of the terminals in the group may be transmitted from the management system 50 to the terminal showing the destination terminal.

Figure 47:
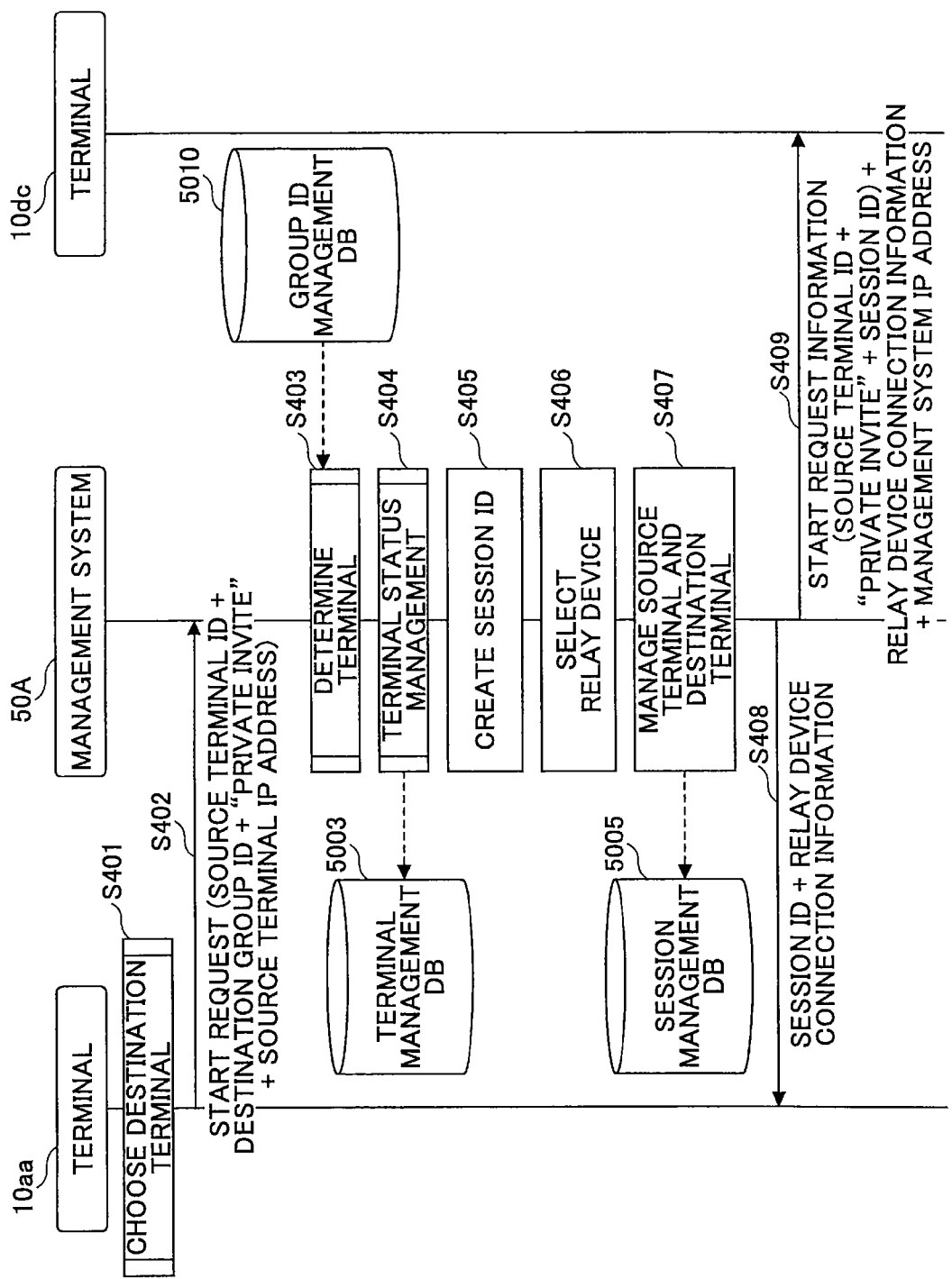
FIG. 47 is a sequence diagram for explaining a process to request for starting a communication.

Next, with reference to FIG. 47, a process in which the terminal requests for starting a call to a group is discussed. In the example of FIG. 47, the terminal 10*aa* which is allowed to login the system transmits a start request (i.e. the terminal 10*aa* operates as a source terminal). Based on the status information about the potential destination terminal received at step S32 in FIG. 45, the source terminal 10*aa* is able to start communicating with the terminal in which the operating condition is "Online" and the communication status is "None" or the group in which the operating condition is "Online (Available)".

In this example, it is assumed that the user of the source terminal (the terminal 10*aa*) chooses the group (the group ID "01xx") as a destination to call. In a state prior to the beginning of the process shown in FIG. 47, the display 120*aa* of the terminal 10*aa* as the source terminal shows the destination list shown in FIG. 26. In addition, the user of the source terminal may choose a terminal or a group (i.e. a terminal or a group for starting a session) from the destination list.

At step S401, similarly to step S41 shown in FIG. 24, a process for choosing a destination terminal is performed when the user of the source terminal pushes the operation button 108 shown in FIG. 2 to choose the group "Call Center". Since a detailed discussion about the process for choosing the destination terminal has already down with FIG. 25, it is omitted here.

The transmitter/receiver part 11 of the terminal 10*aa* transmits the start request including the terminal ID "01aa" of the source terminal (the terminal 10*aa*), the group ID "01xx" of the destination group, the restriction information "Private Invite" indicating the restricted session, and the IP address of the source terminal to the management system 50A (step S402). In this way, by receiving the start request, the transmitter/receiver part 51 of the management system 50A is able to obtain the IP address "1.2.1.3" of the source terminal (the terminal 10*aa*) which has transmitted the start request.

Here, the start request is transmitted including the restriction information indicating the restricted session because, for communications between a user (a customer) and a call center, other persons except the user using the terminal 10*aa* and the communicator using one of the terminals included in the group are not expected to join the session between the user and the communicator.

In step S403, one of the terminals associated with the group ID is selected as a destination terminal communicating with the source terminal.

Figure 49:
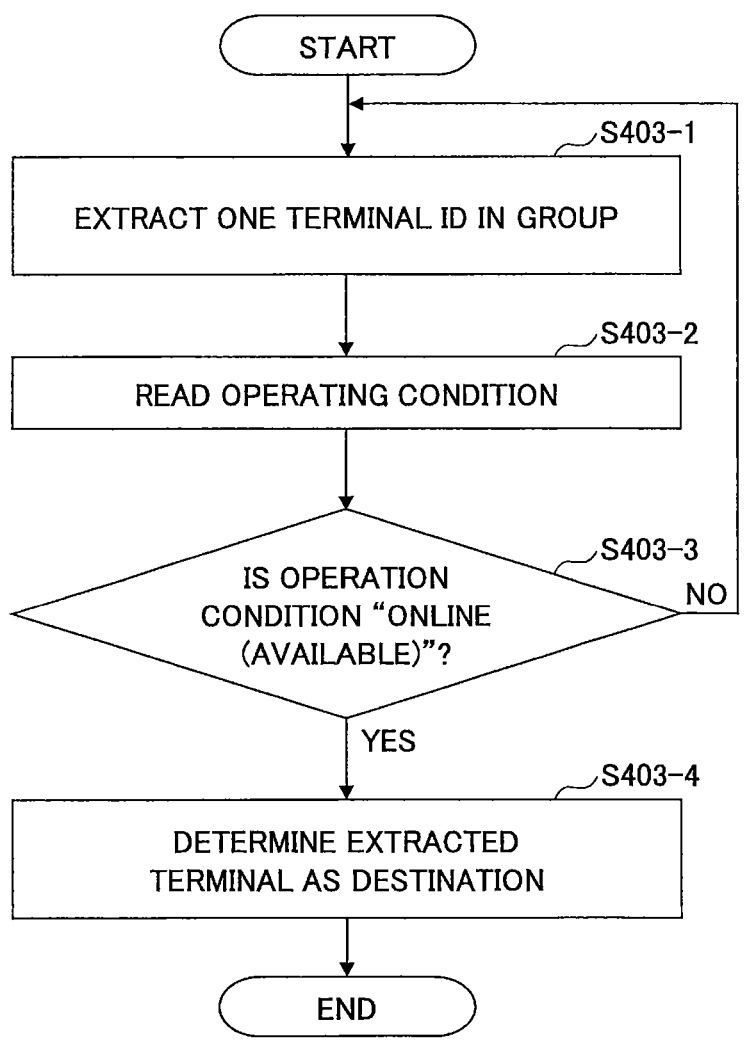
FIG. 49 is a flowchart for explaining a process to identify a destination terminal.

With reference to FIG. 49, a process at step S403 is discussed in detail.

At step S403-1, the terminal extraction part 54 shown in FIG. 40 searches the group ID management table by the group ID (the terminal ID) received at step S402 in FIG. 47 as a search key, and extracts one of the grouped terminal IDs.

At step S403-2, the terminal state acquisition part 55 shown in FIG. 40 searches the terminal management table by the terminal ID extracted at step S403-1 as a search key, and reads the operating condition of the terminal.

At step S403-3, it is determined whether the operating condition read at step S403-2 is "Online (Available)". If so, the process goes to step S403-4, otherwise goes back to step S403-1.

At step S403-4, the terminal using the terminal ID extracted at step S403-1 is determined as the destination terminal.

Here, the source terminal ID is "01aa" and the destination group ID is "01xx". In this case, the terminal in which the operation condition is "Online (Available)" in the terminals associated with the group (the terminal IDs "01ba", "01db", and "01dc") is only the terminal having the terminal ID "01dc". Thus, the terminal 10*dc* is determined as the destination terminal.

Note that any policy or method to determine the destination terminal may be used. For example, the terminal extraction part 54 may identify a terminal as the destination terminal so that the number of times that the terminal is determined as the destination terminal is similar to other terminals. Alternatively, the terminal extraction part 54 may preferentially identify a high performance terminal.

Referring back to FIG. 47, steps S404-S409 correspond to steps S43-S48 shown in FIG. 24. Thus, at step S404, based on the terminal ID "01aa" of the source terminal included in the start request and the terminal ID "01dc" of the destination terminal determined at step S403, the state management part 53 of the management system 50A modifies the fields of the communication status on the records including the terminal ID "01aa" and "01dc" in the terminal management table of the terminal management DB 5003 (FIG. 41).

Subsequent steps S405-S409 are identical with step S44-S48 shown in FIG. 24. After the process, the statuses of the terminals 10*aa* and 10*dc* are updated, and they start a restricted session.

In this example, the terminal 10*aa* which has sent the start request transmits the start request including the restriction information "Private Invite" which indicates that the session is restricted (third party cannot join the session). This is because the conference between a store (a customer) and a call center (a communicator) is usually person-to-person once the session has been established.

However, when the customer requests for a call to a group and desires to allow the third party to join the call, the terminal 10 may transmit the start request without the restriction information representing that the session is restricted. Thus, for communications with a call center, the customer may receive support from other communicators using other terminals.

Figure 51A:
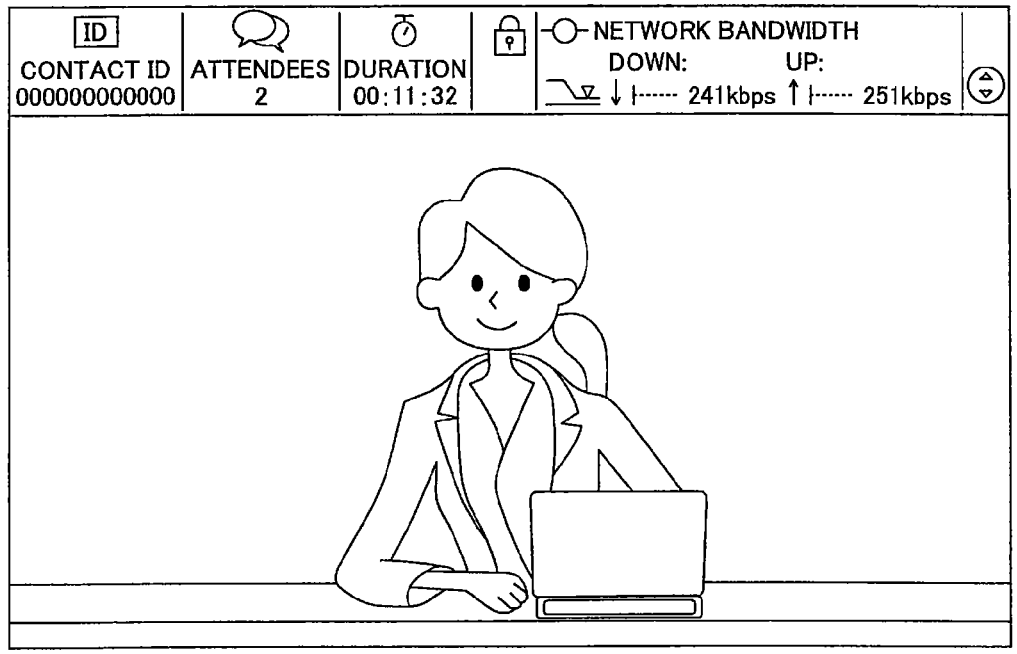
FIG. 51A is a diagram showing an example screen displayed during a conference.
Figure 51B:
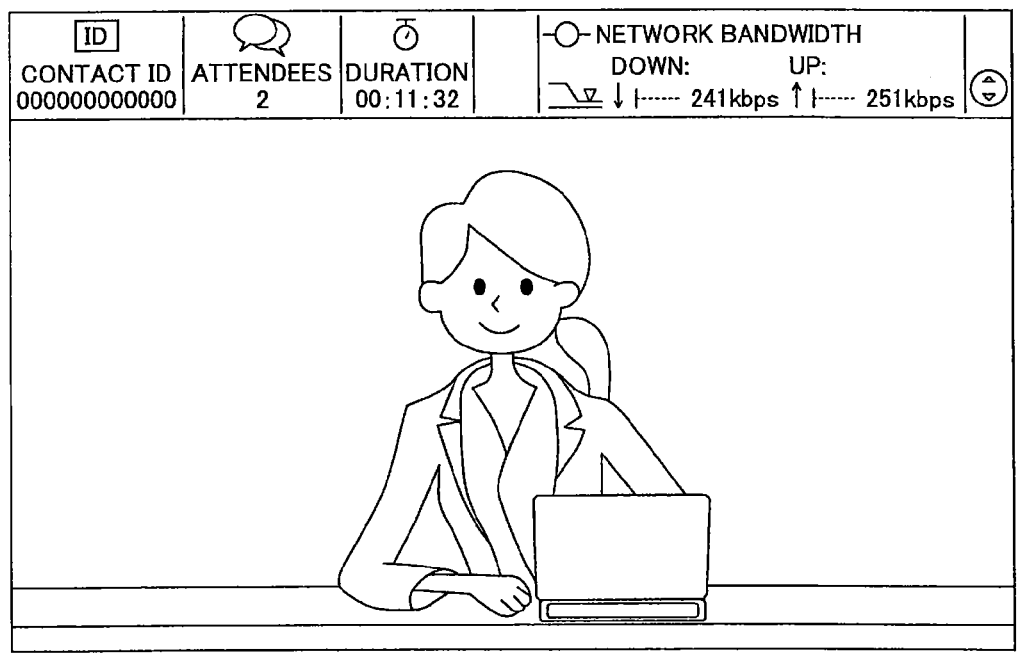
FIG. 51B is a diagram showing an example screen displayed during a conference.
Figure 52:
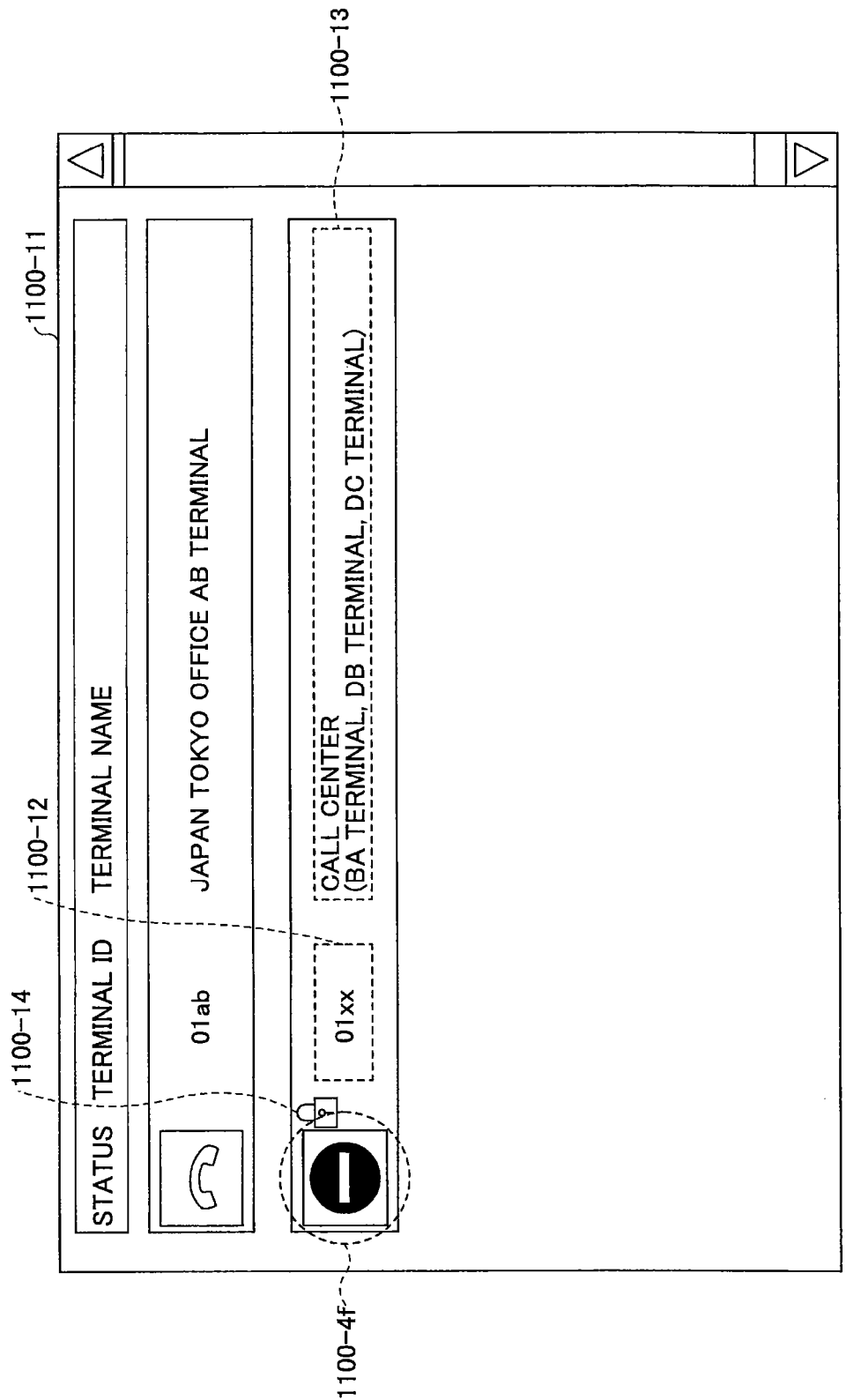
FIG. 52 is a diagram showing an example screen of a destination list.

With reference to FIGS. 51 and 52, display examples in which the terminal 10 shows information about whether the session is restricted on the display 120 are explained.

FIGS. 51A and 51B is a diagram showing an example screen displayed by the terminal 10 during a video conference with another terminal. The terminal 10 may display an image obtained by the other terminal 10 as well as an auxiliary area to show detailed information about the conference. The auxiliary area indicates the terminal ID (shown as contact ID in FIGS. 51A and 51B), the number of attendees to the conference, duration of the conference, network bandwidth (uplink and downlink), etc.

In addition, the terminal 10 may output an indicator (e.g. an icon with a certain shape) indicating that the conference is restricted or not at any position within the auxiliary area. When the user starts a conference with no restriction and the session is established, the terminal 10 may display the indicator indicating that the conference is not restricted on the display. The terminal 10 may display the indicator when the terminal receives a notification that the conference is restricted after the restricted session is established.

With reference to FIG. 51A, an icon in the form of a key is displayed on the left side of "Network Bandwidth" for the restricted conference. On the other hand, with reference to FIG. 51B, no icon is displayed for the non-restricted conference. By checking presence or absence of the icon, the user may recognize that he has joined either the restricted conference or non-restricted conference.

Note that the icon or the auxiliary area itself may be hidden after a certain period of time. In this case, responding to user's operation (e.g. operation button 108), the icon or the auxiliary area including the icon may be displayed again. The user may change the display time for the icon or the auxiliary area.

FIG. 52 is a diagram showing an example screen including the destination list displayed by the terminal 10. Unlike the destination list shown in FIG. 50, the icon 1100-14 indicating that the conference is restricted is displayed at the upper right of the icon 1100-4f in FIG. 52. For example, the terminal 10 may display the indicator when the terminal receives the status "Busy" or "Unavailable" of the group and the terminal receives a notification that the conference is restricted. By checking the icon 1100-14, the user of the terminal 10 may recognize that the destination which is "Busy" or "Unavailable" on the destination list has joined either the restricted session or the non-restricted session.

In this way, the terminal 10 may display the icon indicating that the conference between the terminal 10 and another terminal or other terminals is either the restricted conference or the non-restricted conference. Thus, the user of the terminal 10 may check whether the conference is restricted or not before or during the conference.

Figure 48:
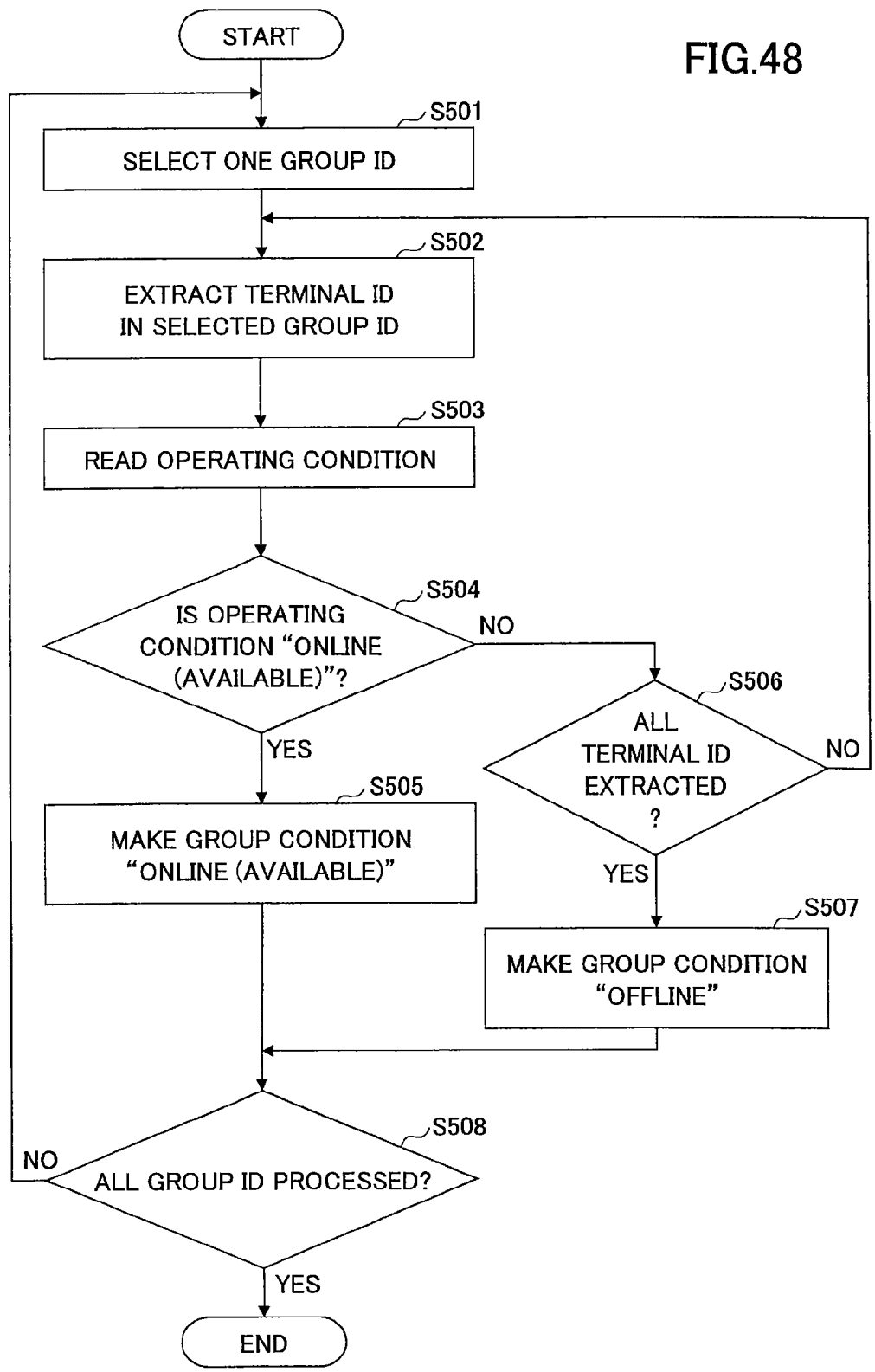
FIG. 48 is a flowchart for explaining a process to change the group status.

Next, with reference to FIG. 48, a process in which the group status update part 64 of the management system 50A updates the group status is discussed. The process is executed at any timing. For example, the process may be executed at certain intervals. Alternatively, the process may be executed in response to a change of the status of any terminal.

At step S501, the group status update part 64 refers to the group ID management table shown in FIG. 43, and selects one of the group IDs where the "Group ID Flag" is "True".

At step S502, the group status update part 64 extracts one of the terminal IDs grouped by the selected group at step S501.

At step S503, the group status update part 64 refers to the terminal management table shown in FIG. 41, and reads the operating condition of the extracted terminal ID at step S502.

At step S504, it is determined whether the operating condition read at step S503 is "Online (Available)". If so, the process goes to step S505, otherwise goes to Step S506.

At step S505, the group status update part 64 determines that the operating condition of the group ID selected at step S501 is "Online (Available)", and stores it in the group status change management table (FIG. 44).

At step S506, it is determined whether all terminal IDs associated with the group selected at step S501 have been extracted. If so, the process goes to step S507, otherwise goes back to step S502, and extracts another terminal ID.

At step S507, the group status update part 64 determines the operating condition of the group ID selected at step S501 is "Offline", and stores it in the group status change management table (FIG. 44).

At step S508, it is determined whether all group IDs where the "Group ID Flag" is "TRUE" have been processed. If so, the process ends, otherwise goes back to step S501 and processes another group ID.

As stated above, the terminal in the transmission system 1A according to this embodiment may start a video conference for one of terminals included in a group when at least one of the terminals is available. The user may start the conference by choosing the group without regard to individual destination terminals. Thus, by deploying terminals according to this embodiment on a store of a service provider and a call center, and by grouping the terminals deployed in the call center, efficiency of support operations with a video conference is improved.

The present application is based upon and claims the benefit of priority of Japanese Patent Application No. 2013-049226 filed on Mar. 12, 2013 and Japanese Patent Application No. 2014-011501 filed on Jan. 24, 2014, the entire contents of which are incorporated herein by reference.

PATENT DOCUMENT

[Patent Document 1] Japanese Laid-open Patent Publication No. 2008-199397
[Patent Document 2] Japanese Laid-open Patent Publication No. 2012-075073

What is claimed is:

1. A management device comprising:
   a status management part configured to manage connection statuses of terminals representing whether the terminals are ready to connect to other terminals;
   a group management part configured to manage a group associated with one or more of the terminals, and manages a group status of the group depending on the connection statuses of the terminals associated with the group, wherein when the connection status of at least one of the terminals associated with the group represents that the terminal is ready to connect to other terminals, the group management part sets the group status so that the group status represents that the group is ready to connect;
   a transmission part configured to transmit to a first terminal which is not associated with the group the group status representing that the group is ready to connect;
   an establishment part configured to, responding to a request to connect to the group from the first terminal, establish a session to connect the first terminal to a second terminal which is one of the terminals associated with the group, wherein the connection status of the second terminal represents that the second terminal is ready to connect to other terminals.

2. The management device as claimed in claim 1, further comprising a session management part configured to prevent any terminal except the first terminal and the second terminal from joining the session responding to the request representing that any terminal except the first terminal and the second terminal is prevented from joining the session.

3. The management device as claimed in claim 1, wherein the one or more of the terminals associated with the group are associated with a group ID.

4. The management device as claimed in claim 3, the group management part updates the group status associated with the group ID.

5. The management device as claimed in claim 1, wherein the transmission part is configured to transmit to the first terminal information representing that a session between other terminals has been established and the first terminal is prevented from joining the session, wherein responding to a receipt of the information, an indicator is displayed on the first terminal, the indicator indicating that the session between the other terminals has been established and the first terminal is prevented from joining the session.

6. The management device as claimed in claim 2, wherein the transmission part is configured to transmit to the first terminal information representing that the session between the first terminal and the second terminal has been established and any terminal except the first terminal and the second terminal is prevented from joining the session, wherein responding to a receipt of the information, an indicator is displayed on the first terminal, the indicator indicating that the session between the first terminal and the second terminal has been established and any terminal except the first terminal and the second terminal is prevented from joining the session.

7. The management device as claimed in claim 6, wherein the indicator is displayed in the form of a key.

8. A communication system comprising:
a plurality of terminals; and
a management device, wherein
the management device includes
a status management part configured to manage connection statuses of the terminals representing whether the terminals are ready to connect to other terminals;
a group management part configured to manage a group associated with one or more of the terminals, and manages a group status of the group depending on the connection statuses of the terminals associated with the group, wherein when the connection status of at least one of the terminals associated with the group represents that the terminal is ready to connect to other terminals, the group management part updates the group status so that the group status represents that the group is ready to connect;
a transmission part configured to transmit to a first terminal which is not associated with the group the group status representing that the group is ready to connect;
an establishment part configured to, responding to a request to connect to the group from the first terminal, establish a session to connect the first terminal to a second terminal which is one of the terminals associated with the group, wherein the connection status of the second terminal represents that the second terminal is ready to connect to other terminals, and
one of the terminals includes
a receipt part configured to receive the group status from the management device;
an acceptance part configured to accept user input to specify the group for transmitting the request to connect to the group; and
a transmitting part configured to transmit the request to connect to the group to the management device.

9. A non-transitory computer-readable storage medium for storing a program therein, the program causing a computer to perform a method comprising:
managing connection statuses of terminals representing whether the terminals are ready to connect to other terminals;
managing a group associated with one or more of the terminals;
acquiring the connection statuses of the terminals associated with the group;
managing a group status of the group depending on the connection statuses of the terminals associated with the group, wherein when the connection status of at least one of the terminals associated with the group represents that the terminal is ready to connect to other terminals, the group management part updates the group status so that the group status represents that the group is ready to connect;
transmitting to a first terminal which is not associated with the group the group status representing that the group is ready to connect;
responding to a request to connect to the group from the first terminal, establishing a session to connect the first terminal to a second terminal which is one of the terminals associated with the group, wherein the connection status of the second terminal represents that the second terminal is ready to connect to other terminals.

* * * * *